United States Patent
Liu et al.

(10) Patent No.: US 12,218,756 B2
(45) Date of Patent: Feb. 4, 2025

(54) METHOD AND DEVICE IN NODES USED FOR WIRELESS COMMUNICATION

(71) Applicants: Jin Liu, Shanghai (CN); Xiaobo Zhang, Shanghai (CN)

(72) Inventors: Jin Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 335 days.

(21) Appl. No.: 17/900,842

(22) Filed: Aug. 31, 2022

(65) Prior Publication Data

US 2023/0006774 A1    Jan. 5, 2023

Related U.S. Application Data

(63) Continuation of application No. PCT/CN2021/078722, filed on Mar. 2, 2021.

(30) Foreign Application Priority Data

Mar. 3, 2020 (CN) .......................... 202010140024.2
Apr. 30, 2020 (CN) .......................... 202010364741.3

(51) Int. Cl.
| | |
|---|---|
| H04L 1/1607 | (2023.01) |
| H04L 1/1812 | (2023.01) |
| H04W 72/044 | (2023.01) |

(52) U.S. Cl.
CPC .......... *H04L 1/1642* (2013.01); *H04L 1/1819* (2013.01); *H04W 72/044* (2013.01)

(58) Field of Classification Search
None
See application file for complete search history.

(56) References Cited

U.S. PATENT DOCUMENTS

2018/0124822 A1    5/2018  Wang
2018/0199381 A1*   7/2018  Rong .................... H04W 74/08
(Continued)

FOREIGN PATENT DOCUMENTS

| CN | 109842954 A | 6/2019 |
| CN | 110719650 A | 1/2020 |

OTHER PUBLICATIONS

ISR received in application No. PCT/CN2021/078722 dated May 21, 2021.

(Continued)

*Primary Examiner* — Angela Nguyen

(57) ABSTRACT

The present application provides a method and a device in a node used for wireless communications. A first node receives first configuration information and second configuration information; transmits a first message, the first message comprising at least a former one of a first signature sequence and first data; and receives a second message; and transmits a third message on a second time-frequency resource block, a first bit block being used to generate the third message; the first configuration information indicates a first time-frequency resource block, the first time-frequency resource block being used to transmit the first signature sequence in the first message; the second configuration information indicates multiple shared resource units; whether the first signature sequence is mapped to one shared resource unit of the multiple shared resource units is used to determine whether the first message comprises the first data.

20 Claims, 9 Drawing Sheets

(56) References Cited

U.S. PATENT DOCUMENTS

2020/0107375 A1    4/2020  Lee
2020/0146055 A1*   5/2020  Lei .................... H04J 13/0062
2021/0022189 A1*   1/2021  Beale .................. H04B 1/713

OTHER PUBLICATIONS

Notification to Grant Patent Right for Invention of Chinses patent application No. CN202010140024.2 dated Apr. 8, 2022.
Notification to Grant Patent Right for Invention of Chinses patent application No. CN202010364741.3 dated Oct. 24, 2022.
First Search Report of Chinses patent application No. CN202010364741.3 dated Oct. 16, 2022.
Fujitsu "Discussion on channel structure for 2-step RACH" 3GPP TSG RAN WG1 #99 R1-1912069 Nov. 8, 2019.
Intel Corporation "Remaining details of channel structure for 2-step RACH" 3GPP TSG RAN WG1 #100-E R1-2000719 Feb. 15, 2020.
Apple Inc "Remaining issues on channel structure for 2-step RACH" 3GPP TSG RAN WG1 #100-e R1-2000843 Feb. 15, 2020.
ZTE "FL summary #2 on the maintenance of 2-step RACH channel structure" 3GPP TSG-RAN WG1 Meeting #100 R1-2001206 Feb. 24, 2020.
Ericsson "PUSCH selection and MsgA payloads in 2-step RA" 3GPP TSG-RAN WG2 #107bis R2-1912682 Oct. 4, 2019.

* cited by examiner

| First field | Value |
|---|---|
| 0 | value#0 |
| 1 | value#1 |
| 2 | value#2 |
|  |  |
| . | . |
| . | . |
| . | . |
|  |  |
| n | value#n |
{0, 1, 2} — First value range
{..., n} — Second value range
FIG. 6B
Case A                                    Case B
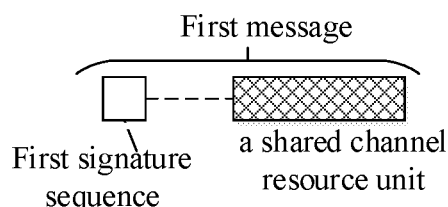
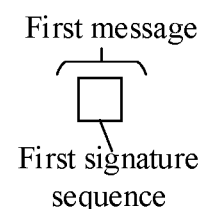
FIG. 7A
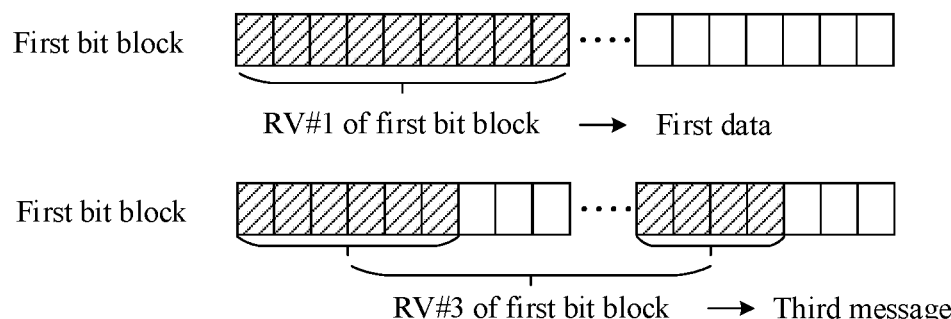
FIG. 7B

METHOD AND DEVICE IN NODES USED FOR WIRELESS COMMUNICATION

CROSS REFERENCE TO RELATED APPLICATIONS

This application is the continuation of the International Patent application No. PCT/CN2021/078722, filed on Mar. 2, 2021, which claims the priority benefit of Chinese Patent Application No. 202010140024.2, filed on Mar. 3, 2020, and claims the priority benefit of Chinese Patent Application No. 202010364741.3, filed on Apr. 30, 2020, the full disclosure of which is incorporated herein by reference.

BACKGROUND

Technical Field

The present application relates to transmission methods and devices in wireless communication systems, and in particular to a transmission scheme and a device related to massive connection of small data in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

With the emergence of small data services, the 3GPP has started development of standards and the work of researches under NR at the 3GPP RAN #86 conference. The services of small or sparse data include two major types: applications in smart phones and applications in non-intelligent handsets. Applications in smart phones provide instant messaging services, like whatsapp, QQ and wechat, and cardiac pacemaker and life maintenance service, as well as push notification; while applications in non-smart phones include services of wearables (e.g., periodic positioning information, etc.), sensors (e.g., periodically- or event-triggered temperature, pressure report) and intelligent instrument.

SUMMARY

The NR Release-16 system introduced the procedure of 2-Step Random Access Channel (2-Step RACH). A Message A (MsgA) in the 2-step random access procedure comprises a PRACH preamble and a PUSCH payload, where the PRACH preamble is transmitted on a RACH Occasion (RO) while the PUSCH payload is transmitted on a PUSCH Occasion (PO), occupying a PUSCH Resource Unit (PRU). The PRACH preamble and PRU in the MsgA are independently configured, and for some conflicts of resources, part of the PRACH preamble and part of the PRU are null. The associated mapping between the PRACH preamble and PRU in the MsgA is determined implicitly, which results in some part of the PRACH preamble having no corresponding PRU linkage. When a User Equipment (UE) always chooses a PRACH preamble without PRU being associated, the PUSCH payload cannot be transmitted in the MsgA, as a result, the UE is actually working in a 4-step random access procedure, and cannot ensure that the demand for access delay is satisfied.

To address the above issue, the present application provides a mechanism of transmitting random access preamble to avoid the situation in which the UE always selects a random access preamble without associated PRU, thus guaranteeing the normal performance of random access of the UE. It should be noted that if no conflict is incurred, embodiments in a User Equipment (UE) in the present application and the characteristics of the embodiments are also applicable to a base station, and vice versa. What's more, the embodiments in the present application and the characteristics in the embodiments can be arbitrarily combined if there is no conflict. Further, though originally targeted at random access, the present application also applies to Beam Failure Recovery.

Further, though originally targeted at the Uplink, the present application also applies to the Sidelink. Further, though originally targeted at single-carrier communications, the present application also applies to multi-carrier communications. Further, though originally targeted at single-antenna communications, the present application also applies to multi-antenna communications. Further, the present application is designed targeting terminal-base station scenario, but can be applied to V2X communications, terminal-relay communications as well as relay-base station communications, where similar technical effects can be achieved. Additionally, the adoption of a unified solution for various scenarios, including but not limited to V2X scenario and terminal-base station communications, contributes to the reduction of hardcore complexity and costs.

It should be noted that interpretations of the Terminology in the present application refer to definitions given in 3GPP TS36, TS37 and TS38, but also to those given in the Institute of Electrical and Electronics Engineers (IEEE) protocol specifications.

The present application provides a method in a first node for wireless communications, comprising:
  receiving a first signaling group, the first signaling group being used to indicate a first signature sequence group and a second signature sequence group;
  selecting a first signature sequence from Q signature sequences, and transmitting the first signature sequence in a first time interval; and
  selecting a second signature sequence from Q signature sequences, and transmitting the second signature sequence in a second time interval;
  herein, any of the Q signature sequence belongs to one of the first signature sequence group or the second signature sequence group; the second time interval is after the first time interval; whether the first signature sequence belongs to the first signature sequence group or the second signature sequence group is used for selecting the second signature sequence; any signature sequence in the first signature sequence group is associated with a shared channel resource unit in a first period; any signature sequence in the second signature sequence group is not associated with any shared channel resource unit in the first period; Q is a positive integer greater than 1.

In one embodiment, a problem to be solved in the present application is that the NR system always chooses a random access preamble which is not associated with PRU in the 2-step random access procedure, thus leading to a great reduction in the access performance.

In one embodiment, a method in the present application is to associate the first signature sequence with the second signature sequence.

In one embodiment, a method in the present application is to associate whether the first signature sequence belongs to the first signature sequence group or the second signature sequence group with the selection of the second signature sequence.

In one embodiment, the above method is characterized in that the first signature sequence and the second signature sequence do not simultaneously belong to one of the first signature sequence group or the second signature sequence group.

In one embodiment, the above method is characterized in that the first node cannot select a signature sequence successively from a target signature sequence group in the present application.

In one embodiment, the above method is advantageous in preventing the first node from continuously selecting a random access preamble not associated with PRU, which ensures the demand for delay of UE access.

In one embodiment, the above method is advantageous in preventing the first node from constantly occupying a random access preamble associated with PRU, which takes up the occasion where other UEs can have a quick access.

According to one aspect of the present application, the above method is characterized in that when the first signature sequence belongs to a target sequence group, the second signature sequence is chosen from one of the first signature sequence group and the second signature sequence group other than the target sequence group, the target sequence group being one of the first signature sequence group or the second signature sequence group.

According to one aspect of the present application, the above method is characterized in comprising:
transmitting L−1 signature sequence(s) (respectively) in L−1 time interval(s);
herein, L is a positive integer greater than 1, each of the L−1 time interval(s) being before the first time interval; each of the L−1 signature sequence(s) belongs to the target signature sequence group.

According to one aspect of the present application, the above method is characterized in that the first signaling group indicates the L.

According to one aspect of the present application, the above method is characterized in comprising:
monitoring a second message in a first time window;
herein, the first time window is between the first time interval and the second time interval; the second message is used to determine that the first signature sequence is correctly received; the second message not being detected is used to trigger transmitting of the second signature sequence.

According to one aspect of the present application, the above method is characterized in that the target signature sequence group is the first signature sequence group.

According to one aspect of the present application, the above method is characterized in that the target signature sequence group is the second signature sequence group.

According to one aspect of the present application, the above method is characterized in that the first node is a UE.

According to one aspect of the present application, the above method is characterized in that the first node is a base station.

According to one aspect of the present application, the above method is characterized in that the first node is a relay node.

The present application provides a method in a second node for wireless communications, comprising:
transmitting a first signaling group, the first signaling group being used to indicate a first signature sequence group and a second signature sequence group;
detecting a first signature sequence in a first time interval; and
detecting a second signature sequence in a second time interval;
herein, the first signature sequence and the second signature sequence are respectively two signature sequences among Q signature sequences; any of the Q signature sequence belongs to one of the first signature sequence group or the second signature sequence group; the second time interval is after the first time interval; whether the first signature sequence belongs to the first signature sequence group or the second signature sequence group is used for selecting the second signature sequence; any signature sequence in the first signature sequence group is associated with a shared channel resource unit in a first period; any signature sequence in the second signature sequence group is not associated with any shared channel resource unit in the first period; Q is a positive integer greater than 1.

According to one aspect of the present application, the above method is characterized in that when the first signature sequence belongs to a target sequence group, the second signature sequence is chosen from one of the first signature sequence group and the second signature sequence group other than the target sequence group, the target sequence group being one of the first signature sequence group or the second signature sequence group.

According to one aspect of the present application, the above method is characterized in comprising:
detecting L−1 signature sequence(s) (respectively) in L−1 time interval(s);
herein, L is a positive integer greater than 1, each of the L−1 time interval(s) being before the first time interval; each of the L−1 signature sequence(s) belongs to the target signature sequence group.

According to one aspect of the present application, the above method is characterized in that the first signaling group indicates the L.

According to one aspect of the present application, the above method is characterized in comprising:
transmitting a second message in a first time window;
herein, the first time window is between the first time interval and the second time interval; the second message does not carry an identifier of the first signature sequence.

According to one aspect of the present application, the above method is characterized in that the target signature sequence group is the first signature sequence group.

According to one aspect of the present application, the above method is characterized in that the target signature sequence group is the second signature sequence group.

According to one aspect of the present application, the above method is characterized in that the second node is a UE.

According to one aspect of the present application, the above method is characterized in that the second node is a base station.

According to one aspect of the present application, the above method is characterized in that the second node is a relay node.

The present application provides a first node for wireless communications, comprising:

a first receiver, receiving a first signaling group, the first signaling group being used to indicate a first signature sequence group and a second signature sequence group; and a first transmitter, selecting a first signature sequence from Q signature sequences, and transmitting the first signature sequence in a first time interval; and selecting a second signature sequence from Q signature sequences, and transmitting the second signature sequence in a second time interval;

herein, any of the Q signature sequence belongs to one of the first signature sequence group or the second signature sequence group; the second time interval is after the first time interval; whether the first signature sequence belongs to the first signature sequence group or the second signature sequence group is used for selecting the second signature sequence; any signature sequence in the first signature sequence group is associated with a shared channel resource unit in a first period; any signature sequence in the second signature sequence group is not associated with any shared channel resource unit in the first period; Q is a positive integer greater than 1.

The present application provides a second node for wireless communications, comprising:

a second transmitter, transmitting a first signaling group, the first signaling group being used to indicate a first signature sequence group and a second signature sequence group; and a second receiver, detecting a first signature sequence in a first time interval; and detecting a second signature sequence in a second time interval;

herein, the first signature sequence and the second signature sequence are respectively two signature sequences among Q signature sequences; any of the Q signature sequence belongs to one of the first signature sequence group or the second signature sequence group; the second time interval is after the first time interval; whether the first signature sequence belongs to the first signature sequence group or the second signature sequence group is used for selecting the second signature sequence; any signature sequence in the first signature sequence group is associated with a shared channel resource unit in a first period; any signature sequence in the second signature sequence group is not associated with any shared channel resource unit in the first period; Q is a positive integer greater than 1.

The present application provides a method in a first node for wireless communications, comprising:

receiving first configuration information and second configuration information;

transmitting a first message, the first message comprising at least a former one of a first signature sequence and first data; and receiving a second message, the second message being used to indicate that the first signature sequence is correctly received; and transmitting a third message on a second time-frequency resource block, a first bit block being used to generate the third message;

herein, the first message and the second message belong a random access procedure; the first configuration information indicates a first time-frequency resource block, the first time-frequency resource block being used to transmit the first signature sequence in the first message; the second configuration information indicates multiple shared resource units; the first configuration information and the second configuration information are used together to determine whether the first signature sequence is mapped to one shared resource unit of the multiple shared resource units; whether the first signature sequence is mapped to one shared resource unit of the multiple shared resource units is used to determine whether the first message comprises the first data; the second message comprises a first field, and information indicated by the first field is related to whether the first message comprises the first data; the second message indicates the second time-frequency resource block.

In one embodiment, the problem to be solved in the present application is: the UE in an NR system selects a random access preamble with associated PRU in the 2-step random access procedure, and the property of retransmission that a Message 3 (Msg3) is a PUSCH payload in an MsgA improves the reception accuracy.

In one embodiment, the method provided in the present application is to distinguish different information indicated by a first field in the MsgB respectively in cases of the UE selecting a random access preamble associated with PRU and the UE selecting a random access preamble not associated with PRU in the 2-step random access procedure.

In one embodiment, the method provided in the present application is to associate interpretation of the first field in the second message with whether the first signature sequence is mapped to a shared resource unit.

In one embodiment, the method provided in the present application is to associate information indicated by the first field in the second message with whether the first message comprises the first data.

In one embodiment, the method provided in the present application is that whether the first signature sequence is associated with a shared channel resource unit in the first association pattern period is used to determine information indicated by the first field in the second message.

In one embodiment, the above method is characterized in that the information indicated by the first field in the second message can be varied.

In one embodiment, the above method is advantageous in that when the first signature sequence is associated with a shared channel resource unit in the first association pattern period, the first field in the second message is used for indicating retransmitted information to increase the accuracy of reception of the third message, thus enhancing the access delay of 2-step random access in the fallback mode.

According to one aspect of the present application, the above method is characterized in that when the first signature sequence is mapped to the first shared resource unit, the first shared resource unit being one of the multiple shared resource units indicated by the second configuration information, the first message comprises the first signature sequence and the first data, the first bit block being used to generate the first data, the first data being transmitted on the first shared resource unit, and the second message indicating that the first data is not correctly received; when the first signature sequence is not mapped to any of the multiple shared resource units indicated by the second configuration information, the first message only comprises the first signature sequence between the first signature sequence and the first data.

According to one aspect of the present application, the above method is characterized in that the first field in the second message indicates a first value, the first value being an integer; when the first signature sequence is mapped to the first shared resource unit, a first value belonging to one of a first value range or a second value range is used to determine whether the second message is correctly received; when the first signature sequence is not mapped to any of the multiple shared resource units indicated by the second configuration information, the first value indicates a transmit power adjustment offset of the third message.

According to one aspect of the present application, the above method is characterized in that the first signature sequence is mapped to the first shared resource unit; the first value range comprises multiple negative integers, and the second value range comprises multiple non-negative integers; when the first value belongs to the first value range of the first value range or the second value range, the first value indicates that the second message is not correctly received; when the first value belongs to the second value range of the first value range or the second value range, the first value indicates a transmit power adjustment offset of the third message.

According to one aspect of the present application, the above method is characterized in that when the first signature sequence is mapped to the first shared resource unit, the first field in the second message is used to indicate whether a Hybrid Automatic Repeat request (HARQ) Redundancy Version (RV) of the third message and a HARQ RV of the first data are the same; when the first signature sequence is not mapped to any of the multiple shared resource units indicated by the second configuration information, the first field in the second message is reserved.

According to one aspect of the present application, the above method is characterized in that the first signature sequence is mapped to the first shared resource unit; the second message comprises a second field; the second field is used to determine that the first field indicates one of first scheduling information or second scheduling information; the first scheduling information indicates time-frequency resources occupied by the second time-frequency resource block; the second scheduling information indicates that the second time-frequency resource block is time-frequency resources occupied by one of the multiple shared resource units indicated by the second configuration information.

According to one aspect of the present application, the above method is characterized in that the first node is a UE.

According to one aspect of the present application, the above method is characterized in that the first node is a base station.

According to one aspect of the present application, the above method is characterized in that the first node is a relay node.

The present application provides a method in a second node for wireless communications, comprising:
transmitting first configuration information and second configuration information;
receiving a first message, the first message comprising at least a former one of a first signature sequence and first data; and
transmitting a second message, the second message being used to indicate that the first signature sequence is correctly received; and
receiving a third message on a second time-frequency resource block, a first bit block being used to generate the third message;
herein, the first message and the second message belong a random access procedure; the first configuration information indicates a first time-frequency resource block, the first time-frequency resource block being used to transmit the first signature sequence in the first message; the second configuration information indicates multiple shared resource units; the first configuration information and the second configuration information are used together to determine whether the first signature sequence is mapped to one shared resource unit of the multiple shared resource units; whether the first signature sequence is mapped to one shared resource unit of the multiple shared resource units is used to determine whether the first message comprises the first data; the second message comprises a first field, and information indicated by the first field is related to whether the first message comprises the first data; the second message indicates the second time-frequency resource block.

According to one aspect of the present application, the above method is characterized in that when the first signature sequence is mapped to the first shared resource unit, the first shared resource unit being one of the multiple shared resource units indicated by the second configuration information, the first message comprises the first signature sequence and the first data, the first bit block being used to generate the first data, the first data being transmitted on the first shared resource unit, and the second message indicating that the first data is not correctly received; when the first signature sequence is not mapped to any of the multiple shared resource units indicated by the second configuration information, the first message only comprises the first signature sequence between the first signature sequence and the first data.

According to one aspect of the present application, the above method is characterized in that the first field in the second message indicates a first value, the first value being an integer; when the first signature sequence is mapped to the first shared resource unit, a first value belonging to one of a first value range or a second value range is used to determine whether the second message is correctly received; when the first signature sequence is not mapped to any of the multiple shared resource units indicated by the second configuration information, the first value indicates a transmit power adjustment offset of the third message.

According to one aspect of the present application, the above method is characterized in that the first signature sequence is mapped to the first shared resource unit; the first value range comprises multiple negative integers, and the second value range comprises multiple non-negative integers; when the first value belongs to the first value range of the first value range or the second value range, the first value indicates that the second message is not correctly received; when the first value belongs to the second value range of the first value range or the second value range, the first value indicates a transmit power adjustment offset of the third message.

According to one aspect of the present application, the above method is characterized in that when the first signature sequence is mapped to the first shared resource unit, the first field in the second message is used to indicate whether a Hybrid Automatic Repeat request (HARQ) Redundancy Version (RV) of the third message and a HARQ RV of the first data are the same; when the first signature sequence is not mapped to any of the multiple shared resource units indicated by the second configuration information, the first field in the second message is reserved.

According to one aspect of the present application, the above method is characterized in that the first signature sequence is mapped to the first shared resource unit; the second message comprises a second field; the second field is used to determine that the first field indicates one of first scheduling information or second scheduling information;

the first scheduling information indicates time-frequency resources occupied by the second time-frequency resource block; the second scheduling information indicates that the second time-frequency resource block is time-frequency resources occupied by one of the multiple shared resource units indicated by the second configuration information.

According to one aspect of the present application, the above method is characterized in that the second node is a UE.

According to one aspect of the present application, the above method is characterized in that the second node is a base station.

According to one aspect of the present application, the above method is characterized in that the second node is a relay node.

The present application provides a first node for wireless communications, comprising:
 a first receiver, receiving first configuration information and second configuration information;
 a first transmitter, transmitting a first message, the first message comprising at least a former one of a first signature sequence and first data; and
 a second receiver, receiving a second message, the second message being used to indicate that the first signature sequence is correctly received; and
 a second transmitter, transmitting a third message on a second time-frequency resource block, a first bit block being used to generate the third message;
 herein, the first message and the second message belong a random access procedure; the first configuration information indicates a first time-frequency resource block, the first time-frequency resource block being used to transmit the first signature sequence in the first message; the second configuration information indicates multiple shared resource units; the first configuration information and the second configuration information are used together to determine whether the first signature sequence is mapped to one shared resource unit of the multiple shared resource units; whether the first signature sequence is mapped to one shared resource unit of the multiple shared resource units is used to determine whether the first message comprises the first data; the second message comprises a first field, and information indicated by the first field is related to whether the first message comprises the first data; the second message indicates the second time-frequency resource block.

The present application provides a second node for wireless communications, comprising:
 a third transmitter, transmitting first configuration information and second configuration information;
 a third receiver, receiving a first message, the first message comprising at least a former one of a first signature sequence and first data; and
 a fourth transmitter, transmitting a second message, the second message being used to indicate that the first signature sequence is correctly received; and
 a fourth receiver, receiving a third message on a second time-frequency resource block, a first bit block being used to generate the third message;
 herein, the first message and the second message belong a random access procedure; the first configuration information indicates a first time-frequency resource block, the first time-frequency resource block being used to transmit the first signature sequence in the first message; the second configuration information indicates multiple shared resource units; the first configuration information and the second configuration information are used together to determine whether the first signature sequence is mapped to one shared resource unit of the multiple shared resource units; whether the first signature sequence is mapped to one shared resource unit of the multiple shared resource units is used to determine whether the first message comprises the first data; the second message comprises a first field, and information indicated by the first field is related to whether the first message comprises the first data; the second message indicates the second time-frequency resource block.

In one embodiment, the present application has the following advantages:
 the present application addresses a great reduction in the access performance resulting from that the NR system always chooses a random access preamble which is not associated with PRU in the 2-step random access procedure.
 the present application associates the first signature sequence with the second signature sequence.
 the present application associates whether the first signature sequence belongs to the first signature sequence group or the second signature sequence group with the selection of the second signature sequence.
 in the present application, the first signature sequence and the second signature sequence do not simultaneously belong to one of the first signature sequence group or the second signature sequence group.
 in the present application, the first node cannot select a signature sequence successively from a target signature sequence group in the present application.
 the present application prevents the first node from continuously selecting a random access preamble not associated with PRU, which ensures the demand for delay of UE access.
 the present application prevents the first node from constantly occupying a random access preamble associated with PRU, which takes up the occasion where other UEs can have a quick access.

In one embodiment, the present application has the following advantages:
 the problem to be solved in the present application is: the UE in an NR system selects a random access preamble with associated PRU in the 2-step random access procedure, and the property of retransmission that Msg3 is a PUSCH payload in MsgA improves the reception accuracy.
 the present application is going to distinguish different information indicated by a first field in the MsgB respectively in cases of the UE selecting a random access preamble associated with PRU and the UE selecting a random access preamble not associated with PRU in the 2-step random access procedure.
 the present application will associate interpretation of the first field in the second message with whether the first signature sequence is mapped to a shared resource unit.
 the present application will associate information indicated by the first field in the second message with whether the first message comprises the first data.
 in the present application, whether the first signature sequence is associated with a shared channel resource unit in the first association pattern period is used to determine information indicated by the first field in the second message.
 in the present application, the information indicated by the first field in the second message can be varied.

in the present application, when the first signature sequence is associated with a shared channel resource unit in the first association pattern period, the first field in the second message is used for indicating retransmitted information to increase the accuracy of reception of the third message, thus enhancing the access delay of 2-step random access in the fallback mode.

BRIEF DESCRIPTION OF THE DRAWINGS

Other features, objects and advantages of the present application will become more apparent from the detailed description of non-restrictive embodiments taken in conjunction with the following drawings:

FIG. 6B illustrates a schematic diagram of a relationship between a second time-frequency resource block and a shared channel resource unit according to one embodiment of the present application.

FIG. 7A illustrates a schematic diagram of relations among a first signature sequence, a shared channel resource unit and a first message according to one embodiment of the present application.

FIG. 7B illustrates a schematic diagram of a relation between a first signature sequence and a shared channel resource unit according to one embodiment of the present application.

DESCRIPTION OF THE EMBODIMENTS

The technical scheme of the present application is described below in further details in conjunction with the drawings. It should be noted that if no conflict is caused, the embodiments in the present application and the characteristics in the embodiments can be arbitrarily combined.

Embodiment 1A

Figure 1A:
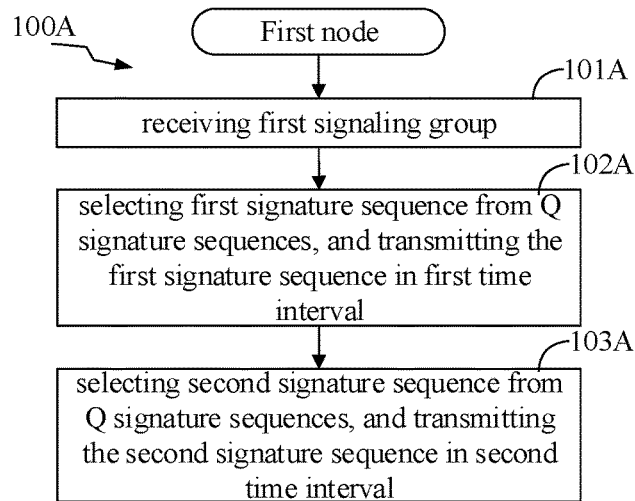
FIG. 1A illustrates a flowchart of processing of a first node according to one embodiment of the present application.

Embodiment 1A illustrates a flowchart of processing of a first node according to one embodiment of the present application, as shown in FIG. 1A. In FIG. 1A, each box represents a step.

In Embodiment 1A, the first node in the present application firstly performs step 101A, to receive a first signaling group, the first signaling group being used to indicate a first signature sequence group and a second signature sequence group; and then performs step 102A, to select a first signature sequence from Q signature sequences, and transmit the first signature sequence in a first time interval; and performs step 103A, to select a second signature sequence from Q signature sequences, and transmit the second signature sequence in a second time interval; any of the Q signature sequence belongs to one of the first signature sequence group or the second signature sequence group; the second time interval is after the first time interval; whether the first signature sequence belongs to the first signature sequence group or the second signature sequence group is used for selecting the second signature sequence; any signature sequence in the first signature sequence group is associated with a shared channel resource unit in a first period; any signature sequence in the second signature sequence group is not associated with any shared channel resource unit in the first period; Q is a positive integer greater than 1.

In one embodiment, the first signaling group is broadcast.

In one embodiment, the first signaling group comprises a higher-layer signaling.

In one embodiment, the first signaling group comprises a System Information Block (SIB).

In one embodiment, the first signaling group comprises a positive integer number of first-type signaling(s).

In one embodiment, the positive integer number of first-type signaling(s) comprised in the first signaling group is(are) Higher Layer Signalling(s).

In one embodiment, the positive integer number of first-type signaling(s) in the first signaling group is(are) Radio Resource Control (RRC) layer signalings.

In one embodiment, at least one of the positive integer number of first-type signaling(s) comprised in the first signaling group is an RRC layer Signalling.

In one embodiment, the positive integer number of first-type signaling(s) in the first signaling group is (are respectively) one or more fields in a positive integer number of RRC Information Element(s) (IE).

In one embodiment, the positive integer number of first-type signaling(s) in the first signaling group is (are respectively) a positive integer number of field(s) in an RRC IE.

In one embodiment, the positive integer number of first-type signaling(s) in the first signaling group is(are) SIB(s).

In one embodiment, at least one of the positive integer number of first-type signaling(s) comprised in the first signaling group is a SIB.

In one embodiment, at least one of the positive integer number of first-type signaling(s) in the first signaling group is a Master Information Block (MIB).

In one embodiment, the first signaling group comprises System Information transmitted on a Broadcast Channel (BCH).

In one embodiment, the first signaling group is used for indicating a random access preamble parameter.

In one embodiment, the first signaling group comprises configured parameters transmitted by a Physical Random Access Channel (PRACH).

In one embodiment, the first signaling group comprises a Cell-specific random access parameter.

In one embodiment, the positive integer number of first-type signaling(s) in the first signaling group includes (include) an RRC IE RACH-ConfigCommon.

In one subembodiment, for the definition of the RRC IE RACH-ConfigCommon, refer to 3GPP TS38.331, Section 6.3.2.

In one embodiment, the first signaling group comprises a PRACH preamble format.

In one embodiment, the first signaling group comprises time resources of a PRACH preamble.

In one embodiment, the first signaling group comprises frequency resources of a PRACH preamble.

In one embodiment, the first signaling group comprises the root sequences and cyclic shifts of a PRACH preamble sequence set.

In one embodiment, the first signaling group comprises at least one of indexes in a logical root sequence table of a PRACH preamble sequence set, cyclic shifts of a PRACH preamble sequence set or a PRACH preamble sequence set type.

In one embodiment, the PRACH preamble sequence set types include unrestricted, restricted set A and restricted set B.

In one embodiment, the first signaling group comprises PRACH root sequence indexes.

In one embodiment, the first signaling group comprises a PRACH preamble subcarrier spacing.

In one embodiment, the first signaling group comprises a PRACH preamble transmit power.

In one embodiment, the first signaling group comprises PRACH resources.

In one embodiment, the first signaling group comprises a positive integer number of RACH
  Occasion(s) (RO(s)) in a first period.

In one embodiment, the positive integer number of RO(s) in the first period is (are respectively) a positive integer number of PRACH Occasion(s) (PRO(s)) in the first period.

In one embodiment, the first signaling group indicates a positive integer number of RO(s) in the first period.

In one embodiment, the first signaling group indicates one RO in the first period.

In one embodiment, the first signaling group indicates that any one of the positive integer number of RO(s) in the first period is associated with a positive integer number of SS/PBCH block(s).

In one embodiment, the first signaling group indicates that at least one of the positive integer number of RO(s) in the first period is associated with a positive integer number of SS/PBCH block(s).

In one embodiment, the first signaling group indicates R Contention based Preambles corresponding to any one of the positive integer number of SS/PBCH block(s) associated with any valid RO in the first period, where R is a positive integer no greater than 64.

In one embodiment, the first signaling group comprises an ssb-perRACH-OccasionAndCB-PreamblesPerSSB signaling.

In one embodiment, for the definition of the ssb-perRACH-OccasionAndCB-PreamblesPerSSB signaling, refer to 3GPP TS38.331, Section 6.3.2.

In one embodiment, the first signaling group is used to indicate X shared channel occasions in the first period.

In one embodiment, the first signaling group comprises an msgA-PUSCH-config.

In one embodiment, the definition of msgA-PUSCH-config can be found in 3GPP TS38.331.

In one embodiment, the first signaling group is used for indicating a downlink control channel.

In one embodiment, the first signaling group comprises cell-specific Physical Downlink Control Channel (PDCCH) parameter configuration.

In one embodiment, the first signaling group comprises a PDCCH-config.

In one embodiment, the definition of PDCCH-config can be found in 3GPP TS38.331.

In one embodiment, the first period comprises Q signature sequences, any two signature sequences among the Q signature sequences being orthogonal.

In one embodiment, at least two signature sequences among the Q signature sequences are orthogonal in code domain.

In one embodiment, at least two signature sequences among the Q signature sequences are orthogonal in frequency domain.

In one embodiment, at least two signature sequences among the Q signature sequences are orthogonal in time domain.

In one embodiment, a first candidate sequence is any one of the Q signature sequences.

In one embodiment, Q is a positive integral multiple of 64.

In one embodiment, Q is 64.

In one embodiment, the first candidate sequence is a pseudo-random sequence.

In one embodiment, the first candidate sequence is a Gold sequence.

In one embodiment, the first candidate sequence is an M sequence.

In one embodiment, the first candidate sequence is a Zadeoff-Chu (ZC) sequence.

In one embodiment, the first candidate sequence is a Preamble.

In one embodiment, the first candidate sequence is a Random Access Preamble.

In one embodiment, the first candidate sequence is a Physical Random Access Channel Preamble (PRACH preamble).

In one embodiment, the first candidate sequence is a Long Preamble.

In one embodiment, the first candidate sequence is a Short Preamble.

In one embodiment, for generation of the first candidate sequence, refer to 3GPP TS38.211, Section 6.3.3.1.

In one embodiment, a subcarrier spacing of a subcarrier occupied by the first candidate sequence in frequency domain is one of 1.25 kHz, 5 kHz, 15 kHz, 30 kHz, 60 kHz or 120 kHz.

In one embodiment, a length of the first candidate sequence is 839, and a subcarrier spacing of a subcarrier occupied by any one of the Q signature sequences is one of 1.25 kHz or 5 kHz.

In one embodiment, a length of the first candidate sequence is 139, and a subcarrier spacing of a subcarrier occupied by any one of the Q signature sequences is one of 15 kHz, 30 kHz, 60 kHz or 120 kHz.

In one embodiment, the first candidate sequence comprises a positive integer number of first-type sub-sequence(s), the positive integer number of first-type sub-sequence(s) being Time-Division Multiplexing (TDM).

In one subembodiment, the positive integer number of first-type sub-sequences comprised in the first candidate sequence are the same.

In one subembodiment, at least two first-type sub-sequences among the positive integer number of first-type sub-sequences comprised in the first candidate sequence are different.

In one embodiment, after being through Discrete Fourier Transform (DFT) the first candidate sequence goes through Orthogonal Frequency Division Multiplexing (OFDM) modulation processing.

In one embodiment, the first period comprises a positive integer number of slot(s).

In one embodiment, the first period comprises multiple slots.

In one embodiment, the first period comprises 1 slot.

In one embodiment, the first period comprises a positive integer number of subframe(s).

In one embodiment, the first period comprises multiple subframes.

In one embodiment, the first period comprises 1 subframe.

In one embodiment, the first period comprises a positive integer number of Radio Frame(s).

In one embodiment, the first period comprises multiple Radio Frames.

In one embodiment, the first period comprises 1 Radio Frame.

In one embodiment, the first period is continuous in time.

In one embodiment, the first period comprises one Synchronization Signal/Physical Broadcast Channel Block (SS/PBCH Block)-to-RACH Occasion (RO, where RACH refers to Random Access Channel Occasion) Association Pattern Period.

In one embodiment, the first period comprises a positive integer number of time interval(s).

In one embodiment, the positive integer number of time intervals comprised in the first period are Time Division Multiplexing (TDM).

In one embodiment, the positive integer number of time intervals comprised in the first period are Frequency Division Multiplexing (FDM).

In one embodiment, any two time intervals among the positive integer number of time intervals comprised in the first period are either TDM or FDM.

In one embodiment, at least two time intervals among the positive integer number of time intervals comprised in the first period are TDM and FDM.

In one embodiment, any time interval among the positive integer number of time intervals comprised in the first period comprises a positive integer number of multicarrier symbol(s).

In one embodiment, any time interval among the positive integer number of time intervals comprised in the first period comprises a positive integer number of RACH Occasion(s) (RO(s)).

In one embodiment, any time interval among the positive integer number of time intervals comprised in the first period comprises a positive integer number of PRACH Occasion(s) (PRO(s)).

In one embodiment, the first time interval and the second time interval are respectively two time intervals among the positive integer number of time intervals comprised in the first period, where the first time interval is earlier than the second time interval.

In one embodiment, the first period comprises the Q signature sequences.

In one embodiment, the Q signature sequences are distributed among the positive integer number of time interval(s) comprised in the first period.

Embodiment 1B

Figure 1B:
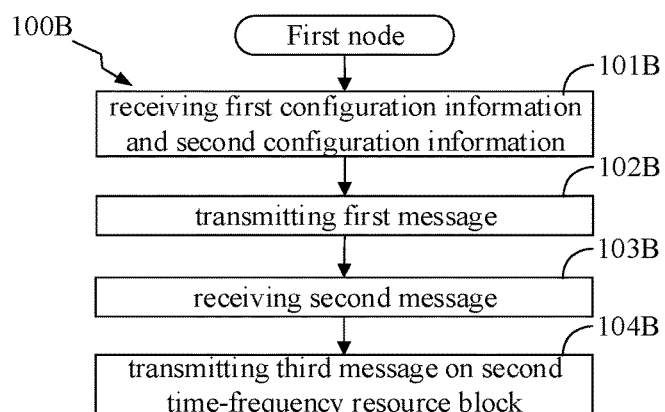
FIG. 1B illustrates a flowchart of processing of a first node according to one embodiment of the present application.

Embodiment 1B illustrates a flowchart of processing of a first node according to one embodiment of the present application, as shown in FIG. 1B. In FIG. 1B, each box represents a step.

In Embodiment 1B, the first node in the present application firstly performs step 101B, to receive first configuration information and second configuration information; and then performs step 102B, to transmit a first message; and performs step 103B, to receive a second message; and finally performs step 104B, to transmit a third message on a second time-frequency resource block; the first message comprises at least a former one of a first signature sequence and first data; the second message is used to indicate that the first signature sequence is correctly received; a first bit block is used to generate the third message; the first message and the second message belong to a random access procedure; the first configuration information indicates a first time-frequency resource block, the first time-frequency resource block being used to transmit the first signature sequence in the first message; the second configuration information indicates multiple shared resource units; the first configuration information and the second configuration information are used together to determine whether the first signature sequence is mapped to one shared resource unit of the multiple shared resource units; whether the first signature sequence is mapped to one shared resource unit of the multiple shared resource units is used to determine whether the first message comprises the first data; the second message comprises a first field, and information indicated by the first field is related to whether the first message comprises the first data; the second message indicates the second time-frequency resource block.

In one embodiment, the first configuration information comprises a higher-layer signaling.

In one embodiment, the first configuration information comprises a System Information Block (SIB).

In one embodiment, the first configuration information comprises a Master Information Block (MIB).

In one embodiment, the first configuration information comprises System Information transmitted on a Broadcast Channel (BCH).

In one embodiment, the first configuration information comprises a positive integer number of first-type signaling(s).

In one embodiment, the positive integer number of first-type signaling(s) comprised in the first configuration information is(are) Higher Layer Signaling(s).

In one embodiment, the positive integer number of first-type signaling(s) comprised in the first configuration information is(are) Radio Resource Control (RRC) layer signaling(s).

In one embodiment, at least one of the positive integer number of first-type signaling(s) comprised in the first configuration information is an RRC layer Signaling.

In one embodiment, the positive integer number of first-type signaling(s) comprised in the first configuration information is (are respectively) one or more fields in a positive integer number of RRC Information Element(s) (IE).

In one embodiment, the positive integer number of first-type signaling(s) comprised in the first configuration information is (are respectively) a positive integer number of field(s) in an RRC IE.

In one embodiment, the first configuration information is used for indicating a signature sequence set, the signature sequence set comprising multiple signature sequences, with the first signature sequence being a signature sequence in the signature sequence set.

In one embodiment, the first configuration information is used for indicating a signature sequence set in a first association pattern period, the signature sequence set comprising multiple signature sequences, with the first signature sequence being a signature sequence in the signature sequence set.

In one embodiment, the first configuration information is used to configure the signature sequence set.

In one embodiment, the first configuration information is used to indicate a parameter of the signature sequence set.

In one embodiment, the first configuration information comprises configuration of a Physical Random Access Channel (PRACH) transmission.

In one embodiment, the first configuration information is used to indicate a positive integer number of Random Access Channel Occasion(s) (RO(s)).

In one embodiment, the first configuration information comprises a preamble index, a preamble subcarrier spacing, a preamble target power, a Random Access Radio Network Temporary Identity (RA-RNTI) and a PRACH resource.

In one embodiment, the first configuration information comprises Cell-specific random access parameters.

In one embodiment, the first configuration information comprises a format of any signature sequence in the signature sequence set.

In one embodiment, the first configuration information comprises time resources of any signature sequence in the signature sequence set.

In one embodiment, the first configuration information comprises frequency resources of any signature sequence in the signature sequence set.

In one embodiment, the first configuration information comprises the root sequences and cyclic shifts of the signature sequence set.

In one embodiment, the first configuration information comprises at least one of indexes in a logical root sequence table of the signature sequence set, cyclic shifts of the signature sequence set or a type of the signature sequence set.

In one embodiment, the first configuration information comprises a root sequence index of any signature sequence in the signature sequence set.

In one embodiment, the first configuration information comprises a subcarrier spacing of any signature sequence in the signature sequence set.

In one embodiment, the first configuration information comprises a transmit power of any signature sequence in the signature sequence set.

In one embodiment, the first configuration information comprises time-frequency resources reserved for the signature sequence set.

In one embodiment, the first configuration information indicates a positive integer number of first-type time-frequency resource block(s), where the first time-frequency resource block is one of the positive integer number of first-type time-frequency resource block(s).

In one embodiment, the positive integer number of first-type time-frequency resource block(s) indicated by the first configuration information belongs (belong) to the first association pattern period.

In one embodiment, the first configuration information indicates a positive integer number of first-type time-frequency resource block(s) in a first association pattern period, where the first time-frequency resource block is one of the positive integer number of first-type time-frequency resource block(s) in the first association pattern period.

In one embodiment, the positive integer number of first-type time-frequency resource block(s) in the first association pattern period is(are) reserved for the signature sequence set.

In one embodiment, the first time-frequency resource block is reserved for the first signature sequence.

In one embodiment, the first configuration information indicates the positive integer number of first-type time-frequency resource block(s) in the first association pattern period and the signature sequence set, where the positive integer number of first-type time-frequency resource block(s) is(are) reserved for the signature sequence set.

In one embodiment, any of the positive integer number of first-type time-frequency resource block(s) in the first association pattern period comprises multiple Resource Elements (REs).

In one embodiment, an RE occupies a multicarrier symbol in time domain, and a subcarrier in frequency domain.

In one embodiment, the positive integer number of first-type time-frequency resource block(s) in the first association pattern period is (are respectively) a positive integer number of RO(s).

In one embodiment, the positive integer number of RO(s) is (are respectively) a positive integer number of Physical Random Access Channel Occasion(s) (PRACH Occasion(s)).

In one embodiment, the first configuration information is used for indicating a PRACH in a Message A (MsgA) comprised in a Type-2 L1 Random Access Procedure.

In one embodiment, the first configuration information comprises an RRC IE RACH-ConfigGeneric.

In one embodiment, the definition of RACH-ConfigGeneric can be found in 3GPP TS38.331, Section 6.3.2.

In one embodiment, the first configuration information comprises a ra-ResponseWindow.

In one embodiment, the definition of ra-ResponseWindow can be found in 3GPP TS38.331, Section 6.3.2.

In one embodiment, the first configuration information comprises an RRC IE RACH-ConfigCommon.

In one embodiment, the definition of RRC IE RACH-ConfigCommon can be found in 3GPP TS38.331, Section 6.3.2.

In one embodiment, the first configuration information comprises an ssb-perRACH-OccasionAndCB-PreamblesPerSSB signaling.

In one embodiment, for the definition of the ssb-per-RACH-OccasionAndCB-PreamblesPerSSB signaling, refer to 3GPP TS38.331, Section 6.3.2.

In one embodiment, the first Association Pattern Period comprises a positive integer number of Radio Frame(s).

In one embodiment, the first association pattern period comprises a positive integer number of subframe (s).

In one embodiment, the first association pattern period comprises a positive integer number of slot(s).

In one embodiment, the first association pattern period comprises a positive integer number of multicarrier symbol(s).

In one embodiment, the first association pattern period is continuous in time.

In one embodiment, the first association pattern period is measured in milliseconds (ms).

In one embodiment, the first association pattern period is 10 milliseconds (ms).

In one embodiment, the first association pattern period is 20 milliseconds (ms).

In one embodiment, the first association pattern period is 40 milliseconds (ms).

In one embodiment, the first association pattern period is 80 milliseconds (ms).

In one embodiment, the first association pattern period is 160 milliseconds (ms).

In one embodiment, the first association pattern period can be up to 160 milliseconds (ms).

In one embodiment, the first association pattern period comprises one or more Association Periods.

In one embodiment, the first association pattern period comprises 16 Association Periods.

In one embodiment, the first association pattern period comprises 1 Association Period.

In one embodiment, any association period in the first association pattern period is a period in which a positive integer number of Synchronization Signal/Physical Broadcast Channel Block(s) (SS/PBCH Block(s)) is(are) associated with a positive integer number of RO(s).

In one embodiment, any of the positive integer number of SSB(s) is mapped to RO(s) at least for once within an Association Period.

In one embodiment, the said association period is comprised of a positive integer number of random access channel configuration period(s).

In one embodiment, the first association pattern period is comprised of a positive integer number of random access channel configuration period(s).

In one embodiment, a valid period of the first configuration information is a random access channel configuration period in the association period.

In one embodiment, a valid period of the first configuration information is the first association pattern period.

In one embodiment, the first configuration information comprises a positive integer number of piece(s) of first-type sub-configuration-information, the positive integer number of piece(s) of first-type sub-configuration-information (respectively) corresponding to the positive integer number of random access channel configuration period(s) comprised in the first association pattern period.

In one embodiment, a valid period of any piece of first-type sub-configuration-information in the first configuration information is a random access channel configuration period in the first association pattern period.

In one embodiment, any piece of first-type sub-configuration-information in the first configuration information is used for configuring a positive integer number of first-type time-frequency resource block(s) in a physical random access channel configuration period comprised in the first association pattern period.

In one embodiment, any piece of first-type sub-configuration-information in the first configuration information is used for configuring a positive integer number of first-type time-frequency resource block(s) in an association period comprised in the first association pattern period.

In one embodiment, the first configuration information is used for configuring a positive integer number of first-type time-frequency resource block(s) comprised in the first association pattern period.

In one embodiment, the positive integer number of first-type time-frequency resource block(s) in the first association pattern period is(are) reserved for the signature sequence set.

In one embodiment, any association period in the first association pattern period is a period of time during which a mapping relation is maintained between a downlink synchronization and broadcast signal and a random access channel occasion.

In one embodiment, the second configuration information comprises a higher-layer signaling.

In one embodiment, the second configuration information comprises a SIB.

In one embodiment, the second configuration information comprises a MIB.

In one embodiment, the second configuration information comprises System Information transmitted on a Broadcast Channel (BCH).

In one embodiment, the second configuration information comprises a positive integer number of second-type signaling(s).

In one embodiment, the positive integer number of second-type signaling(s) comprised in the second configuration information is(are) Higher Layer Signalling(s).

In one embodiment, the positive integer number of second-type signaling(s) comprised in the second configuration information is(are) RRC Layer Signalling(s).

In one embodiment, at least one of the positive integer number of second-type signaling(s) comprised in the second configuration information is an RRC layer Signalling.

In one embodiment, the positive integer number of second-type signaling(s) comprised in the second configuration information is (are respectively) one or more fields in a positive integer number of RRC IE(s).

In one embodiment, the positive integer number of second-type signaling(s) comprised in the second configuration information is (are respectively) a positive integer number of field(s) in an RRC IE.

In one embodiment, the second configuration information is used to indicate multiple shared resource units, where a first shared resource unit is one of the multiple shared resource units indicated by the second configuration information.

In one embodiment, the second configuration information is used to indicate multiple shared resource units in the first association pattern period, where a first shared resource unit is one of the multiple shared resource units indicated by the second configuration information.

In one embodiment, the second configuration information is used to indicate a positive integer number of second-type time-frequency resource block(s), any of the positive integer number of second-type time-frequency resource block(s) comprising multiple REs.

In one embodiment, the second configuration information is used to indicate a positive integer number of second-type time-frequency resource block(s) in the first association pattern period, any second-type time-frequency resource block in the first association pattern period comprising multiple REs.

In one embodiment, any of the positive integer number of second-type time-frequency resource block(s) comprises a Physical Uplink Shared Channel (PUSCH).

In one embodiment, any second-type time-frequency resource block in the first association pattern period comprises a PUSCH.

In one embodiment, any second-type time-frequency resource block in the first association pattern period is a PUSCH Occasion (PO).

In one embodiment, the second configuration information is used to indicate one or multiple Reference Signal resources (RS resources) in any of the positive integer number of second-type time-frequency resource block(s).

In one embodiment, the second configuration information is used to indicate one or multiple Reference Signal resources (RS resources) in any of the positive integer number of second-type time-frequency resource block(s) in the first association pattern period.

In one embodiment, one or multiple Reference Signal resources (RS resources) in any of the positive integer number of second-type time-frequency resource block(s) in the first association pattern period is (are respectively) one or multiple Demodulation Reference Signal resources (DMRS resources).

In one embodiment, one or multiple Reference Signal resources (RS resources) in any of the positive integer number of second-type time-frequency resource block(s) in the first association pattern period is (are respectively) one or multiple Demodulation Reference Signal resources (DMRS resources) used for PUSCH transmission.

In one embodiment, one or multiple Reference Signal resources (RS resources) in any of the positive integer number of second-type time-frequency resource block(s) in the first association pattern period is (are respectively) one or multiple Channel State Information-Reference Signal resources (CSI-RS resources).

In one embodiment, the second configuration information comprises second sub-configuration-information and third sub-configuration-information, where the second sub-configuration-information is used to indicate the positive integer number of second-type time-frequency resource block(s) in the first association pattern period, while the third sub-configuration-information is used to indicate one or multiple Reference Signal resources (RS resources) in any of the positive integer number of second-type time-frequency resource block(s) in the first association pattern period.

In one embodiment, the multiple shared resource units indicated by the second configuration information are respectively the positive integer number of second-type time-frequency resource blocks in the first association pattern period.

In one embodiment, the multiple shared resource units indicated by the second configuration information are respectively multiple combinations of multiple RS resources on a second-type time-frequency resource block in the first association pattern period and the second-type time-frequency resource block.

In one embodiment, the multiple shared resource units in the first association pattern period occupy the same time-frequency resources, and the multiple shared resource units in the first association pattern period respectively correspond to multiple RS resources on a second-type time-frequency resource block in the first association pattern period.

In one embodiment, any of the multiple shared resource units indicated by the second configuration information is a second-type time-frequency resource block in the first association pattern period and an RS resource on the second-type time-frequency resource block.

In one embodiment, any of the multiple shared resource units indicated by the second configuration information is a combination of a second-type time-frequency resource block in the first association pattern period and an RS resource on the second-type time-frequency resource block.

In one embodiment, a first target shared resource unit and a second target shared resource unit are respectively two shared resource units among multiple shared resource units indicated by the second configuration information.

In one embodiment, the first target shared resource unit is a combination of a first target time-frequency resource block and an RS resource among multiple RS resources on the first target time-frequency resource block, while the second target shared resource unit is a combination of a second target time-frequency resource block and an RS resource among multiple RS resources on the second target time-frequency resource block; the first target time-frequency resource block and the second target time-frequency resource block are respectively two second-type time-frequency resource blocks among the positive integer number of second-type time-frequency resource blocks in the first association pattern period.

In one embodiment, the first target shared resource unit is a combination of a first target time-frequency resource block and a first RS resource on the first target time-frequency resource block, while the second target shared resource unit is a combination of the first target time-frequency resource block and a second RS resource on the first target time-frequency resource block; the first target time-frequency resource block is one of the positive integer number of second-type time-frequency resource blocks in the first association pattern period, the first RS resource and the second RS resource respectively being two RS resources among multiple RS resources on the first target time-frequency resource block.

In one embodiment, a radio signal being transmitted on a first target shared resource unit among the multiple shared resource units indicated by the second configuration information means the radio signal occupying the first target time-frequency resource block in the first association pattern period, the radio signal using the first target reference signal resource on the first target time-frequency resource block, the first target time-frequency resource block being a second-type time-frequency resource block in the first association pattern period, the first target reference signal resource being one of multiple reference signal resources on the second-type time-frequency resource block in the first association pattern period.

In one embodiment, the second configuration information comprises an msgA-PUSCH-config.

In one embodiment, the definition of msgA-PUSCH-config can be found in 3GPP TS38.331.

In one embodiment, the second configuration information comprises an msgA-DMRS-configuration.

In one embodiment, the definition of msgA-DMRS-configuration can be found in 3GPP TS38.331.

In one embodiment, the first message comprises the first signature sequence.

In one embodiment, the first message comprises the first signature sequence and the first data.

In one embodiment, the first message only comprises the first signature sequence between the first signature sequence and the first data.

In one embodiment, the first message comprises the first signature sequence but does not comprise the first data.

In one embodiment, the first message comprises the first signature sequence and the first data, where the first signature sequence is transmitted on the first time-frequency resource block, and the first data is transmitted on a first shared resource unit, the first shared resource unit being one of the multiple shared resource units indicated by the second configuration information, the first signature sequence being mapped to the first shared resource unit.

In one embodiment, the first message comprises the first signature sequence but does not comprise the first data, the first signature sequence being transmitted on the first time-frequency resource block.

In one embodiment, when the first signature sequence is associated with a shared channel resource unit among the multiple shared resource units indicated by the second configuration information, the first message comprises the first signature sequence and the first data.

In one embodiment, the first signature sequence isn't associated with any shared channel resource unit among the multiple shared resource units indicated by the first configuration information, the first message comprising the first signature sequence and not comprising the first data.

In one embodiment, when the first signature sequence is associated with a shared channel resource unit among the multiple shared resource units indicated by the first configuration information, the first message comprises the first signature sequence and the first data; when the first signature sequence isn't associated with any shared channel resource unit among the multiple shared resource units indicated by the first configuration information, the first message comprises the first signature sequence but does not comprise the first data.

In one embodiment, when the first signature sequence is associated with a shared channel resource unit among the multiple shared resource units indicated by the first configuration information, the first message comprises the first signature sequence and the first data, where the first signature sequence is transmitted on the first time-frequency resource block, and the first data is transmitted on a shared channel resource unit among the multiple shared resource units indicated by the first configuration information; when the first signature sequence isn't associated with any shared channel resource unit among the multiple shared resource units indicated by the first configuration information, the first message comprises the first signature sequence but does not comprise the first data, the first signature sequence being transmitted on the first time-frequency resource block.

In one embodiment, the first message is a first message comprised in a Random Access Procedure.

In one embodiment, the first message is a first message comprised in a 2-Step Random Access Procedure.

In one embodiment, the first message is a first step comprised in a 2-Step Random Access Procedure.

In one embodiment, the first message is a Message A (MsgA) comprised in a Type-2 L1 Random Access Procedure.

In one embodiment, the definition of the Type-2 L1 Random Access Procedure is given in 3GPP TS38.213, Section 8.

In one embodiment, the first message comprises a Physical Random Access Channel (PRACH).

In one embodiment, the first message comprises a PRACH and a Physical Uplink Shared Channel (PUSCH).

In one embodiment, the first message comprises a PRACH, but does not comprise any PUSCH.

In one embodiment, the first message comprises a Random Access Preamble of an MsgA in a Type-2 L1 random access procedure.

In one embodiment, the first message comprises a Random Access Preamble and a PUSCH of an MsgA in a Type-2 L1 random access procedure.

In one embodiment, the first message comprises a PRACH and a PUSCH of an MsgA in a Type-2 L1 random access procedure.

In one embodiment, the first message only comprises a PRACH preamble of an MsgA in a Type-2 L1 random access procedure, and the first message group does not comprise a PUSCH.

In one embodiment, the first signature sequence is a pseudo-random sequence.

In one embodiment, the first signature sequence is a Gold sequence.

In one embodiment, the first signature sequence is an M sequence.

In one embodiment, the first signature sequence is a ZC sequence.

In one embodiment, the first signature sequence is a PRACH preamble.

In one embodiment, the first signature sequence is a random access preamble of an MsgA in a Type-2 L1 random access procedure.

In one embodiment, the first signature sequence is a preamble of a 2-step random access procedure.

In one embodiment, the first signature sequence is one of the multiple signature sequences comprised in the signature sequence set configured by the first configuration information.

In one embodiment, the first node selects the first signature sequence from the signature sequence set configured by the first configuration information.

In one embodiment, the first signature sequence is selected by the first node itself from the multiple signature sequences comprised in the signature sequence set configured by the first configuration information.

In one embodiment, the first signature sequence is randomly selected by the first node from the multiple signature sequences comprised in the signature sequence set configured by the first configuration information.

In one embodiment, the first signature sequence is selected by the first node at an equal probability from the multiple signature sequences comprised in the signature sequence set configured by the first configuration information.

In one embodiment, any of the multiple signature sequences comprised in the signature sequence set configured by the first configuration information is selected to be the first signature sequence with equal probability.

In one embodiment, at least two of the multiple signature sequences comprised in the signature sequence set configured by the first configuration information are selected to be the first signature sequence with unequal probabilities.

In one embodiment, the multiple signature sequences comprised in the signature sequence set are all pseudo-random sequences.

In one embodiment, the multiple signature sequences comprised in the signature sequence set are all Gold sequences.

In one embodiment, the multiple signature sequences comprised in the signature sequence set are all M sequences.

In one embodiment, the multiple signature sequences comprised in the signature sequence set are all ZC sequences.

In one embodiment, the multiple signature sequences comprised in the signature sequence set are all PRACH preambles.

In one embodiment, the signature sequence set comprises multiple signature sequence groups, where a first signature sequence group is one of the multiple signature sequence groups comprised in the signature sequence set, and the first signature sequence group comprises multiple signature sequences, the first signature sequence being a signature sequence in the first signature sequence group.

In one embodiment, the first time-frequency resource block is reserved for the first signature sequence group.

In one embodiment, the first time-frequency resource block is occupied by the first signature sequence.

In one embodiment, the first signature sequence group is used to determine the first time-frequency resource block.

In one embodiment, the first signature sequence is used to determine the first time-frequency resource block.

In one embodiment, after being through Discrete Fourier Transform (DFT) the first signature sequence goes through Orthogonal Frequency Division Multiplexing (OFDM) modulation processing to generate the first message.

In one embodiment, the first signature sequence, after being through DFT and OFDM modulation processing, is mapped to the first time-frequency resource block.

In one embodiment, the first data is a baseband signal.

In one embodiment, the first data is a radio frequency signal.

In one embodiment, the first data is a radio signal.

In one embodiment, the first data is transmitted on a UL-SCH.

In one embodiment, the first data is transmitted on a PUSCH.

In one embodiment, the first data comprises all or part of a Higher Layer signaling.

In one embodiment, the first data comprises all or part of an RRC Layer signaling.

In one embodiment, the first data comprises one or more fields in an RRC IE.

In one embodiment, the first data comprises all or part of a Multimedia Access Control (MAC) layer signaling.

In one embodiment, the first data comprises one or more fields in a MAC Control Element (CE).

In one embodiment, the first data comprises one or more fields in a PHY layer signaling.

In one embodiment, the first signature sequence is a random access preamble, while the first data comprises RRC-Connection related information.

In one embodiment, the first signature sequence is a random access preamble, while the first data comprises Small Data.

In one embodiment, the first signature sequence is a random access preamble, while the first data comprises Control-Plane (C-Plane) information.

In one embodiment, the first signature sequence is a random access preamble, while the first data comprises User-Plane (U-Plane) information.

In one embodiment, the first signature sequence is a random access preamble, while the first data comprises an RRC Message.

In one embodiment, the first signature sequence is a random access preamble, while the first data comprises a Non Access Stratum (NAS) Message.

In one embodiment, the first signature sequence is a random access preamble, while the first data comprises Service Data Adaptation Protocol (SDAP) data.

In one embodiment, the first signature sequence is a PRACH, while the first data is a PUSCH.

In one embodiment, the first signature sequence is a PRACH preamble of an MsgA in a Type-2 L1 random access procedure, and the first data is a PUSCH payload of an MsgA in a Type-2 L1 random access procedure.

In one embodiment, a channel occupied by the first signature sequence includes a RACH, while a channel occupied by the first data includes an Uplink Shared Channel (UL-SCH).

In one embodiment, a channel occupied by the first signature sequence includes a PRACH, while a channel occupied by the first data includes a PUSCH.

In one embodiment, the RRC-Connection related information comprises at least one of an RRC Setup Request, an RRC Resume Request, an RRC Resume Request1, an RRC Reestablishment Request, an RRC Reconfiguration Complete, an RRC Handover Confirm or an RRC Early Data Request.

In one embodiment, the RRC-Connection related information comprises at least one of an RRC Connection Request, an RRC Connection Resume Request, an RRC Connection Re-establishment, an RRC Handover Confirm, or an RRC Connection Reconfiguration Complete, an RRC Early Data Request, an RRC Setup Request, or an RRC Resume Request, an RRC Resume Request1, an RRC Reestablishment Request, or an RRC Reconfiguration Complete.

In one embodiment, a first bit block comprises a positive integer number of bit(s), and the first data comprises all or partial bit(s) in the first bit block.

In one embodiment, a first bit block is used for generating the first data, the first bit block comprising a positive integer number of bit(s).

In one embodiment, a first bit block comprises a positive integer number of bits, where all or partial bit(s) among the positive integer number of bits comprised in the first bit block is/are used for generating the first data.

In one embodiment, the first bit block comprises a Codeword (CW).

In one embodiment, the first bit block comprises a Code Block (CB).

In one embodiment, the first bit block comprises a Code Block Group (CBG).

In one embodiment, the first bit block comprises a Transport Block (TB).

In one embodiment, the first data is obtained by all or part of bits in the first bit block sequentially through Cyclic Redundancy Check (CRC) Attachment, Code Block Segmentation, CB-level CRC Attachment, Channel Coding, Rate matching, Code Block Concatenation, Scrambling, and Modulation, Layer Mapping, Antenna Port Mapping, Mapping to Physical Resource Blocks and Baseband Signal Generation, and Modulation and Up conversion.

In one embodiment, the first data is an output by the first bit block sequentially through a Modulation Mapper, a Layer Mapper, Precoding, a Resource Element Mapper and Multicarrier Symbol Generation.

In one embodiment, the channel coding is based on a polar code.

In one embodiment, the channel coding is based on a Low-density Parity-Check (LDPC) code.

In one embodiment, only the first bit block is used for generating the first data.

In one embodiment, there is at least one bit block other than the first bit block being used for generating the first data.

In one embodiment, the first time-frequency resource block is a first-type time-frequency resource block selected by the first node itself from the positive integer number of first-type time-frequency resource block(s) in the first association pattern period.

In one embodiment, the first time-frequency resource block is indicated by a transmitter of the first configuration information.

In one embodiment, the first configuration information indicates an index of the first time-frequency resource block in the positive integer number of first-type time-frequency resource block(s) in the first association pattern period.

In one embodiment, the first time-frequency resource block comprises multiple REs.

In one embodiment, the first time-frequency resource block occupies a positive integer number of slot(s) in time domain.

In one embodiment, the first time-frequency resource block occupies a positive integer number of Physical Resource Block(s) (PRB(s)) in frequency domain.

In one embodiment, the first time-frequency resource block occupies a positive integer number of multicarrier symbol(s) in time domain.

In one embodiment, the first time-frequency resource block occupies a positive integer number of subcarrier(s) in frequency domain.

In one embodiment, the first time-frequency resource block comprises a PRACH.

In one embodiment, the first time-frequency resource block comprises a RO.

In one embodiment, the first time-frequency resource block comprises multiple ROs.

In one embodiment, any of the positive integer number of multicarrier symbol(s) is an Orthogonal Frequency Division Multiplexing (OFDM) Symbol.

In one embodiment, any of the multiple multicarrier symbol(s) is a Single-Carrier Frequency Division Multiple Access (SC-FDMA) symbol.

In one embodiment, any of the positive integer number of multicarrier symbol(s) is a Discrete Fourier Transform Spread Orthogonal Frequency Division Multiplexing (DFT-S-OFDM) Symbol.

In one embodiment, any of the positive integer number of multicarrier symbol(s) is a Frequency Division Multiple Access (FDMA) symbol.

In one embodiment, any of the positive integer number of multicarrier symbol(s) is a Filter Bank Multi-Carrier (FBMC) symbol.

In one embodiment, any of the positive integer number of multicarrier symbol(s) is an Interleaved Frequency Division Multiple Access (IFDMA) symbol.

In one embodiment, whether the first signature sequence is mapped to one of the multiple shared resource units comprises one of the first signature sequence being mapped to one of the multiple shared resource units or the first signature sequence not being mapped to any of the multiple shared resource units.

In one embodiment, whether the first signature sequence is mapped to one of the multiple shared resource units comprises the first signature sequence being mapped to one of the multiple shared resource units.

In one embodiment, whether the first signature sequence is mapped to one of the multiple shared resource units comprises the first signature sequence not being mapped to any of the multiple shared resource units.

In one embodiment, the first signature sequence being mapped to one of the multiple shared resource units means that the first signature sequence is used to determine one of the multiple shared resource units indicated by the second configuration information.

In one embodiment, the first signature sequence being mapped to one of the multiple shared resource units means that the first signature sequence is used to determine one of the multiple shared resource units in the first association pattern period.

In one embodiment, the first signature sequence being mapped to one of the multiple shared resource units means that the first signature sequence is mapped to a first shared resource unit, the first shared resource unit being one of the multiple shared resource units in the first association pattern period indicated by the second configuration information.

In one embodiment, the first signature sequence is used to determine an index of the first shared resource unit in the multiple shared resource units in the first association pattern period.

In one embodiment, the first signature sequence is used for time-frequency resources occupied by the first shared resource unit.

In one embodiment, the first signature sequence is used to determine one of the positive integer number of second-type time-frequency resource block(s) in the first association pattern period.

In one embodiment, the first signature sequence is used to determine one of the positive integer number of second-type time-frequency resource block(s) in the first association pattern period and a reference signal (RS) resource on the second-type time-frequency resource block.

In one embodiment, an index of the first signature sequence in the multiple signature sequences comprised in the signature sequence set is used to determine the first shared resource unit in the first association pattern period.

In one embodiment, an index of the first signature sequence in the multiple signature sequences comprised in the signature sequence set in the first association pattern period is used to determine the first shared resource unit in the first association pattern period.

In one embodiment, an index of the first signature sequence in the multiple signature sequences comprised in the signature sequence set in the first association pattern period is used to determine an index of the first shared resource unit in the multiple shared channel resource units in the first association pattern period.

In one embodiment, the first signature sequence is mapped to one of the multiple shared resource units, the first message comprising the first signature sequence and the first data, where the first data is transmitted on one of the multiple shared resource units.

In one embodiment, the first signature sequence is mapped to one of the multiple shared resource units, the first message comprising the first signature sequence and the first data, where the first data is transmitted on one of the multiple shared resource units comprised in the first association pattern period.

In one embodiment, the first signature sequence is not mapped to any of the multiple shared resource units, where the first signature sequence is not used to determine any of the multiple shared resource units in the first association pattern period.

In one embodiment, the first signature sequence isn't mapped to any shared resource unit among the multiple shared resource units, the first message only comprising the first signature sequence but not comprising the first data.

In one embodiment, the first signature sequence isn't mapped to any shared resource unit among the multiple shared resource units, before receiving a second message, transmitting the first data is dropped.

In one embodiment, the first signature sequence isn't mapped to any shared resource unit among the multiple shared resource units, before receiving a second message, transmitting the first data on any shared resource unit within the first association pattern period is dropped.

In one embodiment, the phrase that transmitting the first data is dropped means that a transmit power of the first data is 0.

In one embodiment, the phrase that transmitting the first data is dropped means that the first data is not generated in the baseband.

In one embodiment, the signature sequence set in the first association pattern period indicated by the first configuration information comprises the Q signature sequences; and the second configuration information indicates the P shared resource units in the first association pattern period; the Q signature sequences in the first association pattern period are mapped to the P shared resource units in the first association pattern period; both Q and P are positive integers.

In one embodiment, the signature sequence set in the first association pattern period indicated by the first configuration information comprises the Q signature sequences; and the second configuration information indicates the P shared resource units in the first association pattern period; the Q signature sequences in the first association pattern period are mapped to the P shared resource units in the first association pattern period according to a given order; both Q and P are positive integers.

In one embodiment, the Q signature sequences comprised in the signature sequence set in the first association pattern period are all valid.

In one embodiment, the P shared resource units in the first association pattern period are all valid.

In one embodiment, any of the Q signature sequences in the first association pattern period is mapped to one of the P shared resource units in the first association pattern period.

In one embodiment, the signature sequence set in the first association pattern period comprises a first signature sequence set and a second signature sequence set, the first signature sequence set comprising a positive integer number of signature sequence(s) and the second signature sequence set comprising a positive integer number of signature sequence(s); any signature sequence in the first signature sequence set is mapped to one of the P shared resource units in the first association pattern period; any signature sequence in the second signature sequence set is not mapped to any of the P shared resource units in the first association pattern period.

In one embodiment, each of the positive integer number of signature sequence(s) comprised in the first signature sequence set belongs to the Q signature sequences in the first association pattern period.

In one embodiment, each of the positive integer number of signature sequence(s) comprised in the second signature sequence set belongs to the Q signature sequences in the first association pattern period.

In one embodiment, the signature sequence set in the first association pattern period comprises a positive integer number of signature sequence group(s), any of the positive integer number of signature sequence group(s) comprises N signature sequences, N being a positive integer.

In one embodiment, the N is equal to a quotient of Q and P being rounded up to a nearest integer.

In one embodiment, N=ceil(Q/P).

In one embodiment, N indexes for the N signature sequences comprised in a signature sequence group in the first association pattern period in the signature sequence set in the first association pattern period are consecutive.

In one embodiment, the N signature sequences comprised in a signature sequence group in the first association pattern period are mapped according to an order of firstly in frequency domain, then in code domain and finally in time domain to the P shared resource units in the first association pattern period.

In one embodiment, a first signature sequence group and a second signature sequence group are respectively two signature sequence groups among the positive integer number of signature sequence groups in the first association pattern period; each of indexes of N signature sequences comprised in the first signature sequence group is smaller than each of indexes of N signature sequences comprised in the second signature sequence group; the first signature sequence group is mapped onto a first target shared resource unit in the first association pattern period while the second signature sequence group is mapped onto a second target shared resource unit in the first association pattern period; the first target shared resource unit and the second target shared resource unit are two shared resource units in the first association pattern period.

In one subembodiment, the first target shared resource unit and the second target shared resource unit occupy the same time-domain resources, and the first target time-frequency resource block and the second time-frequency resource block are Frequency Division Multiplexing (FDM), where an index of the first target time-frequency resource block in the same time-domain resources is smaller than that of the second time-frequency resource block in the same time-domain resources.

In one subembodiment, the first target time-frequency resource block occupied by the first target shared resource unit is the same as the second target time-frequency resource block occupied by the second target shared resource unit, while an index of the first reference signal (RS) resource used by the first target shared resource unit in the multiple RS resources on the first target time-frequency resource block is smaller than an index of the second RS resource used by the second target shared resource unit in the multiple RS resources on the second target time-frequency resource block.

In one subembodiment, the first target shared resource unit and the second target shared resource unit are Time Division Multiplexing (TDM), and the first target time-frequency resource block is earlier than the second target time-frequency resource block in time domain.

In one embodiment, the second message comprises a baseband signal.

In one embodiment, the second message comprises a radio frequency signal.

In one embodiment, the second message comprises a radio signal.

In one embodiment, a channel occupied by the second message comprises a Physical Downlink Control Channel (PDCCH).

In one embodiment, channels occupied by the second message comprise a PDCCH and a Physical Downlink Shared Channel (PDSCH).

In one embodiment, the second message comprises Downlink Control Information (DCI).

In one embodiment, the second message comprises a Random Access Response (RAR).

In one embodiment, the second message comprises a fallbackRAR.

In one embodiment, the definition of fallbackRAR can be found in 3GPP TS38.321.

In one embodiment, the second message comprises a DCI and an RAR.

In one embodiment, the second message comprises a Timing Advance Command.

In one embodiment, the second message comprises a RAR Grant.

In one embodiment, the first message is a first message in a random access procedure, and the second message is a second message in the random access procedure.

In one embodiment, the first message is an MsgA in a Type-2 L1 random access procedure, and the second message is an MsgB in the Type-2 L1 random access procedure.

In one embodiment, the second message comprises all or part of a MAC layer signaling.

In one embodiment, the second message comprises one or more fields in a MAC CE.

In one embodiment, the second message comprises one or more fields in a MAC Protocol Data Unit (PDU).

In one embodiment, the second message is a MAC PDU.

In one embodiment, the second message is a MAC Sub Protocol Data Unit (subPDU).

In one embodiment, the second message comprises multiple MAC subPDUs.

In one embodiment, one of the multiple MAC subPDUs comprised in the second message comprises a MAC sub-header.

In one embodiment, one of the multiple MAC subPDUs comprised in the second message comprises a MAC sub-header and a MAC payload.

In one embodiment, one of the multiple MAC subPDUs comprised in the second message comprises a MAC sub-header that only carries a Backoff Indicator.

In one embodiment, at least one of the multiple MAC subPDUs comprised in the second message comprises a MAC subheader that only carries one of the positive integer number of first-type identifier(s).

In one embodiment, at least one of the multiple MAC subPDUs comprised in the second message comprises a fallbackRAR.

In one embodiment, the second message comprises all or part of a Higher Layer signaling.

In one embodiment, the second message comprises one or more fields in a physical (PHY) layer.

In one embodiment, the second message comprises a positive integer number of field(s), the first field being one of the positive integer number of field(s) comprised in the second message.

In one embodiment, the first field is one of the multiple MAC subPDUs comprised in the second message.

In one embodiment, the first field is an RAR Grant in the second message.

In one embodiment, an RAR Grant in the second message comprises a positive integer number of field(s), the first field being one of the positive integer number of field(s) comprised in the RAR Grant in the second message.

In one embodiment, information indicated by the first field comprises frequency-domain resources of the second time-frequency resource block.

In one embodiment, information indicated by the first field comprises time-domain resources of the second time-frequency resource block.

In one embodiment, information indicated by the first field comprises a Transmit Power Control Command (TPC Command).

In one embodiment, information indicated by the first field comprises a transmit power adjustment of the third message.

In one embodiment, information indicated by the first field comprises a CSI request.

In one embodiment, information indicated by the first field comprises a TPC Command and a CSI request.

In one embodiment, information indicated by the first field comprises frequency-domain resources of the second time-frequency resource block and time-domain resources of the second time-frequency resource block.

In one embodiment, the first field comprises a positive integer number of bit(s).

In one embodiment, the information indicated by the first field is related to whether the first message comprises the first data.

In one embodiment, the first message comprises the first signature sequence and the first data, while information indicated by the first field is a HARQ version of the third message.

In one embodiment, the first message comprises the first signature sequence and the first data, while information indicated by the first field is whether a Redundancy Version (RV) of a HARQ of the third message is different from that of the first data.

In one embodiment, the first message comprises the first signature sequence but does not comprise the first data, while information indicated by the first field is reserved.

In one embodiment, the first message comprises the first signature sequence but does not comprise the first data, while information indicated by the first field is a CSI request.

In one embodiment, the first message comprises the first signature sequence and the first data, while information indicated by the first field comprises a transmit power control value of 5 transmit power control values.

In one embodiment, the first message comprises the first signature sequence but does not comprise the first data, while information indicated by the first field comprises a transmit power control value of 8 transmit power control values.

In one embodiment, the second message comprises a response for the first message.

In one embodiment, the second message carries a first identifier, and the first message carries the first identifier.

In one embodiment, the first identifier is used for scrambling the second message.

In one embodiment, the first identifier is an RNTI.

In one embodiment, the first identifier is an MsgB-RNTI.

In one embodiment, the first identifier is used for identifying the first signature sequence.

In one embodiment, the first identifier is a Random Access Preamble Identifier (RAPID).

In one embodiment, the first identifier is an Extended RAPID.

In one embodiment, the second message carries a positive integer number of first-type identifier(s), while the first message carries the first identifier, the first identifier being one of the positive integer number of first-type identifier(s).

In one embodiment, one of the positive integer number of first-type identifier(s) is a RAPID.

In one embodiment, one of the positive integer number of first-type identifier(s) is an Extended RAPID.

In one embodiment, one of the positive integer number of first-type identifier(s) is used for identifying one of multiple signature sequences on the first time-frequency resource block.

In one embodiment, one of the positive integer number of first-type identifier(s) is a RA-RNTI.

In one embodiment, one of the positive integer number of first-type identifier(s) is an MsgB-RNTI.

In one embodiment, the second message indicates whether the first message is correctly received.

In one embodiment, the second message indicates that the first message is correctly received.

In one embodiment, the second message indicates that the first message is not correctly received.

In one embodiment, the second message indicates that the first signature sequence in the first message is correctly received.

In one embodiment, the second message indicates that the first signature sequence in the first message is correctly received, and that the first data in the first message is not correctly received.

In one embodiment, the phrase that "the second message indicates that the first message is correctly received" means that: the first message comprises a former one of the first signature sequence and the first data, and the second message indicates that the first signature sequence in the first message is correctly received.

In one embodiment, the phrase that "the second message indicates that the first message is correctly received" means that: the first message comprises the first signature sequence and the first data, and the second message indicates that the first signature sequence in the first message is correctly received and that the first data in the first message is not correctly received.

In one embodiment, the first message comprises the former one of the first signature sequence and the first data, while the second message indicates that the first message is correctly received.

In one embodiment, the first message comprises the first signature sequence but does not comprise the first data, the second message indicating that the first signature sequence is correctly received.

In one embodiment, the first message comprises the first signature sequence and the first data, while the second message is used to indicate that the first signature sequence is correctly received, and that the first data is not correctly received.

In one embodiment, the second message carries the first identifier, and the first signature sequence in the first message is correctly received.

In one embodiment, the second message carries the first identifier, the first signature sequence in the first message is correctly received, and the first data in the first message is not correctly received.

In one embodiment, the second message carries the positive integer number of first-type identifier(s), with the first identifier being one of the positive integer number of first-type identifier(s), and the first signature sequence in the first message is correctly received.

In one embodiment, the second message carries the positive integer number of first-type identifier(s), with the first identifier being one of the positive integer number of first-type identifier(s), and the first signature sequence in the first message is correctly received, and the first data in the first message is not correctly received.

In one embodiment, the first message comprises the first signature sequence and the first data, where the first signature sequence is used to indicate the first identifier, and the first data carries a second identifier, the second message carries the first identifier, but the second message does not comprise the second identifier.

In one embodiment, the second identifier is a Temporary Cell-RNTI (TC-RNTI).

In one embodiment, the second identifier is a Cell-RNTI (C-RNTI).

In one embodiment, the second identifier is a random number.

In one embodiment, the phrase of being correctly received comprises: performing channel decoding on a radio signal, of which a result is passed by CRC.

In one embodiment, the phrase of being correctly received comprises: performing energy detection on the radio signal within a period of time, yielding a result of which an average value within the period exceeds a first given threshold.

In one embodiment, the phrase of being correctly received comprises: performing coherent detection on the radio signal, through which a signal energy obtained exceeds a second given threshold.

In one embodiment, the first message being correctly received comprises: performing coherent detection on the first signature sequence in the first message, through which a signal energy obtained exceeds the second given threshold.

In one embodiment, the first message being correctly received comprises: the first message comprising a former one of the first signature sequence and the first data, performing coherent detection on the first signature sequence in the first message group, through which a signal energy obtained exceeds the second given threshold.

In one embodiment, the first signal not being correctly received comprises: a result of performing channel decoding on the first data in the first message does not pass CRC check, where the first bit block is used for generating the first data.

In one embodiment, the first message not being correctly received comprises: performing coherent detection on the first signature sequence in the first message, through which a signal energy obtained exceeds the second given threshold; a result of performing channel decoding on the first data in the first message does not pass CRC check, where the first bit block is used for generating the first data.

In one embodiment, the first data not being correctly received comprises: a result of performing channel decoding on the first data does not pass CRC check, where the first bit block is used for generating the first data.

In one embodiment, the channel decoding is based on Viterbi Algorithm.

In one embodiment, the channel decoding is based on iteration.

In one embodiment, the channel decoding is based on Belief Propagation (BP) Algorithm.

In one embodiment, the channel decoding is based on Log Likelihood Ratio (LLR)-BP Algorithm.

In one embodiment, the second time-frequency resource block is used for transmitting the third message.

In one embodiment, the second time-frequency resource block comprises a PUSCH.

In one embodiment, the second time-frequency resource block comprises a Physical Uplink Control Channel (PUCCH).

In one embodiment, the second time-frequency resource block comprises a PO.

In one embodiment, the second time-frequency resource block comprises multiple REs.

In one embodiment, the second time-frequency resource block occupies a positive integer number of slot(s) in time domain.

In one embodiment, the first time-frequency resource block occupies a positive integer number of multicarrier symbol(s) in time domain.

In one embodiment, the second time-frequency resource block occupies a positive integer number of Physical Resource Block(s) (PRB(s)) in frequency domain.

In one embodiment, the second time-frequency resource block occupies a positive integer number of multicarrier(s) in frequency domain.

In one embodiment, the second time-frequency resource block is one of the positive integer number of second-type time-frequency resource block(s) in the first association pattern period.

In one embodiment, the second time-frequency resource block is indicated by the second message.

In one embodiment, the second message comprises frequency-domain resources of the second time-frequency resource block.

In one embodiment, the second message comprises time-domain resources of the second time-frequency resource block.

In one embodiment, the second message indicates an index of the second time-frequency resource block in the positive integer number of second-type time-frequency resource block(s) in the first association pattern period.

In one embodiment, the first message comprises the first signature sequence and the first data, the first data being an Initial Transmission of the first bit block, and the third message being a Retransmission of the first bit block.

In one embodiment, the first message comprises the former one of the first signature sequence and the first data, the third message being an initial transmission of the first bit block.

In one embodiment, the first message comprises the first signature sequence but does not comprise the first data, the third message being an initial transmission of the first bit block.

In one embodiment, the third message is a baseband signal.

In one embodiment, the third message is a radio frequency signal.

In one embodiment, the third message is a radio signal.

In one embodiment, the third message is transmitted on a UL-SCH.

In one embodiment, the third message is transmitted on a PUSCH.

In one embodiment, the third message comprises all or part of a Higher Layer signaling.

In one embodiment, the third message comprises all or part of an RRC layer signaling.

In one embodiment, the third message comprises one or more fields in an RRC IE.

In one embodiment, the third message comprises all or part of a MAC layer signaling.

In one embodiment, the third message comprises one or more fields in a MAC CE.

In one embodiment, the third message comprises one or more fields in a PHY layer signaling.

In one embodiment, the third message comprises an RRC Connection information.

In one embodiment, the third message comprises a small data packet.

In one embodiment, the third message comprises control-plane information.

In one embodiment, the third message comprises user-plane information.

In one embodiment, the third message comprises an RRC message.

In one embodiment, the third message comprises a NAS message.

In one embodiment, the third message comprises SDAP data.

In one embodiment, the third message is a PUSCH.

In one embodiment, the first message is a first message in a random access procedure, the second message is a second message in the random access procedure, and the third message is a third message in the random access procedure.

In one embodiment, the first message is a first step in a 2-step random access procedure, the second message is a second step in the 2-step random access procedure, and the third message is a third step in the 2-step random access procedure.

In one embodiment, the first signature sequence in the first message is a PRACH preamble of an MsgA comprised in a Type-2 L1 random access procedure, and the first data in the first message is a PUSCH payload of an MsgA comprised in a Type-2 L1 random access procedure, and the third message is a message after fallback of a Type-2 L1 random access procedure.

In one embodiment, the first signature sequence in the first message is a PRACH preamble of an MsgA comprised in a Type-2 L1 random access procedure, and the first data in the first message is a PUSCH payload of an MsgA comprised in a Type-2 L1 random access procedure, and the second message is an MsgB in a Type-2 L1 random access procedure, and the third message is a Message 3 (Msg3) after fallback of a Type-2 L1 random access procedure.

In one embodiment, the first signature sequence in the first message is a PRACH preamble of an MsgA comprised in a Type-2 L1 random access procedure, and the second message is an MsgB in a Type-2 L1 random access procedure, and the third message is a Message 3 (Msg3) in a Type-2 L1 random access procedure.

In one embodiment, a channel occupied by the first signature sequence in the first message includes a PRACH, while a channel occupied by the first data in the first message includes a PUSCH, channels occupied by the second message include a PDCCH and a PDSCH, and a channel occupied by the third message includes a PUSCH.

In one embodiment, a channel occupied by the first signature sequence in the first message includes a PRACH, channels occupied by the second message include a PDCCH and a PDSCH, and a channel occupied by the third message includes a PUSCH.

In one embodiment, the third message comprises all or partial bits in the first bit block.

In one embodiment, a first bit block comprises a positive integer number of bit(s), the first bit block being used for generating the third message.

In one embodiment, a first bit block comprises a positive integer number of bit(s), the first bit block being used for generating the first data, and the first bit block being used for generating the third message.

In one embodiment, the first bit block comprises a positive integer number of bit(s), the third message being an initial transmission of the first bit block.

In one embodiment, the first bit block comprises a positive integer number of bit(s), where the first data in the first message is an initial transmission of the first bit block, and the third message is a retransmission of the first bit block.

In one embodiment, a first bit block comprises a positive integer number of bits, where all or partial bit(s) among the positive integer number of bits comprised in the first bit block is/are used for generating the third message.

In one embodiment, the third message is obtained by all or partial bits in the first bit block sequentially through Transport-Block-level (TB-level) CRC Attachment, Code Block (CB) Segmentation, CB-level CRC Attachment, Channel Coding and Rate Matching, Code Block Concatenation, Scrambling, Modulation, Layer Mapping, Antenna Port Mapping, and Mapping to Physical Resource Blocks, Baseband Signal Generation, and Modulation and Upconversion.

In one embodiment, the third message is an output by the first bit block sequentially through a Modulation Mapper, a Layer Mapper, Precoding, a Resource Element Mapper, and Multicarrier Symbol Generation.

In one embodiment, only the first bit block is used for generating the third message.

In one embodiment, there is at least one bit block other than the first bit block being used for generating the third message.

In one embodiment, whether the first signature sequence is mapped to one of the multiple shared resource units in the first association pattern period is used to determine whether the third message is a retransmission of the first bit block.

In one embodiment, when the first signature sequence is mapped to one of the multiple shared channel resource units in the first association pattern period, the third message is a retransmission of the first bit block; when the first signature sequence is not mapped to any of the multiple shared channel resource units in the first association pattern period, the third message is an initial transmission of the first bit block.

In one embodiment, when the first signature sequence is mapped to one of the multiple shared channel resource units in the first association pattern period, the first bit block is used for generating the first data in the first message, and the first bit block is also used for generating the third message; when the first signature sequence is not mapped to any of the multiple shared channel resource units in the first association pattern period, the first bit block is used for generating the third message.

Embodiment 2

Figure 2:
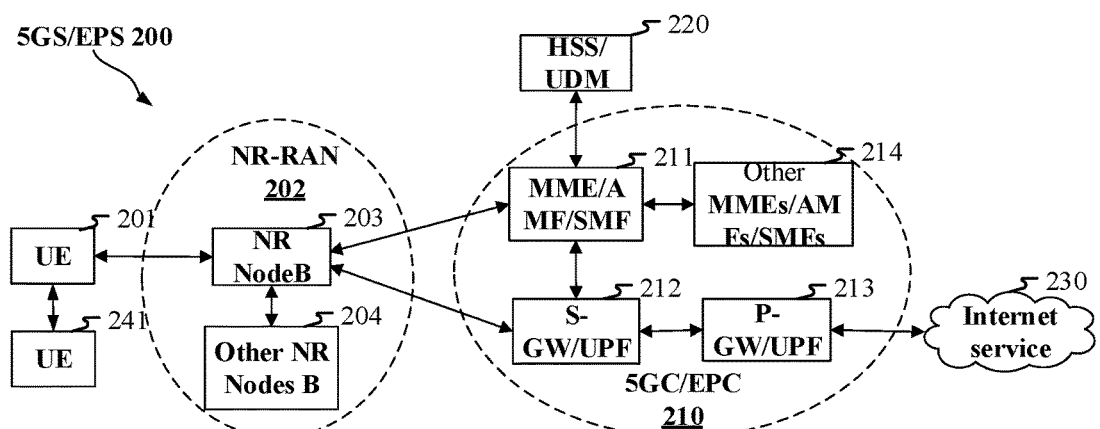
FIG. 2 illustrates a schematic diagram of a network architecture according to one embodiment of the present application.

Embodiment 2 illustrates a schematic diagram of a network architecture according to the present application, as shown in FIG. 2. FIG. 2 is a diagram illustrating a network architecture 200 of 5G NR, Long-Term Evolution (LTE) and Long-Term Evolution Advanced (LTE-A) systems. The 5G NR or LTE network architecture 200 may be called a 5G System/Evolved Packet System (5GS/EPS) 200 or other suitable terminology. The 5GS/EPS 200 may comprise one or more UEs 201, a UE 241 in sidelink communication with UE(s) 201, an NG-RAN 202, a 5G Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. In NTN, examples of the gNB 203 include satellite, aircrafts or terrestrial base station relayed by the satellite. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the first node in the present application includes the UE 201.

In one embodiment, the second node in the present application includes the gNB 203.

In one embodiment, the UE in the present application includes the UE 201.

In one embodiment, the base station in the present application includes the gNB 203.

In one embodiment, a receiver for the first signaling group in the present application includes the UE 201.

In one embodiment, a transmitter for the first signaling group in the present application includes the gNB 203.

In one embodiment, a transmitter for the first signature sequence in the present application includes the UE 201.

In one embodiment, a receiver for the first signature sequence in the present application includes the gNB 203.

In one embodiment, a transmitter for the second signature sequence in the present application includes the UE 201.

In one embodiment, a receiver for the second signature sequence in the present application includes the gNB 203.

In one embodiment, a transmitter for the L−1 signature sequence(s) in the present application includes the UE 201.

In one embodiment, a receiver for the L−1 signature sequence(s) in the present application includes the gNB 203.

In one embodiment, a receiver for the second message in the present application includes the UE 201.

In one embodiment, a transmitter for the second message in the present application includes the gNB 203.

In one embodiment, a transmitter for the first message in the present application includes the UE 201.

In one embodiment, a receiver for the first message in the present application includes the gNB 203.

In one embodiment, a transmitter for the third message in the present application includes the UE 201.

In one embodiment, a receiver for the third message in the present application includes the gNB 203.

In one embodiment, a receiver for the first configuration information in the present application includes the UE 201.

In one embodiment, a transmitter for the first configuration information in the present application includes the gNB 203.

In one embodiment, a receiver for the second configuration information in the present application includes the UE 201.

In one embodiment, a transmitter for the second configuration information in the present application includes the gNB 203.

Embodiment 3

Figure 3:
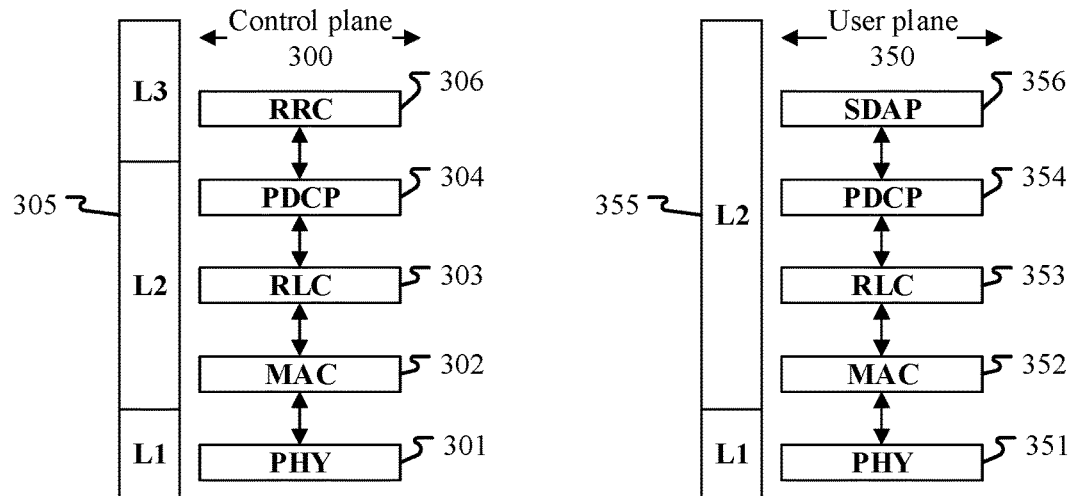
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE, or, RSU in V2X, vehicle-mounted equipment or vehicle-mounted communication modules) and a second communication node (gNB, UE, or RSU in V2X, vehicle-mounted equipment or vehicle-mounted communication modules), or between two UEs, is represented by three layers, i.e., layer 1, layer 2 and layer 3. The layer 1 (L1) is the lowest layer which performs signal processing functions of various PHY layers. The L1 is called PHY 301 in the present application. The layer 2 (L2) 305 is above the PHY 301, and is in charge of the link between a first node and a second node as well as between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second nodes. The PDCP sublayer 304 provides packet encryption and integrity protection and also support for inter-cell handover of the second node between first nodes. The RLC sublayer 303 provides packet segmentation and reordering, retransmission of a lost packet through ARQ and detection of duplicate packets and protocol error check. The MAC sublayer 302 provides mapping between a logical channel and a transport channel as well as multiplexing of logical channels The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first signaling group in the present application is generated by the RRC sublayer 306.

In one embodiment, the first signaling group in the present application is delivered by the MAC sublayer 302 to the PHY 301.

In one embodiment, the first signature sequence in the present application is generated by the PHY 301.

In one embodiment, the second signature sequence in the present application is generated by the PHY 301.

In one embodiment, the L−1 signature sequence(s) in the present application is(are) generated by the PHY 301.

In one embodiment, the second message in the present application is generated by the MAC sublayer 302.

In one embodiment, the second message in the present application is delivered by the MAC sublayer 302 to the PHY 301.

In one embodiment, the first message in the present application is generated by the PHY 301.

In one embodiment, the first message in the present application is generated by the PHY 301 and the RRC sublayer 306.

In one embodiment, the first signature sequence in the first message in the present application is generated by the PHY 301.

In one embodiment, the first data in the first message in the present application is generated by the RRC sublayer 306.

In one embodiment, the first data in the first message in the present application is delivered by the MAC sublayer 302 to the PHY 301.

In one embodiment, the third message in the present application is generated by the RRC sublayer 306.

In one embodiment, the third message in the present application is delivered by the MAC sublayer 302 to the PHY 301.

In one embodiment, the first configuration information in the present application is generated by the RRC sublayer 306.

In one embodiment, the first configuration information in the present application is delivered by the MAC sublayer 302 to the PHY 301.

In one embodiment, the second configuration information in the present application is generated by the RRC sublayer 306.

In one embodiment, the second configuration information in the present application is delivered by the MAC sublayer 302 to the PHY 301.

Embodiment 4

Figure 4:
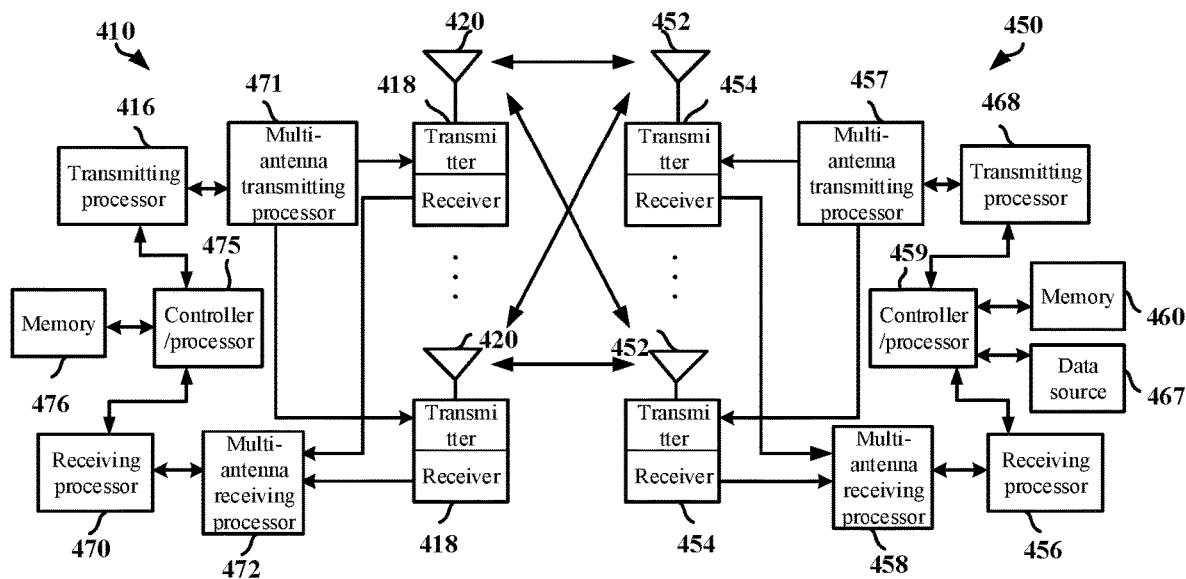
FIG. 4 illustrates a schematic diagram of a first communication device and a second communication device according to one embodiment of the present application.

Embodiment 4 illustrates a schematic diagram of a first communication device and a second communication device according to the present application, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 provides functions of the L2 layer. In the transmission from the first communication device 410 to the second communication device 450, the controller/processor 475 provides header compression, encryption, packet segmentation and reordering, and multiplexing between a logical channel and a transport channel, and radio resource allocation of the second communication device 450 based on various priorities. The controller/processor 475 is also in charge of a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410 on the physical channel Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication node 410 to the second communication node 450, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with a memory 476 that stores program code and data. The memory 476 can be called a computer readable medium. In the transmission between the second communication device 450 and the first communication device 410, the controller/processor 475 provides de-multiplexing between a transport channel and a logical channel, packet reassembling, decrypting, header decompression, control signal processing so as to recover a higher-layer packet from the second communication device (UE) 450. The higher-layer packet coming from the controller/processor 475 may be provided to the core network.

In one embodiment, the first node in the present application comprises the second communication device 450, and the second node in the present application comprises the first communication device 410.

In one subembodiment, the first node is a UE, and the second node is a base station.

In one subembodiment, the first node is a UE, and the second node is a relay node.

In one subembodiment, the first node is a relay node, and the second node is a base station.

In one subembodiment, the second communication device 450 comprises: at least one controller/processor; the at least one controller/processor is responsible for HARQ operation.

In one subembodiment, the first communication device 410 comprises: at least one controller/processor; the at least one controller/processor is responsible for HARQ operation.

In one subembodiment, the first communication device 410 comprises: at least one controller/processor; the at least one controller/processor is responsible for using ACK and/or NACK protocols for error checking as a way of supporting HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least receives a first signaling group, the first signaling group being used to indicate a first signature sequence group and a second signature sequence group; selects a first signature sequence from Q signature sequences, and transmits the first signature sequence in a first time interval; and selects a second signature sequence from Q signature sequences, and transmits the second signature sequence in a second time interval; any of the Q signature sequence belongs to one of the first signature sequence group or the second signature sequence group; the second time interval is after the first time interval; whether the first signature sequence belongs to the first signature sequence group or the second signature sequence group is used for selecting the second signature sequence; any signature sequence in the first signature sequence group is associated with a shared channel resource unit in a first period; any signature sequence in the second signature sequence group is not associated with any shared channel resource unit in the first period; Q is a positive integer greater than 1.

In one embodiment, the second communication device 450 comprises a memory that stores computer readable instruction program, the computer readable instruction program generates an action when executed by at least one processor, which includes: receiving a first signaling group, the first signaling group being used to indicate a first signature sequence group and a second signature sequence group; selecting a first signature sequence from Q signature sequences, and transmitting the first signature sequence in a first time interval; and selecting a second signature sequence from Q signature sequences, and transmitting the second signature sequence in a second time interval; any of the Q signature sequence belongs to one of the first signature sequence group or the second signature sequence group; the second time interval is after the first time interval; whether the first signature sequence belongs to the first signature sequence group or the second signature sequence group is used for selecting the second signature sequence; any signature sequence in the first signature sequence group is associated with a shared channel resource unit in a first period; any signature sequence in the second signature sequence group is not associated with any shared channel resource unit in the first period; Q is a positive integer greater than 1.

In one embodiment, the first communication device 410 comprises at least one processor and at least one memory. The at least one memory comprises computer program codes; the at least one memory and the computer program codes are configured to be used in collaboration with the at least one processor. The first communication device 410 at least transmits a first signaling group, the first signaling group being used to indicate a first signature sequence group and a second signature sequence group; detects a first signature sequence in a first time interval, and detects a second signature sequence in a second time interval; the first signature sequence and the second signature sequence are respectively two signature sequences among Q signature sequences; any of the Q signature sequence belongs to one of the first signature sequence group or the second signature sequence group; the second time interval is after the first time interval; whether the first signature sequence belongs to the first signature sequence group or the second signature sequence group is used for selecting the second signature sequence; any signature sequence in the first signature sequence group is associated with a shared channel resource unit in a first period; any signature sequence in the second signature sequence group is not associated with any shared channel resource unit in the first period; Q is a positive integer greater than 1.

In one embodiment, the first communication device 410 comprises a memory that stores computer readable instruction program, the computer readable instruction program generates an action when executed by at least one processor, which includes: transmitting a first signaling group, the first signaling group being used to indicate a first signature sequence group and a second signature sequence group; detecting a first signature sequence in a first time interval, and detecting a second signature sequence in a second time interval;

the first signature sequence and the second signature sequence are respectively two signature sequences among Q signature sequences; any of the Q signature sequence belongs to one of the first signature sequence group or the second signature sequence group; the second time interval is after the first time interval; whether the first signature sequence belongs to the first signature sequence group or the second signature sequence group is used for selecting the second signature sequence; any signature sequence in the first signature sequence group is associated with a shared channel resource unit in a first period; any signature sequence in the second signature sequence group is not associated with any shared channel resource unit in the first period; Q is a positive integer greater than 1.

In one embodiment, at least one of the antenna 452, the receiver 454, the multi-antenna receiving processor 458, the receiving processor 456, the controller/processor 459, the memory 460, or the data source 467 is used for receiving the first signaling group in the present application.

In one embodiment, at least one of the antenna 452, the transmitter 454, the multi-antenna transmitting processor 468, the controller/processor 459, the memory 460 or the data source 467 is used for selecting a first signature sequence from Q signature sequences in the present application.

In one embodiment, at least one of the antenna 452, the transmitter 454, the multi-antenna transmitting processor 468, the controller/processor 459, the memory 460 or the data source 467 is used for transmitting a first signature sequence in a first time interval in the present application.

In one embodiment, at least one of the antenna 452, the transmitter 454, the multi-antenna transmitting processor 468, the controller/processor 459, the memory 460 or the data source 467 is used for selecting a second signature sequence from Q signature sequences in the present application.

In one embodiment, at least one of the antenna 452, the transmitter 454, the multi-antenna transmitting processor 468, the controller/processor 459, the memory 460 or the data source 467 is used for transmitting a second signature sequence in a second time interval in the present application.

In one embodiment, at least one of the antenna 452, the transmitter 454, the multi-antenna transmitting processor 468, the controller/processor 459, the memory 460 or the data source 467 is used for transmitting L−1 signature sequence(s) (respectively) in L−1 time interval(s) in the present application.

In one embodiment, at least one of the antenna 452, the receiver 454, the multi-antenna receiving processor 458, the receiving processor 456, the controller/processor 459, the memory 460, or the data source 467 is used for monitoring the second message in a first time window in the present application.

In one embodiment, at least one of the antenna 420, the transmitter 418, the multi-antenna transmitting processor 471, the transmitting processor 416, the controller/processor 475 or the memory 476 is used for transmitting a first signaling group in the present application.

In one embodiment, at least one of the antenna 420, the receiver 418, the multi-antenna receiving processor 472, the receiving processor 470, the controller/processor 475, or the memory 476 is used for detecting a first signature sequence in a first time interval in the present application.

In one embodiment, at least one of the antenna 420, the receiver 418, the multi-antenna receiving processor 472, the receiving processor 470, the controller/processor 475, or the memory 476 is used for detecting a second signature sequence in a second time interval in the present application.

In one embodiment, at least one of the antenna 420, the receiver 418, the multi-antenna receiving processor 472, the receiving processor 470, the controller/processor 475, or the memory 476 is used for detecting L−1 signature sequence(s) (respectively) in L−1 time interval(s) in the present application.

In one embodiment, at least one of the antenna 420, the transmitter 418, the multi-antenna transmitting processor 471, the transmitting processor 416, the controller/processor 475 or the memory 476 is used for transmitting a second message in a first time window in the present application.

In one embodiment, the second communication device 450 comprises at least one processor and at least one memory. The at least one memory comprises computer program codes; the at least one memory and the computer program codes are configured to be used in collaboration with the at least one processor. The second communication device 450 at least receives first configuration information and second configuration information; transmits a first message, the first message comprising at least a former one of a first signature sequence and first data; and receives a second message, the second message being used to indicate that the first signature sequence is correctly received; and transmits a third message on a second time-frequency resource block, a first bit block being used to generate the third message; the first message and the second message belong a random access procedure; the first configuration information indicates a first time-frequency resource block, the first time-frequency resource block being used to transmit the first signature sequence in the first message; the second configuration information indicates multiple shared resource units; the first configuration information and the second configuration information are used together to determine whether the first signature sequence is mapped to one shared resource unit of the multiple shared resource units; whether the first signature sequence is mapped to one shared resource unit of the multiple shared resource units is used to determine whether the first message comprises the first data; the second message comprises a first field, and information indicated by the first field is related to whether the first message comprises the first data; the second message indicates the second time-frequency resource block.

In one embodiment, the second communication device 450 comprises a memory that stores computer readable instruction program, the computer readable instruction program generates an action when executed by at least one processor, which includes: receiving first configuration information and second configuration information; transmitting a first message, the first message comprising at least a former one of a first signature sequence and first data; and receiving a second message, the second message being used to indicate that the first signature sequence is correctly received; and transmitting a third message on a second time-frequency resource block, a first bit block being used to generate the third message; the first message and the second message belong a random access procedure; the first configuration information indicates a first time-frequency resource block, the first time-frequency resource block being used to transmit the first signature sequence in the first message; the second configuration information indicates multiple shared resource units; the first configuration information and the second configuration information are used together to determine whether the first signature sequence is mapped to one shared resource unit of the multiple shared resource units; whether the first signature sequence is mapped to one shared resource unit of the multiple shared resource units is used to determine whether the first message comprises the first data; the second message comprises a first field, and information indicated by the first field is related to whether the first message comprises the first data; the second message indicates the second time-frequency resource block.

In one embodiment, the first communication device 410 comprises at least one processor and at least one memory. The at least one memory comprises computer program codes; the at least one memory and the computer program codes are configured to be used in collaboration with the at least one processor. The first communication device 410 at least transmits first configuration information and second configuration information; receives a first message, the first message comprising at least a former one of a first signature sequence and first data; and transmits a second message, the second message being used to indicate that the first signature sequence is correctly received; and receives a third message on a second time-frequency resource block, a first bit block being used to generate the third message; the first message and the second message belong a random access procedure; the first configuration information indicates a first time-frequency resource block, the first time-frequency resource block being used to transmit the first signature sequence in the first message; the second configuration information indicates multiple shared resource units; the first configuration information and the second configuration information are used together to determine whether the first signature sequence is mapped to one shared resource unit of the multiple shared resource units; whether the first signature sequence is mapped to one shared resource unit of the multiple shared resource units is used to determine whether the first message comprises the first data; the second message comprises a first field, and information indicated by the first field is related to whether the first message comprises the first data; the second message indicates the second time-frequency resource block.

In one embodiment, the first communication device 410 comprises a memory that stores computer readable instruction program, the computer readable instruction program generates an action when executed by at least one processor, which includes: transmitting first configuration information and second configuration information; receiving a first message, the first message comprising at least a former one of a first signature sequence and first data; and transmitting a second message, the second message being used to indicate that the first signature sequence is correctly received; and receiving a third message on a second time-frequency resource block, a first bit block being used to generate the third message; the first message and the second message belong a random access procedure; the first configuration information indicates a first time-frequency resource block, the first time-frequency resource block being used to transmit the first signature sequence in the first message; the second configuration information indicates multiple shared resource units; the first configuration information and the second configuration information are used together to determine whether the first signature sequence is mapped to one shared resource unit of the multiple shared resource units; whether the first signature sequence is mapped to one shared resource unit of the multiple shared resource units is used to determine whether the first message comprises the first data; the second message comprises a first field, and information indicated by the first field is related to whether the first message comprises the first data; the second message indicates the second time-frequency resource block.

In one embodiment, at least one of the antenna 452, the transmitter 454, the multi-antenna transmitting processor 458, the transmitting processor 468, the controller/processor 459, the memory 460 or the data source 467 is used for transmitting a first message in the present application.

In one embodiment, at least one of the antenna 452, the receiver 454, the multi-antenna receiving processor 458, the receiving processor 456, the controller/processor 459, the memory 460, or the data source 467 is used for receiving a second message in the present application.

In one embodiment, at least one of the antenna 452, the transmitter 454, the multi-antenna transmitting processor 458, the transmitting processor 468, the controller/processor 459, the memory 460 or the data source 467 is used for transmitting a third message on a second time-frequency resource block in the present application.

In one embodiment, at least one of the antenna 452, the receiver 454, the multi-antenna receiving processor 458, the receiving processor 456, the controller/processor 459, the memory 460, or the data source 467 is used for receiving first configuration information in the present application.

In one embodiment, at least one of the antenna 452, the receiver 454, the multi-antenna receiving processor 458, the receiving processor 456, the controller/processor 459, the memory 460, or the data source 467 is used for receiving second configuration information in the present application.

In one embodiment, at least one of the antenna 420, the receiver 418, the multi-antenna receiving processor 472, the receiving processor 470, the controller/processor 475, or the memory 476 is used for receiving a first message in the present application.

In one embodiment, at least one of the antenna 420, the transmitter 418, the multi-antenna transmitting processor 471, the transmitting processor 416, the controller/processor 475 or the memory 476 is used for transmitting a second message in the present application.

In one embodiment, at least one of the antenna 420, the receiver 418, the multi-antenna receiving processor 472, the receiving processor 470, the controller/processor 475, or the memory 476 is used for receiving a third message on a second time-frequency resource block in the present application.

In one embodiment, at least one of the antenna 420, the transmitter 418, the multi-antenna transmitting processor 471, the transmitting processor 416, the controller/processor 475 or the memory 476 is used for transmitting first configuration information in the present application.

In one embodiment, at least one of the antenna 420, the transmitter 418, the multi-antenna transmitting processor 471, the transmitting processor 416, the controller/processor 475 or the memory 476 is used for transmitting second configuration information in the present application.

Embodiment 5A

Figure 5A:
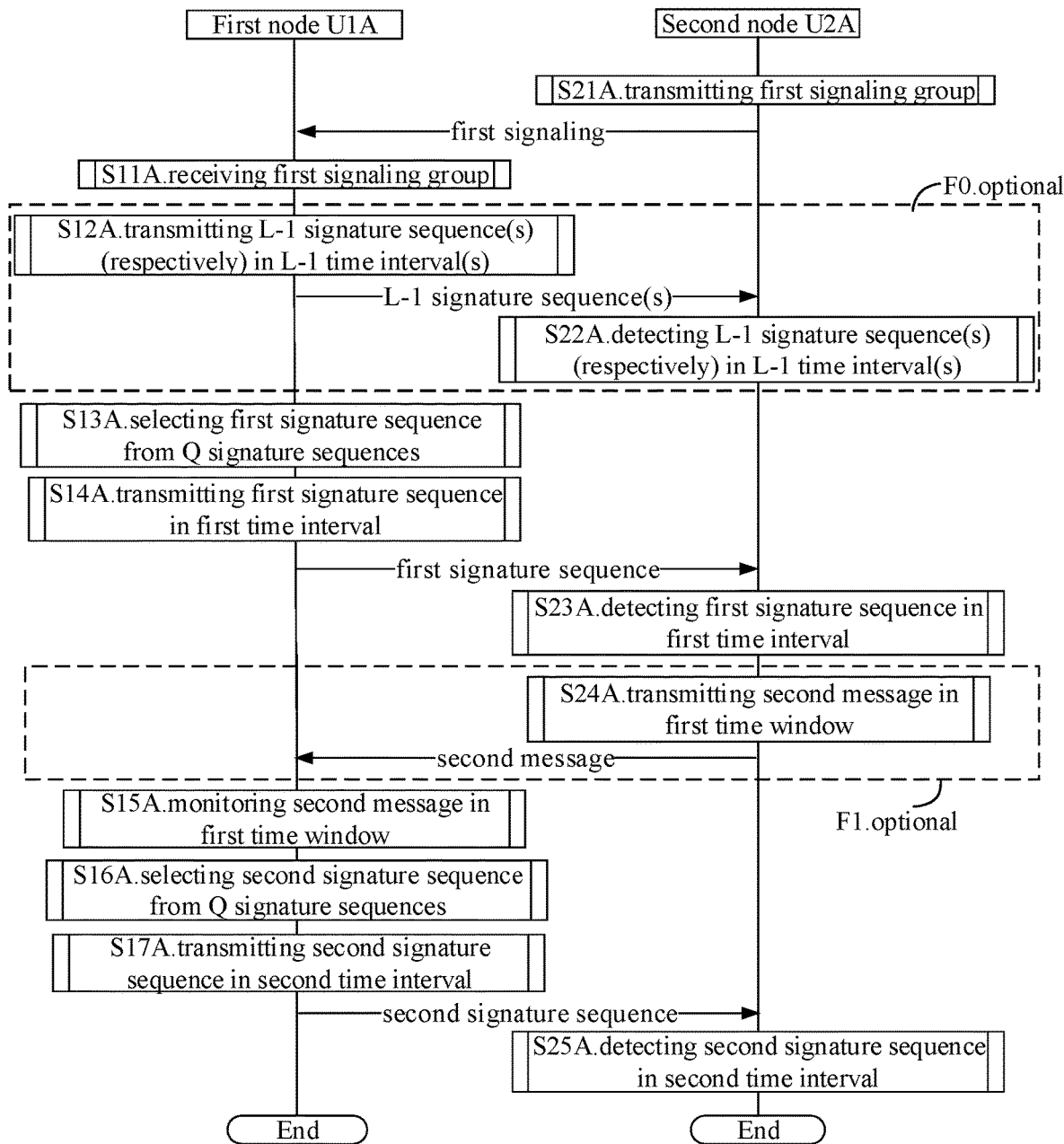
FIG. 5A illustrates a flowchart of radio signal transmission according to one embodiment of the present application.

Embodiment 5A illustrates a flowchart of radio signal transmission according to one embodiment of the present application, as shown in FIG. 5A. In FIG. 5A, a first node U1A and a second node U2A are in communications via an air interface. In FIG. 5A, steps marked by the dotted-line frame boxes F0 and F1 are optional, respectively.

The first node U1A receives a first signaling group in step S11A; transmits L−1 signature sequence(s) (respectively) in L−1 time interval(s) in step S12A; selects a first signature sequence from Q signature sequences in step S13A; and transmits the first signature sequence in a first time interval in step S14A; monitors a second message in a first time window in step S15A; selects a second signature sequence from the Q signature sequences in step S16A; and transmits the second signature sequence in a second time interval in step S17A.

The second node U2A transmits a first signaling group in step S21A; detects L−1 signature sequence(s) (respectively) in L−1 time interval(s) in step S22A; detects a first signature sequence in a first time interval in step S23A; transmits a second message in a first time window in step S24A; and detects a second signature sequence in a second time interval in step S25A.

In Embodiment 5A, the first signaling group is used by the second node U2A to indicate a first signature sequence group and a second signature sequence group; any of the Q signature sequence belongs to one of the first signature sequence group or the second signature sequence group; the second time interval is after the first time interval; whether the first signature sequence belongs to the first signature sequence group or the second signature sequence group is used for selecting the second signature sequence; any signature sequence in the first signature sequence group is associated with a shared channel resource unit in a first period; any signature sequence in the second signature sequence group is not associated with any shared channel resource unit in the first period; Q is a positive integer greater than 1; L is a positive integer greater than 1; each of the L−1 time interval(s) is before the first time interval; the first signaling group indicates the L; the first time window is between the first time interval and the second time interval; the second message is used by the first node U1A to determine that the first signature sequence is not correctly received; the monitoring operation is used by the first node U1A to trigger transmitting of the second signature sequence.

In one embodiment, when the first signature sequence belongs to a target sequence group, the second signature sequence is chosen from one of the first signature sequence group and the second signature sequence group other than the target sequence group by the first node U1A, the target sequence group being one of the first signature sequence group or the second signature sequence group.

In one embodiment, the first signature sequence belongs to a target sequence group, when the target signature sequence group is the first signature sequence group, the second signature sequence is chosen from the second signature sequence group by the first node U1A.

In one embodiment, the first signature sequence belongs to a target sequence group, when the target signature sequence group is the second signature sequence group, the second signature sequence is chosen from the first signature sequence group by the first node U1A.

In one embodiment, when the L−1 signature sequence(s) and the first signature sequence belong to the target sequence group, the second signature sequence is chosen from one of the first signature sequence group and the second signature sequence group other than the target sequence group by the first node U1A, the target sequence group being one of the first signature sequence group or the second signature sequence group.

In one embodiment, the L−1 signature sequence(s) and the first signature sequence belong to the target sequence group, when the target signature sequence group is the first signature sequence group, the second signature sequence is chosen from the second signature sequence group by the first node U1.

In one embodiment, the L−1 signature sequence(s) and the first signature sequence belong to the target sequence group, when the target signature sequence group is the second signature sequence group, the second signature sequence is chosen from the first signature sequence group by the first node U1.

In one embodiment, the steps marked by the box F0 in FIG. 5A do not exist.

In one embodiment, the steps marked by the box F0 in FIG. 5A exist.

In one embodiment, when the first signature sequence is an initial transmission of the first node U1A, steps marked by the box F0 in FIG. 5 do not exist.

In one embodiment, when the first signature sequence isn't an initial transmission of the first node U1A, steps marked by the box F0 in FIG. 5 exist.

In one embodiment, the steps marked by the box F1 in FIG. 5A do not exist.

In one embodiment, when the first signature sequence is not detected, the steps marked by the box F1 in FIG. 5A do not exist.

In one embodiment, when the first signature sequence is detected, the steps marked by the box F1 in FIG. 5A exist.

In one embodiment, when the first signature sequence is not detected, the second node U2A drops transmitting the second message in the first time window.

In one embodiment, the detection refers to receiving based on coherent detection, namely, the second node U2A performs coherent reception of a radio signal using the first signature sequence in the first time interval, and measures energy of a signal obtained by the coherent reception; if the energy of the signal obtained by the coherent reception is larger than a given threshold, it is determined that the first signature sequence is detected in the first time interval; otherwise, it is determined that the first signature sequence is not detected in the first time interval.

Embodiment 5B

Figure 5B:
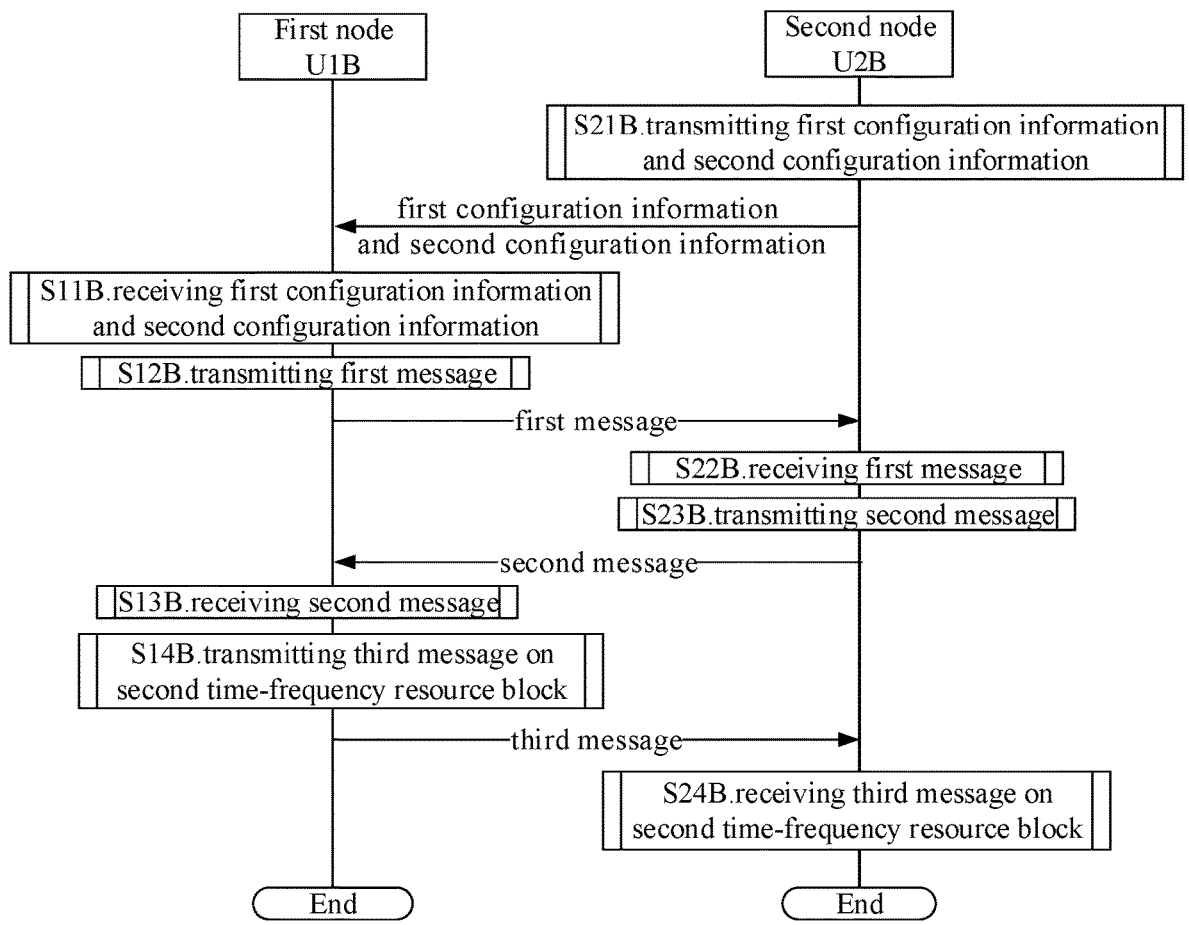
FIG. 5B illustrates a flowchart of radio signal transmission according to one embodiment of the present application.

Embodiment 5B illustrates a flowchart of radio signal transmission according to one embodiment of the present application, as shown in FIG. 5B. In FIG. 5B, a first node U1B and a second node U2B are in communications via an air interface.

The first node U1B receives first configuration information and second configuration information in step S11B; transmits a first message in step S12B; and receives a second message in step S13B; and transmits a third message on a second time-frequency resource block in step S14B.

The second node U2B transmits first configuration information and second configuration information in step S21B;

receives a first message in step S22B; and transmits a second message in step S23B; and receives a third message on a second time-frequency resource block in step S24B.

In Embodiment 5B, the first message comprising at least a former one of a first signature sequence and first data; the second message is used to indicate that the first signature sequence is correctly received; and a first bit block is used to generate the third message; the first message and the second message belong to a random access procedure; the first configuration information indicates a first time-frequency resource block, the first time-frequency resource block being used to transmit the first signature sequence in the first message; the second configuration information indicates multiple shared resource units; the first configuration information and the second configuration information are used together to determine whether the first signature sequence is mapped to one shared resource unit of the multiple shared resource units; whether the first signature sequence is mapped to one shared resource unit of the multiple shared resource units is used to determine whether the first message comprises the first data; the second message comprises a first field, and information indicated by the first field is related to whether the first message comprises the first data; the second message indicates the second time-frequency resource block.

In one embodiment, the first signature sequence in the first message is mapped to the first shared resource unit, the first shared resource unit being one of the multiple shared resource units indicated by the second configuration information, the first message comprises the first signature sequence and the first data, the first bit block being used to generate the first data, the first data being transmitted on the first shared resource unit; the second message indicates that the first signature sequence in the first message is correctly received, and the second message indicates that the first data in the first message is not correctly received.

In one embodiment, the first signature sequence in the first message is not mapped to any one of the multiple shared resource units indicated by the second configuration information, the first message only comprises the first signature sequence between the first signature sequence and the first data; the second message indicates that the first message is correctly received.

In one embodiment, the first signature sequence is mapped to the first shared resource unit, the first shared resource unit being one of the multiple shared resource units indicated by the second configuration information; the first message comprises the first signature sequence and the first data, the first bit block being used to generate the first data, the first data being transmitted on the first shared resource unit; the second message indicates that the first data is not correctly received; the first field in the second message indicates a first value, the first value being an integer; the first value belonging to one of a first value range or a second value range is used to determine whether the first value indicates a transmit power adjustment offset of the third message.

In one subembodiment, the first value belongs to the first value range of the first value range or the second value range, the first value range comprising multiple non-positive integers, and a transmit power adjustment offset of the third message being 0.

In one subembodiment, the first value belongs to the second value range of the first value range or the second value range, the second value range comprising multiple positive integers, and a transmit power adjustment offset of the third message being the first value.

In one embodiment, the first signature sequence is not mapped to any one of the multiple shared resource units indicated by the second configuration information, the first message only comprises the first signature sequence between the first signature sequence and the first data; the first field in the second message indicates a first value, the first value being an integer; the first value indicates a transmit power adjustment offset of the third message.

In one subembodiment, the first value belongs to the first value range of the first value range or the second value range, the first value range comprising multiple non-positive integers, and a transmit power adjustment offset of the third message being the first value.

In one subembodiment, the first value belongs to the second value range of the first value range or the second value range, the second value range comprising multiple positive integers, and a transmit power adjustment offset of the third message being the first value.

In one embodiment, the first signature sequence is mapped to the first shared resource unit, the first shared resource unit being one of the multiple shared resource units indicated by the second configuration information; the first message comprises the first signature sequence and the first data, the first bit block being used to generate the first data, the first data being transmitted on the first shared resource unit; the second message indicates that the first data is not correctly received; the first field in the second message indicates a first value, the first value being an integer; the first value belonging to one of a first value range or a second value range is used to indicate whether the second message is correctly received.

In one subembodiment, the first value belongs to the first value range of the first value range or the second value range, the first value range comprising multiple negative integers, the first value indicating that the second message is not correctly received.

In one subembodiment, the first value belongs to the second value range of the first value range or the second value range, the second value range comprising multiple non-negative integers, the first value indicating that the second message is correctly received.

In one subembodiment, the first value belongs to the second value range of the first value range or the second value range, the second value range comprising multiple non-negative integers, the first value indicating a transmit power adjustment offset of the third message.

In one subembodiment, the first value belongs to the second value range of the first value range or the second value range, the second value range comprising multiple non-negative integers, the first value indicating that the second message is correctly received, and the first value indicating a transmit power adjustment offset of the third message.

In one embodiment, the first signature sequence is not mapped to any one of the multiple shared resource units indicated by the second configuration information, the first message only comprises the first signature sequence between the first signature sequence and the first data; the first field in the second message indicates a first value, the first value being an integer; the first value indicates a transmit power adjustment offset of the third message.

In one embodiment, the first signature sequence is mapped to the first shared resource unit, the first shared resource unit being one of the multiple shared resource units indicated by the second configuration information; the first message comprises the first signature sequence and the first data, the first bit block being used to generate the first data, the first data being transmitted on the first shared resource unit; the first bit block is also used for generating the third message; the first field in the second message indicates whether a HARQ RV of the third message and a HARQ RV of the first data are the same.

In one subembodiment, the third message is a retransmission of the first data.

In one embodiment, the first signature sequence is not mapped to any one of the multiple shared resource units indicated by the second configuration information; the first message only comprises the first signature sequence between the first signature sequence and the first data; the first field in the second message is reserved.

In one embodiment, the first signature sequence is not mapped to any one of the multiple shared resource units indicated by the second configuration information; the first message only comprises the first signature sequence between the first signature sequence and the first data; the first field in the second message indicates that a HARQ RV of the third message is one of a first candidate RV or a second candidate RV.

In one embodiment, the first signature sequence is mapped to the first shared resource unit, the first shared resource unit being one of the multiple shared resource units indicated by the second configuration information; the first message comprises the first signature sequence and the first data, the first bit block being used to generate the first data, the first data being transmitted on the first shared resource unit; the first bit block is also used for generating the third message; the first field in the second message indicates time-frequency resources occupied by the second time-frequency resource block.

In one embodiment, the first signature sequence is mapped to the first shared resource unit, the first shared resource unit being one of the multiple shared resource units indicated by the second configuration information; the first message comprises the first signature sequence and the first data, the first bit block being used to generate the first data, the first data being transmitted on the first shared resource unit; the first bit block is also used for generating the third message; the first field in the second message indicates time-domain resources occupied by the second time-frequency resource block.

In one embodiment, the first signature sequence is mapped to the first shared resource unit, the first shared resource unit being one of the multiple shared resource units indicated by the second configuration information; the first message comprises the first signature sequence and the first data, the first bit block being used to generate the first data, the first data being transmitted on the first shared resource unit; the first bit block is also used for generating the third message; the first field in the second message indicates frequency-domain resources occupied by the second time-frequency resource block.

In one embodiment, the first signature sequence is not mapped to any one of the multiple shared resource units indicated by the second configuration information; the first message only comprises the first signature sequence between the first signature sequence and the first data; the first field in the second message indicates an index of a second shared resource unit among the multiple shared resource units indicated by the second configuration information, the second shared resource unit being one of the multiple shared resource units indicated by the second configuration information, the second time-frequency resource block being time-frequency resources occupied by the second shared resource unit.

Embodiment 6A

Figure 6A:
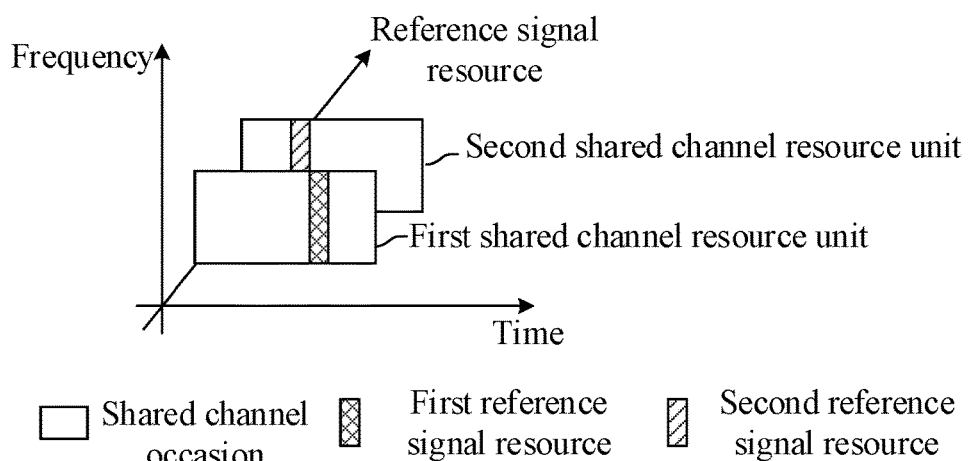
FIG. 6A illustrates a schematic diagram of a relationship between a shared channel occasion and a shared channel resource unit according to one embodiment of the present application.

Embodiment 6A illustrates a schematic diagram of a relationship between a shared channel occasion and a shared channel resource unit according to one embodiment of the present application, as shown in FIG. 6A. In FIG. 6A, the horizontal axis represents time, the vertical axis represents frequency, and the oblique axis represents reference signal resources; the box framed with thick lines represents a shared channel occasion in the present application; the small rectangle filled with oblique grids represents a first reference signal resource in the present application; the small rectangle filled with oblique lines represents a second reference signal resource in the present application. In FIG. 6A, the thick-line framed box carrying the oblique-grid-filled rectangle represents a first shared channel resource unit in the present application; the thick-line framed box carrying the oblique-line-filled rectangle represents a second shared channel resource unit in the present application.

In Embodiment 6A, a first period comprises a positive integer number of shared channel occasion(s), and the first period comprises a positive integer number of shared channel resource unit(s); any of the positive integer number of shared channel resource unit(s) comprised in the first period is one of the positive integer number of shared channel occasion(s) comprised in the first period being associated with one of a positive integer number of reference signal resource(s).

In one embodiment, any of the positive integer number of shared channel occasion(s) comprised in the first period comprises a PUSCH.

In one embodiment, any of the positive integer number of shared channel occasion(s) comprised in the first period is a PUSCH occasion.

In one embodiment, any of the positive integer number of shared channel occasion(s) comprised in the first period comprises a positive integer number of Physical Resource Block(s) (PRB(s)).

In one embodiment, any of the positive integer number of shared channel occasion(s) comprised in the first period comprises a positive integer number of consecutive PRBs.

In one embodiment, any of the positive integer number of shared channel occasion(s) comprised in the first period comprises a positive integer number of Subcarrier(s).

In one embodiment, any of the positive integer number of shared channel occasion(s) comprised in the first period comprises a positive integer number of Subframe(s).

In one embodiment, any of the positive integer number of shared channel occasion(s) comprised in the first period comprises a positive integer number of Slot(s).

In one embodiment, any of the positive integer number of shared channel occasion(s) comprised in the first period comprises a positive integer number of multicarrier symbol(s).

In one embodiment, at least two of the positive integer number of shared channel occasion(s) comprised in the first period belong to a same slot.

In one subembodiment, the slot comprises 14 multicarrier symbols.

In one embodiment, at least two of the positive integer number of shared channel occasion(s) comprised in the first period are Frequency Division Multiplexing (FDM).

In one embodiment, at least two of the positive integer number of shared channel occasion(s) comprised in the first period are Time Division Multiplexing (TDM).

In one embodiment, at least two of the positive integer number of shared channel occasion(s) comprised in the first period are TDM and FDM.

In one embodiment, any two of the positive integer number of shared channel occasion(s) comprised in the first period are non-overlapped.

In one embodiment, a target shared channel occasion is any one of the positive integer number of shared channel occasion(s) comprised in the first period.

In one subembodiment, any of the positive integer number of multicarrier symbol(s) comprised in the target shared channel occasion is an Orthogonal Frequency Division Multiplexing (OFDM) Symbol.

In one subembodiment, any of the positive integer number of multicarrier symbol(s) comprised in the target shared channel occasion is a Single-Carrier Frequency Division Multiple Access (SC-FDMA) symbol.

In one subembodiment, any of the positive integer number of multicarrier symbol(s) comprised in the target shared channel occasion is a Discrete Fourier Transform Spread Orthogonal Frequency Division Multiplexing (DFT-S-OFDM) Symbol.

In one subembodiment, any of the positive integer number of multicarrier symbol(s) comprised in the target shared channel occasion is a Frequency Division Multiple Access (FDMA) symbol.

In one subembodiment, any of the positive integer number of multicarrier symbol(s) comprised in the target shared channel occasion is a Filter Bank Multi-Carrier (FBMC) symbol.

In one subembodiment, any of the positive integer number of multicarrier symbol(s) comprised in the target shared channel occasion is an Interleaved Frequency Division Multiple Access (IFDMA) symbol.

In one embodiment, the first period comprises X shared channel occasions, the X shared channel occasions comprised in the first period respectively corresponding to X shared channel resource groups, any of the X shared channel resource groups comprising Y shared channel resource units, where X is a positive integer, and Y is a positive integer.

In one embodiment, the X shared channel resource groups respectively comprise $[Y_1, Y_2 \ldots, Y_X]$ shared channel resource units, where numbers from $Y_1$ to $Y_X$ are positive integers.

In one embodiment, the X shared channel resource groups respectively correspond to the X reference signal resource groups.

In one embodiment, the X reference signal resource groups respectively comprise $[Y_1, Y_2 \ldots, Y_X]$ reference signal resources.

In one embodiment, the Y shared channel resource units comprised in any of the X shared channel resource groups respectively correspond to Y reference signal resources comprised in any of the X reference signal resource groups.

In one embodiment, a target reference signal resource group is one of the X reference signal resource groups, the target reference signal resource group comprising a first reference signal resource and a second reference signal resource.

In one embodiment, a target shared channel occasion is one of the X shared channel occasions comprised in the first period, the target shared channel occasion corresponding to a target shared channel resource group, the target shared channel resource group being a shared channel resource group among the X shared channel resource groups.

In one embodiment, the target shared channel resource group comprises a first shared channel resource unit and a second shared channel resource unit, where the first shared channel resource unit is the target shared channel occasion being associated with the first reference signal resource, while the second shared channel resource unit is the target shared channel occasion being associated with the second reference signal resource.

In one embodiment, the first shared channel resource unit is used for transmission of a first target radio signal, the first target radio signal occupying the target shared channel occasion, the first target radio signal using the first reference signal resource.

In one embodiment, small-scale properties obtained through the first reference signal resource are used for demodulating the first target radio signal.

In one embodiment, the second shared channel resource unit is used for transmission of a second target radio signal, the second target radio signal occupying the target shared channel occasion, the second target radio signal using the second reference signal resource.

In one embodiment, small-scale properties obtained through the second reference signal resource are used for demodulating the second target radio signal.

In one embodiment, the X shared channel occasions comprised in the first period are indicated by one of the positive integer number of second-type signaling(s) comprised in the first signaling group.

In one embodiment, the X shared channel occasions comprised in the first period are indicated by an msgA-PUSCH-config.

In one embodiment, any of the X reference signal groups is indicated by one of the positive integer number of second-type signaling(s) comprised in the first signaling group.

In one embodiment, any of the X reference signal groups is indicated by an msgA-DMRS-Configuration.

Embodiment 6B

Embodiment 6B illustrates a schematic diagram of a relationship between a first field and a first value according to one embodiment of the present application, as shown in FIG. 6B. In FIG. 6B, the column on the left in the table represents a first field in a second message, and the column on the right represents values indicated by the first field.

In Embodiment 6B, the first field in the second message indicates a first value, the first value being an integer; when the first signature sequence is mapped to the first shared resource unit in the first association pattern period, a first value belonging to one of a first value range or a second value range is used to determine whether the second message is correctly received; when the first signature sequence is not mapped to any of the multiple shared resource units in the first association pattern period, the first value indicates a transmit power adjustment offset of the third message.

In one embodiment, the first field indicates a value among n values, n being a positive integer greater than 1.

In one embodiment, the first value is one of the n values.

In one embodiment, the first field indicates the first value, the first value being a value among n values, n being a positive integer greater than 1.

In one embodiment, the first field comprises 1 bit, where n is equal to 2.

In one embodiment, the first field comprises 3 bits, where n is equal to 8.

In one embodiment, the first field comprises 4 bits, where n is equal to 16.

In one embodiment, the n values are respectively −6, −4, −2, 0, 2, 4, 6 and 8.

In one embodiment, the first field in the second message is a TPC Command.

In one embodiment, the first value is measured in dB.

In one embodiment, the first value is measured in mW.

In one embodiment, the first value range comprises X1 values, and the second value range comprises X2 values, where X1 is a positive integer, X2 is a positive integer, and a sum of the X1 and X2 is no greater than n.

In one embodiment, the X1 values comprised in the first value range are −6, −4 and −2, respectively, and the X2 values comprised in the second value range are 0, 2, 4, 6 and 8, respectively.

In one embodiment, when the first signature sequence is mapped to the first shared resource unit in the first association pattern period, the first value belongs to the latter of the first value range and the second value range; when the first signature sequence is not mapped to any of the multiple shared resource units in the first association pattern period, the first value belongs to one of the first value range or the second value range.

In one embodiment, when the first signature sequence is mapped to the first shared resource unit in the first association pattern period, the first value is one of the X2 values comprised in the second value range; when the first signature sequence is not mapped to any of the multiple shared resource units in the first association pattern period, the first value is one of the n values.

In one embodiment, when the first value belongs to the first value range, the second message is not correctly received; when the first value belongs to the second value range, the second message is correctly received.

In one embodiment, the first signature sequence is mapped to the first shared resource unit in the first association pattern period, when the first value belongs to the first value range, the second message is not correctly received; when the first value belongs to the second value range, the second message is correctly received.

In one embodiment, the first signature sequence is mapped to the first shared resource unit in the first association pattern period; when the first value is a value in the first value range, the second message is not correctly received; when the first value is a value in the second value range, the first value indicated by the first field is a transmit power adjustment offset of the third message.

In one embodiment, the first signature sequence is mapped to the first shared resource unit in the first association pattern period, the first value range is reserved, and any value in the second value range is a transmit power adjustment offset.

In one embodiment, the first signature sequence is mapped to the first shared resource unit in the first association pattern period, the first value range is reserved, and any value in the second value range is a transmit power adjustment offset of the third message.

In one embodiment, the first signature sequence is mapped to the first shared resource unit in the first association pattern period, the first value being a value in the first value range, and the second message is not correctly received.

In one embodiment, the first signature sequence is mapped to the first shared resource unit in the first association pattern period; the first value is a value in the second value range, the first value indicated by the first field being a transmit power adjustment offset of the third message.

In one embodiment, the first signature sequence is not mapped to any of the multiple shared resource units in the first association pattern period, the first value belonging to one of the first value range or the second value range, and the first value being a transmit power adjustment offset of the third message.

In one embodiment, the second message is not correctly received, and the second message is not used for triggering the third message.

In one embodiment, the second message is not correctly received, and information indicated by the second message is not used.

In one embodiment, the second message is not correctly received, and the second time-frequency resource block indicated by the second message is not used for transmitting the third message.

In one embodiment, the second message is correctly received, and the second message is used for triggering the third message.

Embodiment 7A

Embodiment 7A illustrates a schematic diagram of relations among a first signature sequence, a shared channel resource unit and a first message according to one embodiment of the present application, as shown in FIG. 7A. In FIG. 7A, the square without filling represents a first signature sequence in the present application. In Case A illustrated in FIG. 7A, the rectangle filled with oblique grids represents a shared channel resource unit in the present application.

In Case A illustrated in Embodiment 7A, the first message in the present application comprises a first signature sequence and a first signal; the first signature sequence is associated with a shared channel resource unit; the shared channel resource unit is used for transmission of the first signal. In Case B illustrated in Embodiment 7A, the first message in the present application comprises a first signature sequence; the first signature sequence is not associated with a shared channel resource unit.

In one embodiment, the first message comprises a baseband signal.

In one embodiment, the first message comprises a radio frequency signal.

In one embodiment, the first message comprises a radio signal.

In one embodiment, a channel occupied by the first message comprises a Random Access Channel (RACH).

In one embodiment, channels occupied by the first message comprise a RACH and an Uplink Shared Channel (UL-SCH).

In one embodiment, channels occupied by the first message comprise a Physical Random Access Channel (PRACH) and a Physical Uplink Shared Channel (PUSCH).

In one embodiment, a channel occupied by the first message comprises a Narrowband Physical Random Access Channel (NPRACH).

In one embodiment, the first message comprises the first signature sequence.

In one embodiment, the first message comprises the first signature sequence and the first signal.

In one embodiment, the first message comprises the first signature sequence and the first signal, the first signature sequence being associated with one of the positive integer number of shared channel resource unit(s) comprised in the first period, the said one of the positive integer number of shared channel resource unit(s) comprised in the first period being used for transmitting the first signal.

In one embodiment, the first message comprises the first signature sequence but does not comprise the first signal.

In one embodiment, the first signature sequence in the first message occupies a PRACH, while the first signal in the first message occupies a PUSCH.

In one embodiment, the first signature sequence in the first message occupies a random access occasion in the first period, while the first signal in the first message occupies a shared channel occasion in the first period.

In one embodiment, the first signature sequence in the first message occupies a random access occasion in the first period, while the first signal in the first message occupies a shared channel resource unit in the first period, the first signature sequence being associated with the shared channel resource unit in the first period.

In one embodiment, the phrase that the first signature sequence is associated with a shared channel resource unit in the first period means that the first message comprises the first signature sequence and the first signal, and a shared channel resource unit in the first period is used for transmitting the first signal in the first message.

In one embodiment, the first signature sequence in the first message occupies a random access occasion in the first period, the first signature sequence not being associated with any of the positive integer number of shared channel resource unit(s) comprised in the first period.

In one embodiment, the first signature sequence in the first message occupies a random access occasion in the first period, and the first message does not comprise the first signal, the first signature sequence not being associated with any of the positive integer number of shared channel resource unit(s) comprised in the first period.

In one embodiment, the phrase that the first signature sequence is not associated with a shared channel resource unit in the first period means that the first message comprises the first signature sequence but does not comprise the first signal, and any of the positive integer number of shared channel resource unit(s) comprised in the first period is not used for transmitting the first message.

In one embodiment, the first message is a first message comprised in a Random Access Procedure.

In one embodiment, the first message is a Message A (MsgA) comprised in a random access procedure.

In one embodiment, the first message is an MsgA comprised in a Type-2 Random Access Procedure.

In one embodiment, the definition of Type-2 Random Access Procedure can be found in 3GPP TS38.213, Section 8.

In one embodiment, the first message carries a first identifier.

In one embodiment, the first message carries a first identifier and a second identifier.

In one embodiment, the first signature sequence in the first message indicates the first identifier.

In one embodiment, the first signature sequence in the first message indicates the first identifier, and the first signal in the first message comprises the second identifier.

In one embodiment, the first signature sequence in the first message indicates the first identifier, and the first signal in the first message comprises the first identifier and the second identifier.

In one embodiment, the first identifier and the second identifier are used for scrambling the first signal in the first message.

In one embodiment, the first message carries the first identifier, and the first message does not carry the second identifier.

In one embodiment, the first identifier is an index of the first signature sequence in a positive integer number of signature sequences configured in the first time interval.

In one embodiment, the first identifier is a Random Access Preamble Identifier (RAPID).

In one embodiment, the first identifier is an Extended RAPID.

In one embodiment, the second identifier is a Temporary Cell-RNTI (TC-RNTI).

In one embodiment, the second identifier is a Cell-RNTI (C-RNTI).

In one embodiment, the second identifier is a random number.

In one embodiment, the second identifier is a TC-RNTI occupied by the first node.

In one embodiment, the second identifier is a C-RNTI occupied by the first node.

In one embodiment, the second identifier is a random number generated by the first node.

In one embodiment, the first identifier is a positive integer.

In one embodiment, the first identifier is a positive integer of 1 through 64.

In one embodiment, the first identifier is a positive integer of 0 through 63.

In one embodiment, the second identifier is a positive integer.

In one embodiment, the second identifier comprises a positive integer number of bit(s).

In one embodiment, the second identifier comprises 8 bits.

In one embodiment, the first signature sequence is a signature sequence among the Q signature sequences.

In one embodiment, the first signature sequence belongs to one of the first signature sequence group or the second signature sequence group.

In one embodiment, the first signature sequence is transmitted over the first time interval.

In one embodiment, the first signature sequence is transmitted on a random access occasion in the first period.

In one embodiment, the first signature sequence is a pseudo-random sequence.

In one embodiment, the first signature sequence is a Gold sequence.

In one embodiment, the first signature sequence is an M sequence.

In one embodiment, the first signature sequence is a Zadeoff-Chu (ZC) sequence.

In one embodiment, the first signature sequence comprises a Random Access Preamble.

In one embodiment, the first signature sequence is a preamble sequence.

In one embodiment, the first signature sequence is used for generating the first message.

In one embodiment, the first message is obtained by the first signature sequence sequentially through Sequence Generation, DFT, Modulation and Resource Element Mapping, as well as Wideband Symbol Generation.

In one embodiment, the first signal is transmitted on a UL-SCH.

In one embodiment, the first signal is transmitted on a PUSCH.

In one embodiment, the first signal is transmitted on a shared channel occasion in the first period.

In one embodiment, the first signal is transmitted on a shared channel resource unit in the first period.

In one embodiment, the first signal comprises all or part of a Higher Layer signaling.

In one embodiment, the first signal comprises all or part of an RRC layer signaling.

In one embodiment, the first signal comprises one or more fields in an RRC IE.

In one embodiment, the first signal comprises all or part of a MAC layer signaling.

In one embodiment, the first signal comprises one or more fields in a MAC CE.

In one embodiment, the first signal comprises one or more fields in a PHY layer signaling.

In one embodiment, the first signal comprises RRC-Connection related information.

In one embodiment, the first signal comprises Small Data.

In one embodiment, the first signal comprises Control-Plane (C-Plane) information.

In one embodiment, the first signal comprises User-Plane (U-Plane) information.

In one embodiment, the first signal comprises an RRC Message.

In one embodiment, the first signal comprises a Non Access Stratum (NAS) message.

In one embodiment, the first signal comprises Service Data Adaptation Protocol (SDAP) data.

In one embodiment, the first signal is a shared channel payload of an MsgA in a random access procedure.

In one embodiment, the first signal is a PUSCH payload of an MsgA in a random access procedure.

In one embodiment, the first signal is a PUSCH payload of an MsgA in a Type-2 random access procedure.

In one embodiment, the first signature sequence is a random access preamble, while the first signal comprises RRC-Connection related information.

In one embodiment, the first signature sequence is a random access preamble, while the first signal comprises Small Data.

In one embodiment, the first signature sequence is a random access preamble, while the first signal comprises C-Plane information.

In one embodiment, the first signature sequence is a random access preamble, while the first signal comprises U-Plane information.

In one embodiment, the first signature sequence is a random access preamble, while the first signal comprises an RRC message.

In one embodiment, the first signature sequence is a random access preamble, while the first signal comprises SDAP data.

In one embodiment, the first signature sequence is a random access preamble, while the first signal comprises a NAS message.

In one embodiment, the first signature sequence is a PRACH preamble of an MsgA in a Type-2 random access procedure, and the first signal is a PUSCH payload of an MsgA in a Type-2 random access procedure.

In one embodiment, the RRC-Connection related information comprises at least one of an RRC Setup Request, an RRC Resume Request, an RRC Resume Request1, an RRC Reestablishment Request, an RRC Reconfiguration Complete, an RRC Handover Confirm or an RRC Early Data Request.

In one embodiment, the RRC-Connection related information comprises at least one of an RRC Connection Request, an RRC Connection Resume Request, an RRC Connection Re-establishment, an RRC Handover Confirm, or an RRC Connection Reconfiguration Complete, an RRC Early Data Request, an RRC Setup Request, or an RRC Resume Request, an RRC Resume Request1, an RRC Reestablishment Request, or an RRC Reconfiguration Complete.

In one embodiment, a first bit block comprises a positive integer number of bit(s), and the first signal comprises all or partial bit(s) in the first bit block.

In one embodiment, the first bit block is used for generating the first signal, the first bit block comprising a positive integer number of bit(s).

In one embodiment, a first bit block comprises a positive integer number of bits, where all or partial bit(s) among the positive integer number of bits comprised in the first bit block is/are used for generating the first signal.

In one embodiment, the first bit block comprises a Codeword (CW).

In one embodiment, the first bit block comprises a Code Block (CB).

In one embodiment, the first bit block comprises a Code Block Group (CBG).

In one embodiment, the first bit block comprises a Transport Block (TB).

In one embodiment, the first signal is obtained by all or part of bits in the first bit block sequentially through Cyclic Redundancy Check (CRC) Attachment, Code Block Segmentation, CB-level CRC Attachment, Channel Coding, Rate matching, Code Block Concatenation, Scrambling, and Modulation, Layer Mapping, Antenna Port Mapping, Mapping to Physical Resource Blocks and Baseband Signal Generation, and Modulation and Up conversion.

In one embodiment, the first signal is an output by the first bit block sequentially through a Modulation Mapper, a Layer Mapper, Precoding, a Resource Element Mapper and Multicarrier Symbol Generation.

In one embodiment, the channel coding is based on a polar code.

In one embodiment, the channel coding is based on a Low-density Parity-Check (LDPC) code.

In one embodiment, only the first bit block is used for generating the first signal.

In one embodiment, there is at least one bit block other than the first bit block being used for generating the first signal.

Embodiment 7B

Embodiment 7B illustrates a schematic diagram of a relationship between first data and a third message according to one embodiment of the present application, as shown in FIG. 7B. In the upper part of the FIG. 7B, the rectangle filled with slashes represents a Redundancy Version (RV) #1 of a first bit block used for generating the first data in the first bit block; in the lower part, the rectangle filled with slashes represents an RV #3 of a first bit block used for generating the third message in the first bit block.

In Embodiment 7B, when the first signature sequence is mapped to the first shared resource unit, the first field in the second message is used to indicate whether a Hybrid Automatic Repeat request (HARQ) Redundancy Version (RV) of the third message and a HARQ RV of the first data are the same; when the first signature sequence is not mapped to any of the multiple shared resource units indicated by the second configuration information, the first field in the second message is reserved.

In one embodiment, the first signature sequence is mapped to the first shared resource unit in the first association pattern period; the first field indicates whether a Hybrid Automatic Repeat request (HARQ) Redundancy Version (RV) of the third message and a HARQ RV of the first data are the same.

In one embodiment, the first signature sequence is mapped to the first shared resource unit in the first association pattern period; the first field in the second message indicates that a Hybrid Automatic Repeat request (HARQ) Redundancy Version (RV) of the third message and a HARQ RV of the first data in the first message are different.

In one embodiment, the first signature sequence is mapped to the first shared resource unit in the first association pattern period; the first field in the second message indicates that a Hybrid Automatic Repeat request (HARQ) Redundancy Version (RV) of the third message and a HARQ RV of the first data in the first message are the same.

In one embodiment, the first signature sequence is mapped to the first shared resource unit in the first association pattern period; the first field in the second message being "1" indicates that a Hybrid Automatic Repeat request (HARQ) Redundancy Version (RV) of the third message and a HARQ RV of the first data in the first message are different; while the first field in the second message being "0" indicates that a HARQ RV of the third message and a HARQ RV of the first data in the first message are the same.

In one embodiment, the first signature sequence is mapped to the first shared resource unit in the first association pattern period; the first field in the second message indicates a Hybrid Automatic Repeat request (HARQ) Redundancy Version (RV) of the third message.

In one embodiment, the first signature sequence is mapped to the first shared resource unit in the first association pattern period; the first field in the second message being "0" indicates that a Hybrid Automatic Repeat request (HARQ) Redundancy Version (RV) of the third message is an RV #1 of the first bit block; while the first field in the second message being "1" indicates that a HARQ RV of the third message is an RV #3 of the first bit block.

In one embodiment, each bit comprised in an RV #1 of the first bit block belongs to the first bit block, while each bit comprised in an RV #3 of the first bit block belongs to the first bit block, and the bit(s) comprised in the RV #1 of the first bit block and the bit(s) comprised in the RV #3 of the first bit block are different.

In one embodiment, the first signature sequence isn't mapped to any shared resource unit among the multiple shared resource units in the first association pattern period, the first field in the second message being reserved.

In one embodiment, the first signature sequence isn't mapped to any shared resource unit among the multiple shared resource units in the first association pattern period, the first field in the second message not being used to indicate any information.

Embodiment 8A

Figure 8A:
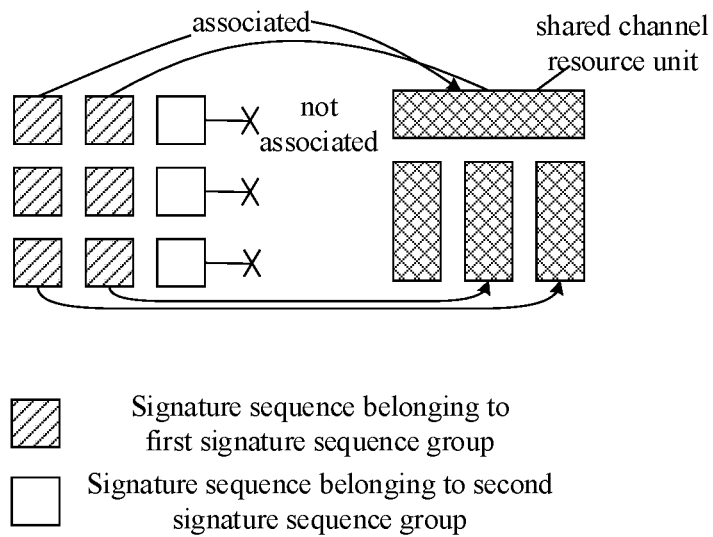
FIG. 8A illustrates a schematic diagram of relations among a first signature sequence group, a second signature sequence group and Q signature sequences according to one embodiment of the present application.

Embodiment 8A illustrates a schematic diagram of relations among a first signature sequence group, a second signature sequence group and a shared channel resource unit according to one embodiment of the present application, as shown in FIG. 8A. As illustrated in FIG. 8A, squares filled with slashes represent signature sequences belonging to a first signature sequence group in the present application; squares without fillings represent signature sequences belonging to a second signature sequence group in the present application; the rectangle filled with oblique grids represents a shared channel resource unit in the present application; the arrow indicates being associated; and the cross symbol indicates being unassociated.

In Embodiment 8A, any of the Q signature sequence belongs to one of the first signature sequence group or the second signature sequence group; any signature sequence in the first signature sequence group is associated with a shared channel resource unit in the first period; any signature sequence in the second signature sequence group is not associated with any shared channel resource unit in the first period.

In one embodiment, the first signature sequence group comprises a positive integer number of signature sequence(s), and the second signature sequence group comprises a positive integer number of signature sequence(s), the positive integer number of signature sequence(s) comprised in the first signature sequence group belongs (belong) to the Q signature sequences, and the positive integer number of signature sequence(s) comprised in the second signature sequence group belongs (belong) to the Q signature sequences.

In one embodiment, any of the positive integer number of signature sequence(s) comprised in the first signature sequence group is a signature sequence among the Q signature sequences.

In one embodiment, any of the positive integer number of signature sequence(s) comprised in the second signature sequence group is a signature sequence among the Q signature sequences.

In one embodiment, any of the positive integer number of signature sequence(s) comprised in the first signature sequence group is associated with one of the positive integer number of shared channel resource unit(s) comprised in the first period.

In one embodiment, the positive integer number of signature sequence(s) comprised in the first signature sequence group is (are respectively) associated with the positive integer number of shared channel resource unit(s) comprised in the first period.

In one embodiment, M signature sequence(s) of the positive integer number of signature sequence(s) comprised in the first signature sequence group is(are) associated with one of the positive integer number of shared channel resource unit(s) comprised in the first period, where M is a positive integer.

In one embodiment, the phrase that any of the positive integer number of signature sequence(s) comprised in the first signature sequence group is associated with a shared channel resource unit in the first period means that when a target signature sequence is transmitted, the target signature sequence is any one of the positive integer number of signature sequence(s) comprised in the first signature sequence group, and a shared channel resource unit in the first period is used for transmitting a target signal, the target signal and the target signature sequence belonging to a same target message.

In one embodiment, when a target signature sequence is transmitted, the target signature sequence is any one of the positive integer number of signature sequence(s) comprised in the first signature sequence group, the target signature sequence being associated with a target shared channel resource unit, the target shared channel resource unit being a shared channel resource unit in the first period, where the target signature sequence and the target shared channel resource unit are spaced by a first time interval.

In one embodiment, the first time interval is configurable.

In one embodiment, the first time interval is fixed.

In one embodiment, the first time interval is indicated by a higher layer signaling.

In one embodiment, the first time interval is indicated by an RRC signaling.

In one embodiment, the first time interval is indicated by a SIB.

In one embodiment, the phrase that any of the positive integer number of signature sequence(s) comprised in the first signature sequence group is associated with a shared channel resource unit in the first period means that a target message comprises a target signature sequence and a target signal, the target signature sequence being any one of the positive integer number of signature sequence(s) comprised in the first signature sequence group; when the target signature sequence is transmitted, the said shared channel resource unit in the first period is used for transmitting the target signal.

In one embodiment, the target message is transmitted by the first node.

In one embodiment, the target message is a first message comprised in a random access procedure.

In one embodiment, the target message is an MsgA comprised in a random access procedure.

In one embodiment, the target message is an MsgA comprised in a Type-2 random access procedure.

In one embodiment, the target signature sequence is a random access preamble, and the target signal is a shared channel payload.

In one embodiment, the target signature sequence is a random access preamble of an MsgA in a random access procedure, and the target signal is a shared channel payload of an MsgA in a random access procedure.

In one embodiment, the target signature sequence is a PRACH preamble of an MsgA in a Type-2 random access procedure, and the target signal is a PUSCH payload of an MsgA in a random access procedure.

In one embodiment, any of the positive integer number of signature sequence(s) comprised in the second signature sequence group is not associated with any of the positive integer number of shared channel resource unit(s) comprised in the first period.

In one embodiment, the phrase that any signature sequence in the second signature sequence group is not associated with any shared channel resource unit in the first period means that a target message comprises a target signature sequence, the target signature sequence being any one of the positive integer number of signature sequence(s) comprised in the second signature sequence group; when the target signature sequence is transmitted, a shared channel resource unit in the first period is not used for transmitting a target message, the target signal and the target signature sequence belonging to a same target message.

In one subembodiment, the target message does not comprise the target signal.

In one subembodiment, the target signature sequence is a random access preamble.

In one subembodiment, the target signature sequence is a random access preamble of an MsgA in a random access procedure.

In one subembodiment, the target signature sequence is a PRACH preamble of an MsgA in a Type-2 random access procedure.

In one embodiment, the first period comprises the Q signature sequences and N shared channel resource unit(s), N being a positive integer.

In one embodiment, the N shared channel resource unit(s) is(are) determined by the X shared channel resource groups and the X reference signal resource groups together.

In one embodiment, the N shared channel resource unit(s) is(are) indicated by the first signaling group.

In one embodiment, the N shared channel resource unit(s) is(are) indicated by the positive integer number of first-type signaling(s) comprised in the first signaling group.

In one embodiment, the N shared channel resource unit(s) is(are) indicated jointly by at least two of the positive integer number of first-type signalings comprised in the first signaling group.

In one embodiment, the N shared channel resource unit(s) is(are) indicated jointly by configured parameters transmitted by a PRACH and a first-type signaling indicating X shared channel occasions in the first period comprised in the first signaling group.

In one embodiment, the N shared channel resource unit(s) is(are) indicated jointly by at least three of the positive integer number of first-type signalings comprised in the first signaling group.

In one embodiment, the N shared channel resource unit(s) is(are) indicated jointly by RACH-ConfigCommon, msgA-PUSCH-config and PDCCH-Config in the first signaling group.

In one embodiment, the first signature sequence group comprises N1 signature sequence sub-group(s), and any of the N1 signature sequence sub-group(s) comprises M signature sequence(s), the N1 signature sequence sub-group(s) comprised in the first signature sequence group is (are respectively) associated with N1 shared channel resource unit(s) in the first period, where M is a positive integer and N1 is a positive integer no greater than N.

In one embodiment, any of the N1 shared channel resource unit(s) comprised in the first period is associated with one of the N1 signature sequence sub-group(s) comprised in the first signature sequence group, and any of the N1 signature sequence sub-group(s) comprises M signature sequence(s), where M is a positive integer and N1 is a positive integer no greater than N.

In one embodiment, the M=ceiling(Q/N).

In one embodiment, the M is a ratio of Q to N being rounded up to a nearest integer.

In one embodiment, the M is fixed.

In one embodiment, the M is configurable.

In one embodiment, the N1 signature sequence sub-groups comprised in the first signature sequence group are associated with the N1 shared channel resources sequentially in an ascending order of frequency domain, then in an ascending order of reference signal resource indexes and in an ascending order of time domain.

In one embodiment, the N1 signature sequence sub-groups comprised in the first signature sequence group are associated with the N1 shared channel resources sequentially in an ascending order of frequency domain, then in an ascending order of reference signal resource indexes and in an ascending order of time domain within a slot, and finally in an ascending order of slot indexes.

In one embodiment, the positive integer number of signature sequences comprised in the first signature sequence group are associated with the N1 shared channel resources sequentially in an ascending order of frequency domain, then in an ascending order of reference signal resource indexes and in an ascending order of time domain.

In one embodiment, transmitting one of the Q signature sequences and transmitting on an associated shared channel resource unit are atomic (i.e., simultaneously transmitting or simultaneously not transmitting).

In one embodiment, time-frequency resources occupied by one of the Q signature sequences are used to determine time-frequency resources occupied by an associated shared channel resource unit.

Embodiment 8B

Figure 8B:
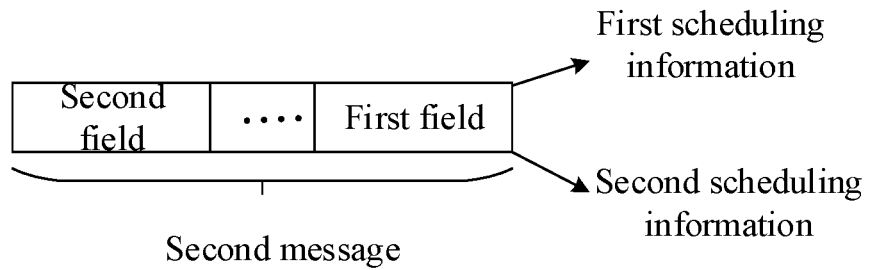
FIG. 8B illustrates a schematic diagram of a relationship between a first time window and a second time window according to one embodiment of the present application.

Embodiment 8B illustrates a schematic diagram of a relationship between a first field in a second message and a second field in a second message according to one embodiment of the present application, as shown in FIG. 8B.

In Embodiment 8B, the first signature sequence is mapped to the first shared resource unit in the first association pattern period; the second message comprises a second field; the second field is used to determine that the first field indicates one of first scheduling information or second scheduling information; the first scheduling information indicates time-frequency resources occupied by the second time-frequency resource block; the second scheduling information indicates that the second time-frequency resource block is one of the multiple shared resource units in the first association pattern period.

In one embodiment, the second field in the second message comprises a positive integer number of bit(s).

In one embodiment, the second field in the second message comprises one bit.

In one embodiment, the second message comprises the first field and the second field; when the second field in the second message is a first value, the first field indicates the first scheduling information; when the second field in the second message is a second value, the first field indicates the second scheduling information.

In one embodiment, the first value is 0, and the second value is 1.

In one embodiment, the first value is 1, and the second value is 0.

In one embodiment, the second message comprises the first field and the second field; when the second field in the second message is 0, the first field indicates the first scheduling information; when the second field in the second message is 1, the first field indicates the second scheduling information.

In one embodiment, the second message comprises the first field and the second field; when the second field in the second message is 1, the first field indicates the first scheduling information; when the second field in the second message is 0, the first field indicates the second scheduling information.

In one embodiment, the first scheduling information indicates time-domain resources occupied by the second time-frequency resource block.

In one embodiment, the first scheduling information indicates frequency-domain resources occupied by the second time-frequency resource block.

In one embodiment, the first scheduling information indicates time-frequency resources occupied by the second time-frequency resource block.

In one embodiment, the second scheduling information indicates one of the multiple shared resource units in the first association pattern period.

In one embodiment, a first target shared resource unit is one of the multiple shared resource units in the first association pattern period occupied by the second time-frequency resource block; the second scheduling information indicates an index of the first target shared resource unit in the multiple shared resource units in the first association pattern period.

In one embodiment, a first target time-frequency resource block is time-frequency resources of one of the multiple shared resource units in the first association pattern period occupied by the second time-frequency resource block; the second scheduling information indicates an index of the first target time-frequency resource block in multiple second-type time-frequency resource blocks in the first association pattern period.

Embodiment 9A

Figure 9A:
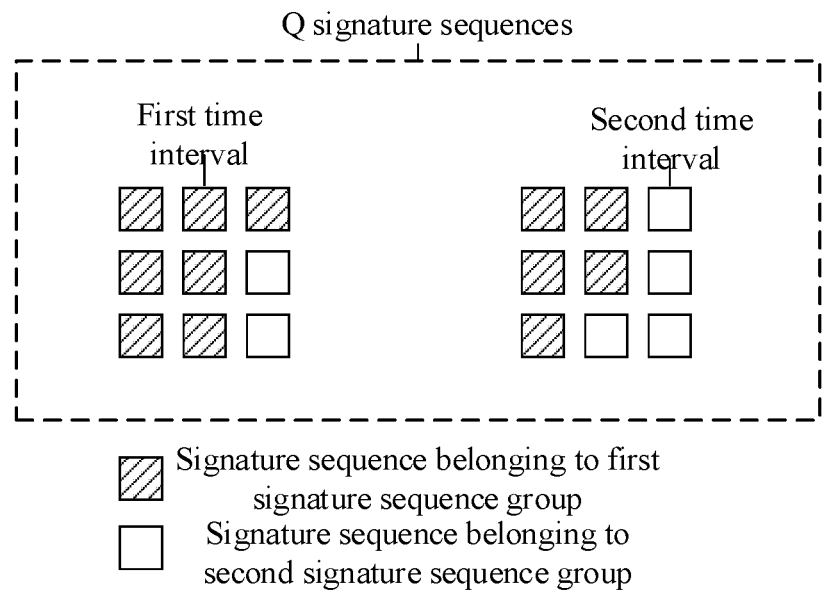
FIG. 9A illustrates a schematic diagram of a relation between a first signature sequence group, a second signature sequence group and a shared channel resource unit according to one embodiment of the present application.

Embodiment 9A illustrates a schematic diagram of relations among a first signature sequence group, a second signature sequence group and Q signature sequences according to one embodiment of the present application, as shown in FIG. 9A. As illustrated in FIG. 9A, squares filled with slashes represent signature sequences belonging to a first signature sequence group in the present application; squares without fillings represent signature sequences belonging to a second signature sequence group in the present application; squares in the broken-line frame box represents each of Q signature sequences in the present application.

In Embodiment 9A, any of the Q signature sequence belongs to the first signature sequence group and the second signature sequence group; the second time interval is after the first time interval; whether the first signature sequence belongs to the first signature sequence group or the second signature sequence group is used for selecting the second signature sequence.

In one embodiment, the first time interval belongs to the first period.

In one embodiment, the first time interval comprises a RACH.

In one embodiment, the first time interval comprises a PRACH.

In one embodiment, the first time interval comprises an NPRACH.

In one embodiment, the first time interval comprises a positive integer number of multicarrier symbol(s).

In one embodiment, the first time interval comprises multiple multicarrier symbols.

In one embodiment, the first time interval comprises a positive integer number of subframe(s).

In one embodiment, the first time interval comprises a Radio Frame.

In one embodiment, the first time interval comprises a positive integer number of RACH Occasion(s) (RO(s)).

In one embodiment, the first time interval is an RO.

In one embodiment, the first time interval is an RO in the first period.

In one embodiment, the first time interval comprises a positive integer number of PRACH Occasion(s) (PRO(s)).

In one embodiment, the first time interval is a PRO.

In one embodiment, the first time interval is a PRO in the first period.

In one embodiment, the first time interval and the second time interval both belong to the first period.

In one embodiment, the second time interval comprises a RACH.

In one embodiment, the second time interval comprises a PRACH.

In one embodiment, the second time interval comprises an NPRACH.

In one embodiment, the second time interval comprises a positive integer number of multicarrier symbol(s).

In one embodiment, the second time interval comprises multiple multicarrier symbols.

In one embodiment, the second time interval comprises a positive integer number of subframe(s).

In one embodiment, the second time interval comprises a Radio Frame.

In one embodiment, the second time interval comprises a positive integer number of RO(s).

In one embodiment, the second time interval is an RO.

In one embodiment, the second time interval is an RO in the first period.

In one embodiment, the second time interval comprises a positive integer number of PRO(s).

In one embodiment, the second time interval is a PRO.

In one embodiment, the second time interval is a PRO in the first period.

In one embodiment, the second time interval and the first time interval are orthogonal in time domain.

In one embodiment, the second time interval is earlier than the first time interval.

In one embodiment, the second time interval is later than the first time interval.

In one embodiment, a time gap between the second time interval and the first time interval comprises a positive integer number of radio frame(s).

In one embodiment, a time gap between the second time interval and the first time interval comprises a positive integer number of subframe(s).

In one embodiment, a time gap between the second time interval and the first time interval comprises multiple subframes.

In one embodiment, a time gap between the second time interval and the first time interval comprises multiple multicarrier symbols.

In one embodiment, the first time interval and the second time interval are respectively two ROs in the first period, where the first time interval and the second time interval are orthogonal in time domain, and the first time interval is earlier than the second time interval.

In one embodiment, the first time interval and the second time interval are respectively two PROs in the first period, where the first time interval and the second time interval are orthogonal in time domain, and the first time interval is earlier than the second time interval.

In one embodiment, the second signature sequence is a retransmission of the first message.

In one embodiment, the second message is used for triggering transmission of the second signature sequence.

In one embodiment, the second signature sequence is a signature sequence among the Q signature sequences.

In one embodiment, the second signature sequence belongs to one of the first signature sequence group or the second signature sequence group.

In one embodiment, the second signature sequence is transmitted over the second time interval.

In one embodiment, the second signature sequence is transmitted on a random access occasion in the first period.

In one embodiment, the first signature sequence and the second signature sequence are respectively transmitted on two random access occasions.

In one embodiment, the second signature sequence is a pseudo-random sequence.

In one embodiment, the second signature sequence is a Gold sequence.

In one embodiment, the second signature sequence is an M sequence.

In one embodiment, the second signature sequence is a ZC sequence.

In one embodiment, the second signature sequence comprises a random access preamble.

In one embodiment, the second signature sequence is a preamble sequence.

In one embodiment, the second signature sequence is used for generating a third message.

In one embodiment, the third message is obtained by the second signature sequence sequentially through Sequence Generation, DFT, Modulation and Resource Element Mapping, as well as Wideband Symbol Generation.

In one embodiment, the third message comprises a baseband signal.

In one embodiment, the third message comprises a radio frequency signal.

In one embodiment, the third message comprises a radio signal.

In one embodiment, a channel occupied by the third message includes a RACH.

In one embodiment, a channel occupied by the third message includes a PRACH.

In one embodiment, a channel occupied by the third message includes a RACH and a UL-SCH.

In one embodiment, a channel occupied by the third message includes a PRACH and a PUSCH.

In one embodiment, a channel occupied by the third message includes an NPRACH.

In one embodiment, the third message comprises the second signature sequence, the second signature sequence being a PRACH preamble.

In one embodiment, the third message comprises the second signature sequence and a second signal, the second signature sequence and the second signal respectively being a PRACH preamble and a PUSCH payload.

In one embodiment, the third message is a first message comprised in a random access procedure.

In one embodiment, the third message is an MsgA comprised in a random access procedure.

In one embodiment, the third message is an MsgA comprised in a Type-2 random access procedure.

In one embodiment, the third message comprises the second signature sequence, and the third message does not comprise the second signal, the second signature sequence being a PRACH preamble of an MsgA comprised in a Type-2 random access procedure.

In one embodiment, the third message comprises the second signature sequence and a second signal, where the second signature sequence is a PRACH preamble of an MsgA comprised in a Type-2 random access procedure, and the second signal is a PUSCH payload of an MsgA comprised in a Type-2 random access procedure.

In one embodiment, when the first signature sequence is a signature sequence in the first signature sequence group, the second signature sequence is a signature sequence in the second signature sequence group.

In one embodiment, when the first signature sequence is a signature sequence in the second signature sequence group, the second signature sequence is a signature sequence in the first signature sequence group.

In one embodiment, when the first signature sequence is a signature sequence in the first signature sequence group, the second signature sequence is chosen from the second signature sequence group.

In one embodiment, when the first signature sequence is a signature sequence in the second signature sequence group, the second signature sequence is chosen from the first signature sequence group.

Embodiment 9B

Figure 9B:
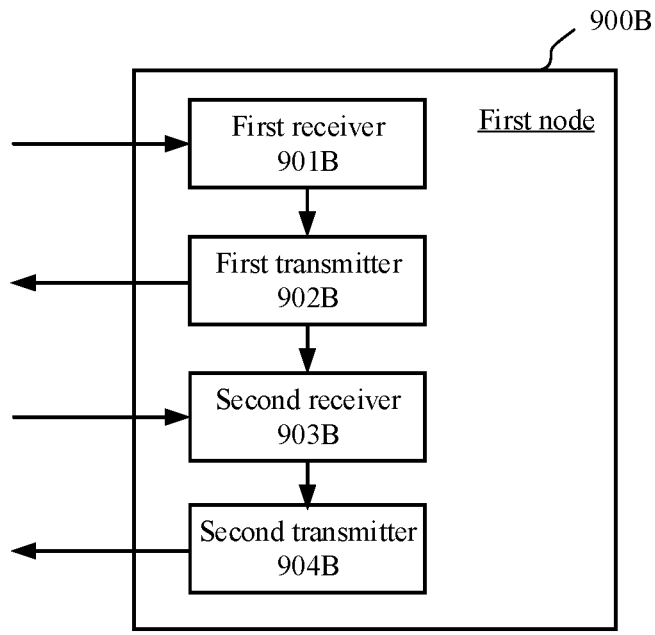
FIG. 9B illustrates a structure block diagram of a processing device in a first node according to one embodiment of the present application.

Embodiment 9B illustrates a structure block diagram of a processing device used in a first node, as shown in FIG. 9B. In Embodiment 9B, a processing device 900B in the first node is comprised of a first receiver 901B, a first transmitter 902B, a second receiver 903B and a second transmitter 904B.

In one embodiment, the first receiver 901B comprises at least one of the antenna 452, the transmitter/receiver 454, the multi-antenna receiving processor 458, the receiving processor 456, the controller/processor 459, the memory 460 or the data source 467 in FIG. 4 of the present application.

In one embodiment, the first transmitter 902B comprises at least one of the antenna 452, the transmitter/receiver 454, the multi-antenna transmitting processor 457, the transmitting processor 468, the controller/processor 459, the memory 460 or the data source 467 in FIG. 4 of the present application.

In one embodiment, the second receiver 903B comprises at least one of the antenna 452, the transmitter/receiver 454, the multi-antenna receiving processor 458, the receiving processor 456, the controller/processor 459, the memory 460 or the data source 467 in FIG. 4 of the present application.

In one embodiment, the second transmitter 904B comprises at least one of the antenna 452, the transmitter/receiver 454, the multi-antenna transmitting processor 457, the transmitting processor 468, the controller/processor 459, the memory 460 or the data source 467 in FIG. 4 of the present application.

In Embodiment 9B, the first receiver 901B receives first configuration information and second configuration information; the first transmitter 902B transmits a first message, the first message comprising at least a former one of a first signature sequence and first data; and the second receiver 903B receives a second message, the second message being used to indicate that the first signature sequence is correctly received; and the second transmitter 904B transmits a third message on a second time-frequency resource block, a first bit block being used to generate the third message; the first message and the second message belong a random access procedure; the first configuration information indicates a first time-frequency resource block, the first time-frequency resource block being used to transmit the first signature sequence in the first message; the second configuration information indicates multiple shared resource units; the first configuration information and the second configuration information are used together to determine whether the first signature sequence is mapped to one shared resource unit of the multiple shared resource units; whether the first signature sequence is mapped to one shared resource unit of the multiple shared resource units is used to determine whether the first message comprises the first data; the second message comprises a first field, and information indicated by the first field is related to whether the first message comprises the first data; the second message indicates the second time-frequency resource block.

In one embodiment, when the first signature sequence is mapped to the first shared resource unit, the first shared resource unit being one of the multiple shared resource units indicated by the second configuration information, the first message comprises the first signature sequence and the first data, the first bit block being used to generate the first data, the first data being transmitted on the first shared resource unit, and the second message indicating that the first data is not correctly received; when the first signature sequence is not mapped to any of the multiple shared resource units indicated by the second configuration information, the first message only comprises the first signature sequence between the first signature sequence and the first data.

In one embodiment, the first field in the second message indicates a first value, the first value being an integer; when the first signature sequence is mapped to the first shared resource unit, a first value belonging to one of a first value range or a second value range is used to determine whether the second message is correctly received; when the first signature sequence is not mapped to any of the multiple shared resource units indicated by the second configuration information, the first value indicates a transmit power adjustment offset of the third message.

In one embodiment, the first signature sequence is mapped to the first shared resource unit; the first value range comprises multiple negative integers, and the second value range comprises multiple non-negative integers; when the first value belongs to the first value range of the first value range or the second value range, the first value indicates that the second message is not correctly received; when the first value belongs to the second value range of the first value range or the second value range, the first value indicates a transmit power adjustment offset of the third message.

In one embodiment, when the first signature sequence is mapped to the first shared resource unit, the first field in the second message is used to indicate whether a Hybrid Automatic Repeat request (HARQ) Redundancy Version (RV) of the third message and a HARQ RV of the first data are the same; when the first signature sequence is not mapped to any of the multiple shared resource units indicated by the second configuration information, the first field in the second message is reserved.

In one embodiment, the first signature sequence is mapped to the first shared resource unit; the second message comprises a second field; the second field is used to determine that the first field indicates one of first scheduling information or second scheduling information; the first scheduling information indicates time-frequency resources occupied by the second time-frequency resource block; the second scheduling information indicates that the second time-frequency resource block is time-frequency resources occupied by one of the multiple shared resource units indicated by the second configuration information.

In one embodiment, the first node 900B is a UE.

In one embodiment, the first node 900B is a relay node.

In one embodiment, the first node 900B is a base station.

Embodiment 10A

Figure 10A:
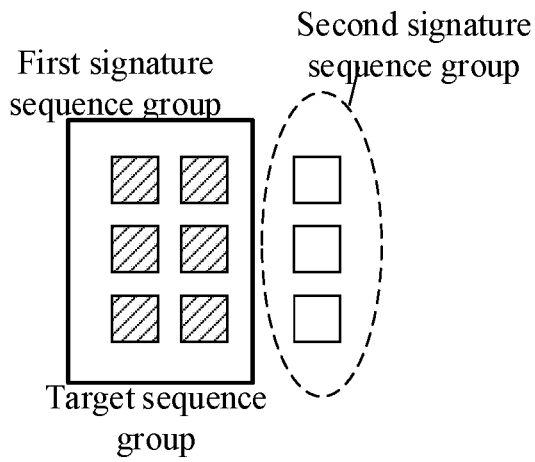
FIG. 10A illustrates a schematic diagram of relations among a first signature sequence group, a second signature sequence group and a target sequence group according to one embodiment of the present application.
Figure 10A:
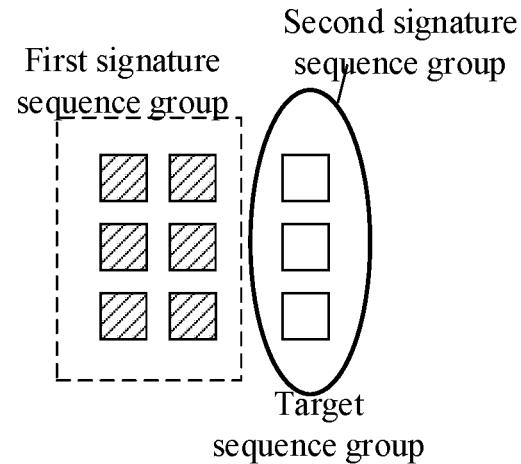

Embodiment 10A illustrates a schematic diagram of relations among a first signature sequence group, a second signature sequence group and a target sequence group according to one embodiment of the present application, as shown in FIG. 10A. As illustrated in FIG. 10A, squares filled with slashed in the rectangular box represent signature sequences belonging to a first signature sequence group in the present application; squares without fillings in the ellipse represent signature sequences belonging to a second signature sequence group in the present application. In Case A of FIG. 10A, the thick-line frame denotes that the target sequence group in the present application is the first signature sequence group; in Case B of FIG. 10A, the thick ellipse denotes that the target sequence group is the second signature sequence group.

In Embodiment 10A, the target sequence group is either of the first signature sequence group and the second signature sequence group; when the first signature sequence belongs to a target sequence group, the second signature sequence is chosen from one of the first signature sequence group and the second signature sequence group other than the target sequence group.

In one embodiment, the target sequence group is the first signature sequence group.

In one embodiment, the target sequence group is the second signature sequence group.

In one embodiment, the first signature sequence is a signature sequence in the target sequence group.

In one embodiment, the first signature sequence is selected from the target sequence group.

In one embodiment, the first node randomly selects the first signature sequence from the target sequence group.

In one embodiment, the first signature sequence is selected from the target sequence group with equal probability.

In one embodiment, each signature sequence in the target sequence group is selected as the first signature sequence with equal probability.

In one embodiment, when the target sequence group is the first signature sequence group, the second signature sequence is chosen from the second signature sequence group; when the target sequence group is the second signature sequence group, the second signature sequence is chosen from the first signature sequence group.

In one embodiment, when the target sequence group is the first signature sequence group, the second signature sequence is a signature sequence in the second signature sequence group; when the target sequence group is the second signature sequence group, the second signature sequence is a signature sequence in the first signature sequence group.

In one embodiment, when the second signature sequence is chosen from the second signature sequence group, the first node randomly selects the second signature sequence from the second signature sequence group.

In one embodiment, when the second signature sequence is chosen from the second signature sequence group, each signature sequence in the second signature sequence group is selected as the second signature sequence with equal probability.

In one embodiment, when the second signature sequence is chosen from the first signature sequence group, the first node randomly selects the second signature sequence from the first signature sequence group.

In one embodiment, when the second signature sequence is chosen from the first signature sequence group, each signature sequence in the first signature sequence group is selected as the second signature sequence with equal probability.

In one embodiment, the first node cannot continuously selects a signature sequence from the target signature sequence group.

Embodiment 10B

Figure 10B:
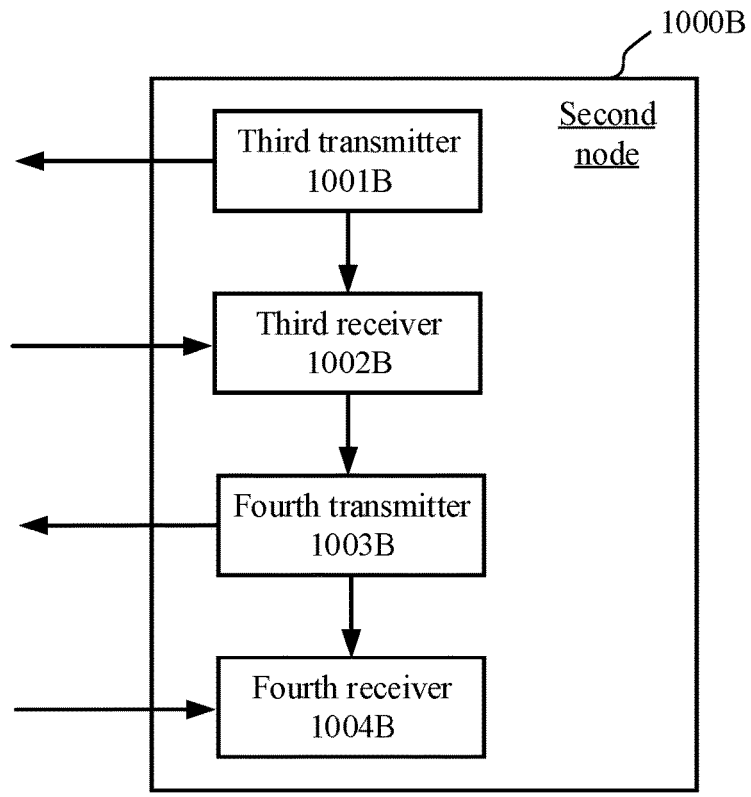
FIG. 10B illustrates a structure block diagram of a processing device in a second node according to one embodiment of the present application.

Embodiment 10B illustrates a structure block diagram of a processing device used in a third node, as shown in FIG. 10B. In FIG. 10B, a processing device 1000B in a second node is comprised of a third transmitter 1001B, a third receiver 1002B, a fourth transmitter 1003B and a fourth receiver 1004B.

In one embodiment, the third transmitter 1001B comprises at least one of the antenna 420, the transmitter/receiver 418, the multi-antenna transmitting processor 471, the transmitting processor 416, the controller/processor 475 or the memory 476 in FIG. 4 of the present application.

In one embodiment, the third receiver 1002B comprises at least one of the antenna 420, the transmitter/receiver 418, the multi-antenna receiving processor 472, the receiving processor 470, the controller/processor 475 or the memory 476 in FIG. 4 of the present application.

In one embodiment, the fourth transmitter 1003B comprises at least one of the antenna 420, the transmitter/receiver 418, the multi-antenna transmitting processor 471, the transmitting processor 416, the controller/processor 475 or the memory 476 in FIG. 4 of the present application.

In one embodiment, the fourth receiver 1004B comprises at least one of the antenna 420, the transmitter/receiver 418, the multi-antenna receiving processor 472, the receiving processor 470, the controller/processor 475 or the memory 476 in FIG. 4 of the present application.

In Embodiment 10B, the third transmitter 1001B transmits first configuration information and second configuration information; the third receiver 1002B receives a first message, the first message comprising at least a former one of a first signature sequence and first data; and the fourth transmitter 1003B transmits a second message, the second message being used to indicate that the first signature sequence is correctly received; and the fourth receiver 1004B receives a third message on a second time-frequency resource block, a first bit block being used to generate the third message; the first message and the second message belong a random access procedure; the first configuration information indicates a first time-frequency resource block, the first time-frequency resource block being used to transmit the first signature sequence in the first message; the second configuration information indicates multiple shared resource units; the first configuration information and the second configuration information are used together to determine whether the first signature sequence is mapped to one shared resource unit of the multiple shared resource units; whether the first signature sequence is mapped to one shared resource unit of the multiple shared resource units is used to determine whether the first message comprises the first data; the second message comprises a first field, and information indicated by the first field is related to whether the first message comprises the first data; the second message indicates the second time-frequency resource block.

In one embodiment, when the first signature sequence is mapped to the first shared resource unit, the first shared resource unit being one of the multiple shared resource units indicated by the second configuration information, the first message comprises the first signature sequence and the first data, the first bit block being used to generate the first data, the first data being transmitted on the first shared resource unit, and the second message indicating that the first data is not correctly received; when the first signature sequence is not mapped to any of the multiple shared resource units indicated by the second configuration information, the first message only comprises the first signature sequence between the first signature sequence and the first data.

In one embodiment, the first field in the second message indicates a first value, the first value being an integer; when the first signature sequence is mapped to the first shared resource unit, a first value belonging to one of a first value range or a second value range is used to determine whether the second message is correctly received; when the first signature sequence is not mapped to any of the multiple shared resource units indicated by the second configuration information, the first value indicates a transmit power adjustment offset of the third message.

In one embodiment, the first signature sequence is mapped to the first shared resource unit; the first value range comprises multiple negative integers, and the second value range comprises multiple non-negative integers; when the first value belongs to the first value range of the first value range or the second value range, the first value indicates that the second message is not correctly received; when the first value belongs to the second value range of the first value range or the second value range, the first value indicates a transmit power adjustment offset of the third message.

In one embodiment, when the first signature sequence is mapped to the first shared resource unit, the first field in the second message is used to indicate whether a Hybrid Automatic Repeat request (HARQ) Redundancy Version (RV) of the third message and a HARQ RV of the first data are the same; when the first signature sequence is not mapped to any of the multiple shared resource units indicated by the second configuration information, the first field in the second message is reserved.

In one embodiment, the first signature sequence is mapped to the first shared resource unit; the second message comprises a second field; the second field is used to determine that the first field indicates one of first scheduling information or second scheduling information; the first scheduling information indicates time-frequency resources occupied by the second time-frequency resource block; the second scheduling information indicates that the second time-frequency resource block is time-frequency resources occupied by one of the multiple shared resource units indicated by the second configuration information.

In one embodiment, the second node 1000B is a UE.

In one embodiment, the second node 1000B is a base station.

In one embodiment, the second node 1000B is a relay node.

Embodiment 11

Figure 11:
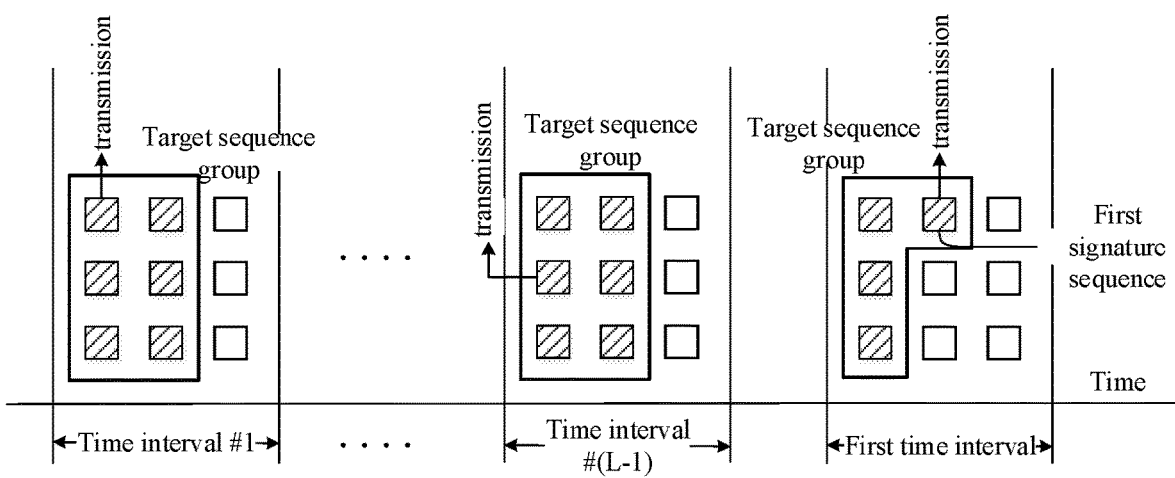
FIG. 11 illustrates a schematic diagram of relations between L−1 signature sequence(s) and a target sequence group according to one embodiment of the present application.

Embodiment 11 illustrates a schematic diagram of relations between L−1 signature sequence(s) and a target sequence group according to one embodiment of the present application, as shown in FIG. 11. In FIG. 11, the squares represent the Q signature sequences in the present application; the squares filled with oblique lines in the thick-line frame represent signature sequences in the target sequence group in the present application.

In Embodiment 11, the L−1 signature sequence(s) is (are respectively) transmitted in the L−1 time interval(s), L being a positive integer greater than 1; each of the L−1 time interval(s) is earlier than the first time interval; each of the L−1 signature sequence(s) belongs to the target signature sequence group.

In one embodiment, the first node performs L−1 transmission(s) before the first time interval, L being a positive integer greater than 1 and less than Q; each transmitted signature sequence in the L−1 transmission(s) is one of the Q signature sequences; and each transmitted signature sequence in the L−1 transmission(s) is not the first signature sequence, i.e., the first signature sequence is transmitted with a probability of 1/(Q+1−L) in the first time interval.

In one embodiment, the L−1 transmission(s) is(are) the latest L−1 transmission(s) of contention-based RACH preamble of the first node.

In one embodiment, the L−1 transmission(s) is(are) the latest L−1 transmission(s) of contention-based PRACH preamble of the first node.

In one subembodiment, the first node cannot consecutively select a signature sequence from the target sequence group for more than L times.

In one embodiment, each of the L−1 signature sequence(s) belongs to the Q signature sequences.

In one embodiment, any of the L−1 signature sequence(s) is a signature sequence among the Q signature sequences.

In one embodiment, any of the L−1 signature sequence(s) is selected by the first node from the target sequence group.

In one embodiment, the L−1 signature sequence(s) and the first signature sequence belong to the target sequence group.

In one embodiment, when the target sequence group is the first signature sequence group, the L−1 signature sequence(s) and the first signature sequence belong to the first signature sequence group.

In one embodiment, when the target sequence group is the second signature sequence group, the L−1 signature sequence(s) and the first signature sequence belong to the second signature sequence group.

In one embodiment, the L−1 signature sequence(s) and the first signature sequence belong to the first signature sequence group, while the second signature sequence belongs to the second signature sequence group.

In one embodiment, the L−1 signature sequence(s) and the first signature sequence belong to the second signature sequence group, while the second signature sequence belongs to the first signature sequence group.

In one embodiment, the first node transmits L−1 first-type message(s) in sequence, any of the L−1 first-type message(s) being a first message in a random access procedure.

In one embodiment, the first node transmits L−1 first-type message(s) in sequence, any of the L−1 first-type message(s) being an MsgA in a random access procedure.

In one embodiment, the first node transmits L−1 first-type message(s) in sequence, any of the L−1 first-type message(s) being an MsgA in a Type-2 random access procedure.

In one embodiment, the L−1 first-type message(s) comprises (respectively comprise) the L−1 signature sequence(s).

In one embodiment, the L−1 signature sequence(s) generates (respectively generate) the L−1 first-type message(s).

In one embodiment, any two time intervals among the L−1 time intervals are non-overlapping.

In one embodiment, any two time intervals among the L−1 time intervals are orthogonal in time domain.

In one embodiment, each of the L−1 time interval(s) belongs to the first period.

In one embodiment, any of the L−1 time interval(s) comprises a PRACH.

In one embodiment, any of the L−1 time interval(s) comprises a positive integer number of multicarrier symbol(s).

In one embodiment, any of the L−1 time interval(s) comprises multiple multicarrier symbols.

In one embodiment, any of the L−1 time interval(s) comprises a positive integer number of RO(s).

In one embodiment, any of the L−1 time interval(s) is an RO in the first period.

In one embodiment, any of the L−1 time interval(s) comprises a positive integer number of PRO(s).

In one embodiment, any of the L−1 time interval(s) is a PRO in the first period.

In one embodiment, the L is configured by a base station.

In one embodiment, the L is fixed.

In one embodiment, the first signaling group explicitly indicates the L.

In one embodiment, the first signature sequence group and the second signature sequence group respectively comprise Q1 signature sequences and Q2 signature sequences, where the Q1 and Q2 are positive integers, respectively, and L is dependent upon the Q1 and Q2.

In one embodiment, a sum of the Q1 and the Q2 is equal to the Q.

In one embodiment, the target sequence group is the first signature sequence group, where L increase with Q1/Q2.

In one subembodiment, L is a minimum positive integer no less than Q1/Q2.

In one subembodiment, L is T times as large as a minimum positive integer no less than Q1/Q2, where T is a positive integer greater than 1.

In one embodiment, the target sequence group is the second signature sequence group, where L increase with Q2/Q1.

In one subembodiment, L is a minimum positive integer no less than Q2/Q1.

In one subembodiment, L is T times as large as a minimum positive integer no less than Q2/Q1, where T is a positive integer greater than 1.

In one embodiment, the T is fixed.

In one embodiment, the T is configurable.

Embodiment 12

Figure 12:
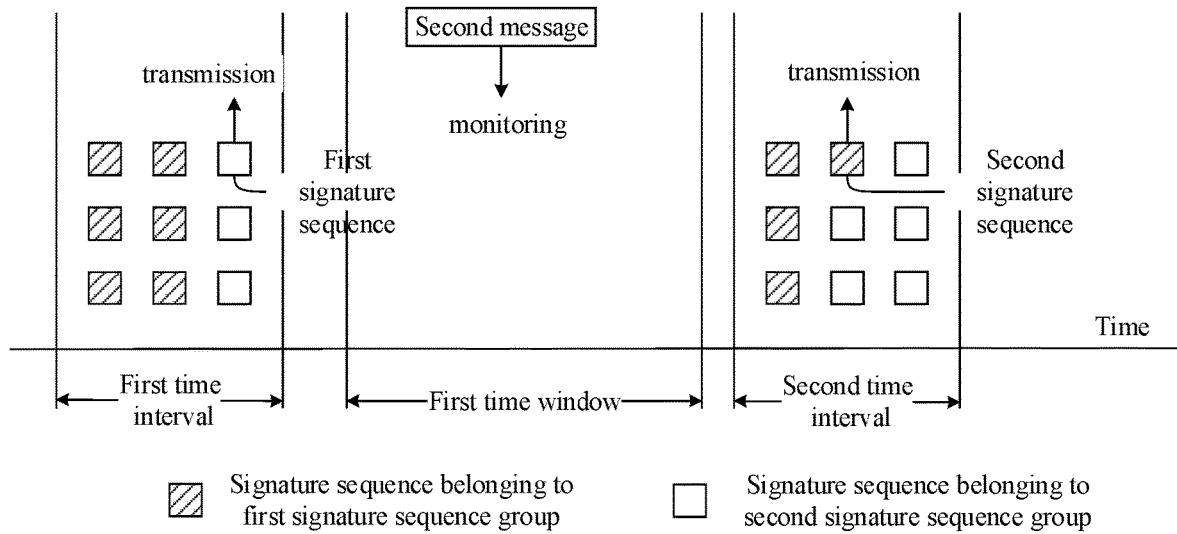
FIG. 12 illustrates a schematic diagram of relations among a first time interval, a second time interval and a first period according to one embodiment of the present application.

Embodiment 12 illustrates a schematic diagram of relations among a first time interval, a second time interval and a first time window according to one embodiment of the present application, as shown in FIG. 12. As illustrated in FIG. 12, squares filled with slashes represent signature sequences belonging to a first signature sequence group in the present application; squares without fillings represent signature sequences belonging to a second signature sequence group in the present application; the rectangle represents a second message in the present application.

In Embodiment 12, the first time window is between the first time interval and the second time interval; the second message is used to determine that the first signature sequence is correctly received; the second message is monitored in the first time window; the second message not being detected is used to trigger transmitting of the second signature sequence.

In one embodiment, the first time window is after the first time interval, and the first time window is before the second time interval.

In one embodiment, the first time window comprises a positive integer number of subframe(s).

In one embodiment, the first time window comprises a positive integer number of slot(s).

In one embodiment, the first time window comprises multiple multicarrier symbols.

In one embodiment, a start of the first time window and the first time interval are spaced by a first time offset.

In one embodiment, a start of the first time window and an end of the first time interval are spaced by a first time offset.

In one embodiment, the first time offset comprises a positive integer number of multicarrier symbol(s).

In one embodiment, the first time offset comprises a positive integer number of slot(s).

In one embodiment, a time length of the first time window in time domain is indicated by the first signaling group.

In one embodiment, the number of the positive integer number of slot(s) comprised in the first time window is indicated by the first signaling group.

In one embodiment, the first time offset is indicated by the first signaling group.

In one embodiment, the number of the positive integer number of multicarrier symbol(s) comprised in the first time offset is indicated by the first signaling group.

In one embodiment, the second message comprises a baseband signal.

In one embodiment, the second message comprises a radio frequency signal.

In one embodiment, the second message comprises a radio signal.

In one embodiment, a channel occupied by the second message comprises a Physical Downlink Control Channel (PDCCH).

In one embodiment, channels occupied by the second message comprise a PDCCH and a Physical Downlink Shared Channel (PDSCH).

In one embodiment, the second message comprises Downlink Control Information (DCI).

In one embodiment, the second message comprises a Random Access Response (RAR).

In one embodiment, the second message comprises a successRAR.

In one embodiment, the second message comprises a fallbackRAR.

In one embodiment, the definition of successRAR can be found in 3GPP TS38.321.

In one embodiment, the definition of fallbackRAR can be found in 3GPP TS38.321.

In one embodiment, the second message comprises a DCI and an RAR.

In one embodiment, the second message comprises a Timing Advance Command.

In one embodiment, the second message comprises an Uplink Grant.

In one embodiment, the second message comprises a Temporary Cell-RNTI (TC-RNTI).

In one embodiment, the first message is a first message in a random access procedure, and the second message is a second message in the random access procedure.

In one embodiment, the first message is an MsgA in a Type-2 random access procedure, and the second message is an MsgB in the Type-2 random access procedure.

In one embodiment, the second message comprises all or part of a Multimedia Access Control (MAC) layer signaling.

In one embodiment, the second message comprises one or more fields in a MAC Control Element (CE).

In one embodiment, the second message comprises one or more fields in a MAC Protocol Data Unit (PDU).

In one embodiment, the second message is a MAC PDU.

In one embodiment, the second message is a MAC Sub Protocol Data Unit (subPDU).

In one embodiment, the second message comprises all or part of a Higher Layer signaling.

In one embodiment, the second message comprises one or more fields in a physical (PHY) layer.

In one embodiment, the second message carries a positive integer number of first-type identifier(s).

In one embodiment, the second message carries a positive integer number of second-type identifier(s).

In one embodiment, the second message carries a positive integer number of first-type identifier(s) and a positive integer number of second-type identifier(s).

In one embodiment, the second message does not carry any first-type identifier, but instead carries a positive integer number of second-type identifier(s).

In one embodiment, the second message carries a positive integer number of first-type identifier(s), but does not carry any second-type identifier.

In one embodiment, the second message comprises a positive integer number of MAC subPDU(s), and at least one of the positive integer number of MAC subPDU(s) carries one of the positive integer number of first-type identifier(s) or one of the positive integer number of second-type identifier(s).

In one embodiment, the second message comprises a positive integer number of MAC subPDU(s), and at least one of the positive integer number of MAC subPDU(s) carries one of the positive integer number of first-type identifier(s).

In one embodiment, the second message comprises a positive integer number of MAC subPDU(s), and at least one of the positive integer number of MAC subPDU(s) carries one of the positive integer number of second-type identifier(s).

In one embodiment, the second message comprises a MAC subPDU, the MAC subPDU comprising a MAC subheader, the MAC subheader carrying one of the positive integer number of first-type identifier(s).

In one embodiment, the second message comprises a positive integer number of MAC subPDU(s), and at least one of the positive integer number of MAC subPDU(s) comprises a MAC subheader and a MAC RAR, where the MAC RAR carries one of the positive integer number of second-type identifier(s).

In one embodiment, the second message comprises a MAC subPDU, the MAC subPDU comprising a MAC subheader and a MAC RAR, where the MAC subheader carries one of the positive integer number of first-type identifier(s).

In one embodiment, the second message comprises a MAC PDU, the MAC PDU comprising a MAC subheader and a MAC RAR, where the MAC subheader carries one of the positive integer number of first-type identifier(s).

In one embodiment, at least one of the positive integer number of first-type identifier(s) carried by the second message is used for identifying one of the Q signature sequences.

In one embodiment, at least one of the positive integer number of first-type identifier(s) carried by the second message is a Random Access Preamble Identity (RAPID).

In one embodiment, at least one of the positive integer number of first-type identifier(s) carried by the second message is an Extended RAPID.

In one embodiment, at least one of the positive integer number of first-type identifier(s) carried by the second message is an Extended RAPID.

In one embodiment, at least one of the positive integer number of second-type identifier(s) carried by the second message is a Temporary Cell-RNTI (TC-RNTI).

In one embodiment, at least one of the positive integer number of second-type identifier(s) carried by the second message is a Cell-RNTI (C-RNTI).

In one embodiment, at least one of the positive integer number of first-type identifier(s) carried by the second message is a positive integer.

In one embodiment, at least one of the positive integer number of first-type identifier(s) carried by the second message is a positive integer of 1 through 64.

In one embodiment, at least one of the positive integer number of first-type identifier(s) carried by the second message is a positive integer of 0 through 63.

In one embodiment, at least one of the positive integer number of second-type identifier(s) carried by the second message comprises a positive integer number of bit(s).

In one embodiment, at least one of the positive integer number of second-type identifier(s) carried by the second message comprises 8 bits.

In one embodiment, the first identifier carried by the first message is one of the positive integer number of first-type identifier(s) carried by the second message.

In one embodiment, the second identifier carried by the first message is one of the positive integer number of second-type identifier(s) carried by the second message.

In one embodiment, the first identifier indicated by the first signature sequence is one of the positive integer number of first-type identifier(s) carried by the second message.

In one embodiment, the second identifier comprised in the first signal is one of the positive integer number of second-type identifier(s) carried by the second message.

In one embodiment, the first identifier carried by the first message is one of the positive integer number of first-type identifier(s) carried by the second message, while the second identifier carried by the first message is one of the positive integer number of second-type identifier(s) carried by the second message.

In one embodiment, the monitoring refers to receiving based on blind detection, namely, the first node receives a signal within the first time window and performs decoding operation; if the decoding is determined to be correct according to a CRC bit, it is determined that the second message is detected in the first time window; otherwise, it is determined that the second message is not detected in the first time window.

In one embodiment, the monitoring refers to receiving based on coherent detection, namely, the first node performs coherent reception of a radio signal in the first time window, using an RS sequence corresponding to DMRS of the second message, and measures energy of a signal obtained by the coherent reception; if the energy of the signal obtained by the coherent reception is larger than a first given threshold, it is determined that the second message is detected in the first time window; otherwise, it is determined that the second message is not detected in the first time window.

In one embodiment, the monitoring refers to receiving based on energy detection, namely, the first node senses energy of a radio signal in the first time window and averages in time to obtain a received energy; if the received energy is larger than a second given threshold, it is determined that the second message is detected in the first time window; otherwise, it is determined that the second message is not detected in the first time window.

In one embodiment, the second message being detected means that after the second message is received based on blind detection, it is determined according to a CRC bit that decoding is correct.

In one embodiment, when the second message is detected in the first time window, it is determined that the first signature sequence is correctly received.

In one embodiment, when the second message is not detected in the first time window, it is determined that the first signature sequence is not correctly received.

In one embodiment, when the second message is not detected in the first time window, it is determined that the first message is not correctly received.

In one embodiment, when the second message is not detected in the first time window, the second signature sequence is transmitted.

In one embodiment, when the first node does not detect the second message in the first time window, the second signature sequence is transmitted over the second time interval.

In one embodiment, when the second message is not detected in the first time window, the first node transmits the second signature sequence over the second time interval.

Embodiment 13

Figure 13:
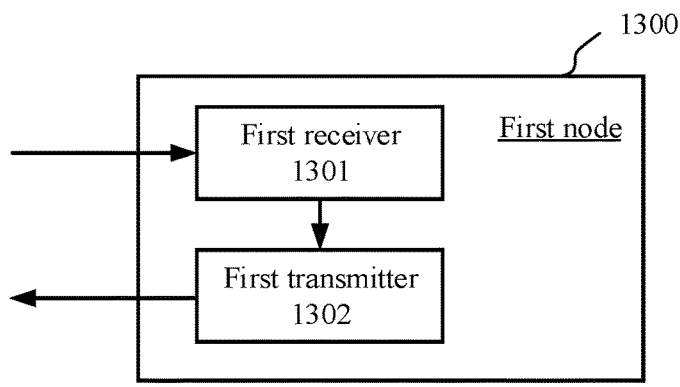
FIG. 13 illustrates a structure block diagram of a processing device in a first node according to one embodiment of the present application.

Embodiment 13 illustrates a structure block diagram of a processing device used in a first node, as shown in FIG. 13. In Embodiment 13, a processing device 1300 in the first node is comprised of a first receiver 1301 and a first transmitter 1302.

In one embodiment, the first receiver 1301 comprises at least one of the antenna 452, the transmitter/receiver 454, the multi-antenna receiving processor 458, the receiving processor 456, the controller/processor 459, the memory 460 or the data source 467 in FIG. 4 of the present application.

In one embodiment, the first transmitter 1302 comprises at least one of the antenna 452, the transmitter/receiver 454, the multi-antenna transmitting processor 457, the transmitting processor 468, the controller/processor 459, the memory 460 or the data source 467 in FIG. 4 of the present application.

In Embodiment 13, the first receiver 1301 receives a first signaling group, the first signaling group being used to indicate a first signature sequence group and a second signature sequence group; the first transmitter 1302 selects a first signature sequence from Q signature sequences, and transmits the first signature sequence in a first time interval; and selects a second signature sequence from Q signature sequences, and transmits the second signature sequence in a second time interval; any of the Q signature sequence belongs to one of the first signature sequence group or the second signature sequence group; the second time interval is after the first time interval; whether the first signature sequence belongs to the first signature sequence group or the second signature sequence group is used for selecting the second signature sequence; any signature sequence in the first signature sequence group is associated with a shared channel resource unit in a first period; any signature sequence in the second signature sequence group is not associated with any shared channel resource unit in the first period; Q is a positive integer greater than 1.

In one embodiment, when the first signature sequence belongs to a target sequence group, the second signature sequence is chosen from one of the first signature sequence group and the second signature sequence group other than the target sequence group, the target sequence group being one of the first signature sequence group or the second signature sequence group.

In one embodiment, the first transmitter 1302 transmits the L−1 signature sequence(s) (respectively) in the L−1 time interval(s), L being a positive integer greater than 1; each of the L−1 time interval(s) is before the first time interval; each of the L−1 signature sequence(s) belongs to the target signature sequence group.

In one embodiment, the first signaling group indicates the L.

In one embodiment, the first receiver 1301 monitors a second message in a first time window; the first time window is between the first time interval and the second time interval; the second message is used to determine that the first signature sequence is correctly received; the second message not being detected is used to trigger transmitting of the second signature sequence.

In one embodiment, the target signature sequence group is the first signature sequence group.

In one embodiment, the target signature sequence group is the second signature sequence group.

In one embodiment, the first node 1300 is a UE.

In one embodiment, the first node 1300 is a relay node.

In one embodiment, the first node 1300 is a base station.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The first node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The second node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The UE or terminal in the present application includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The base station or network equipment in the present application includes but is not limited to macro-cellular base stations, micro-cellular base stations, home base stations, relay base station, eNB, gNB, Transmitter Receiver Point (TRP), GNSS, relay satellite, satellite base station, airborne base station and other radio communication equipment.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A first node for wireless communications, comprising:
a first receiver, receiving first configuration information and second configuration information;
a first transmitter, transmitting a first message, the first message comprising at least a former one of a first signature sequence and first data; and a second receiver, receiving a second message, the second message being used to indicate that the first signature sequence is correctly received; and a second transmitter, transmitting a third message on a second time-frequency resource block, a first bit block being used to generate the third message;

wherein the first message and the second message belong a random access procedure; the first configuration information indicates a first time-frequency resource block, the first time-frequency resource block being used to transmit the first signature sequence in the first message; the second configuration information indicates multiple shared resource units; the first configuration information and the second configuration information are used together to determine whether the first signature sequence is mapped to one shared resource unit of the multiple shared resource units; whether the first signature sequence is mapped to one shared resource unit of the multiple shared resource units is used to determine whether the first message comprises the first data; the second message comprises a first field, and information indicated by the first field is related to whether the first message comprises the first data; the second message indicates the second time-frequency resource block.

2. The first node according to claim 1, wherein when the first signature sequence is mapped to the first shared resource unit, the first shared resource unit being one of the multiple shared resource units indicated by the second configuration information, the first message comprises the first signature sequence and the first data, the first bit block being used to generate the first data, the first data being transmitted on the first shared resource unit, and the second message indicating that the first data is not correctly received; when the first signature sequence is not mapped to any of the multiple shared resource units indicated by the second configuration information, the first message only comprises the first signature sequence between the first signature sequence and the first data.

3. The first node according to claim 1, wherein the first field in the second message indicates a first value, the first value being an integer; when the first signature sequence is mapped to the first shared resource unit, a first value belonging to one of a first value range or a second value range is used to determine whether the second message is correctly received; when the first signature sequence is not mapped to any of the multiple shared resource units indicated by the second configuration information, the first value indicates a transmit power adjustment offset of the third message.

4. The first node according to claim 3, wherein the first signature sequence is mapped to the first shared resource unit; the first value range comprises multiple negative integers, and the second value range comprises multiple non-negative integers; when the first value belongs to the first value range of the first value range or the second value range, the first value indicates that the second message is not correctly received; when the first value belongs to the second value range of the first value range or the second value range, the first value indicates a transmit power adjustment offset of the third message.

5. The first node according to claim 1, wherein when the first signature sequence is mapped to the first shared resource unit, the first field in the second message is used to indicate whether a Hybrid Automatic Repeat request (HARQ) Redundancy Version (RV) of the third message and a HARQ RV of the first data are the same; when the first signature sequence is not mapped to any of the multiple shared resource units indicated by the second configuration information, the first field in the second message is reserved.

6. The first node according to claim 1, wherein the first signature sequence is mapped to the first shared resource unit; the second message comprises a second field; the second field is used to determine that the first field indicates one of first scheduling information or second scheduling information; the first scheduling information indicates time-frequency resources occupied by the second time-frequency resource block; the second scheduling information indicates that the second time-frequency resource block is time-frequency resources occupied by one of the multiple shared resource units indicated by the second configuration information.

7. A second node for wireless communications, comprising:
a third transmitter, transmitting first configuration information and second configuration information;
a third receiver, receiving a first message, the first message comprising at least a former one of a first signature sequence and first data; and
a fourth transmitter, transmitting a second message, the second message being used to indicate that the first signature sequence is correctly received; and
a fourth receiver, receiving a third message on a second time-frequency resource block, a first bit block being used to generate the third message;

wherein the first message and the second message belong a random access procedure; the first configuration information indicates a first time-frequency resource block, the first time-frequency resource block being used to transmit the first signature sequence in the first message; the second configuration information indicates multiple shared resource units; the first configuration information and the second configuration information are used together to determine whether the first signature sequence is mapped to one shared resource unit of the multiple shared resource units; whether the first signature sequence is mapped to one shared resource unit of the multiple shared resource units is used to determine whether the first message comprises the first data; the second message comprises a first field, and information indicated by the first field is related to whether the first message comprises the first data; the second message indicates the second time-frequency resource block.

8. The second node according to claim 7, wherein when the first signature sequence is mapped to the first shared resource unit, the first shared resource unit being one of the multiple shared resource units indicated by the second configuration information, the first message comprises the first signature sequence and the first data, the first bit block being used to generate the first data, the first data being transmitted on the first shared resource unit, and the second message indicating that the first data is not correctly received; when the first signature sequence is not mapped to any of the multiple shared resource units indicated by the second configuration information, the first message only comprises the first signature sequence between the first signature sequence and the first data.

9. The second node according to claim 7, wherein the first field in the second message indicates a first value, the first value being an integer; when the first signature sequence is mapped to the first shared resource unit, a first value belonging to one of a first value range or a second value range is used to determine whether the second message is correctly received; when the first signature sequence is not mapped to any of the multiple shared resource units indicated by the second configuration information, the first value indicates a transmit power adjustment offset of the third message.

10. The second node according to claim 9, wherein the first signature sequence is mapped to the first shared resource unit; the first value range comprises multiple negative integers, and the second value range comprises multiple non-negative integers; when the first value belongs to the first value range of the first value range or the second value range, the first value indicates that the second message is not correctly received; when the first value belongs to the second value range of the first value range or the second value range, the first value indicates a transmit power adjustment offset of the third message.

11. The second node according to claim 7, wherein when the first signature sequence is mapped to the first shared resource unit, the first field in the second message is used to indicate whether a Hybrid Automatic Repeat request (HARQ) Redundancy Version (RV) of the third message and a HARQ RV of the first data are the same; when the first signature sequence is not mapped to any of the multiple shared resource units indicated by the second configuration information, the first field in the second message is reserved.

12. The second node according to claim 7, wherein the first signature sequence is mapped to the first shared resource unit; the second message comprises a second field; the second field is used to determine that the first field indicates one of first scheduling information or second scheduling information; the first scheduling information indicates time-frequency resources occupied by the second time-frequency resource block; the second scheduling information indicates that the second time-frequency resource block is time-frequency resources occupied by one of the multiple shared resource units indicated by the second configuration information.

13. A method in a first node for wireless communications, comprising:
receiving first configuration information and second configuration information;
transmitting a first message, the first message comprising at least a former one of a first signature sequence and first data; and
receiving a second message, the second message being used to indicate that the first signature sequence is correctly received; and
transmitting a third message on a second time-frequency resource block, a first bit block being used to generate the third message;
wherein the first message and the second message belong a random access procedure; the first configuration information indicates a first time-frequency resource block, the first time-frequency resource block being used to transmit the first signature sequence in the first message; the second configuration information indicates multiple shared resource units; the first configuration information and the second configuration information are used together to determine whether the first signature sequence is mapped to one shared resource unit of the multiple shared resource units; whether the first signature sequence is mapped to one shared resource unit of the multiple shared resource units is used to determine whether the first message comprises the first data; the second message comprises a first field, and information indicated by the first field is related to whether the first message comprises the first data; the second message indicates the second time-frequency resource block.

14. The method according to claim 13, wherein when the first signature sequence is mapped to the first shared resource unit, the first shared resource unit being one of the multiple shared resource units indicated by the second configuration information, the first message comprises the first signature sequence and the first data, the first bit block being used to generate the first data, the first data being transmitted on the first shared resource unit, and the second message indicating that the first data is not correctly received; when the first signature sequence is not mapped to any of the multiple shared resource units indicated by the second configuration information, the first message only comprises the first signature sequence between the first signature sequence and the first data.

15. The method according to claim 14, wherein the first field in the second message indicates a first value, the first value being an integer; when the first signature sequence is mapped to the first shared resource unit, a first value belonging to one of a first value range or a second value range is used to determine whether the second message is correctly received; when the first signature sequence is not mapped to any of the multiple shared resource units indicated by the second configuration information, the first value indicates a transmit power adjustment offset of the third message.

16. The method according to claim 15, wherein the first signature sequence is mapped to the first shared resource unit; the first value range comprises multiple negative integers, and the second value range comprises multiple non-negative integers; when the first value belongs to the first value range of the first value range or the second value range, the first value indicates that the second message is not correctly received; when the first value belongs to the second value range of the first value range or the second value range, the first value indicates a transmit power adjustment offset of the third message.

17. The method according to claim 14, wherein when the first signature sequence is mapped to the first shared resource unit, the first field in the second message is used to indicate whether a Hybrid Automatic Repeat request (HARQ) Redundancy Version (RV) of the third message and a HARQ RV of the first data are the same; when the first signature sequence is not mapped to any of the multiple shared resource units indicated by the second configuration information, the first field in the second message is reserved.

18. The method according to claim 14, wherein the first signature sequence is mapped to the first shared resource unit; the second message comprises a second field; the second field is used to determine that the first field indicates one of first scheduling information or second scheduling information; the first scheduling information indicates time-frequency resources occupied by the second time-frequency resource block; the second scheduling information indicates that the second time-frequency resource block is time-frequency resources occupied by one of the multiple shared resource units indicated by the second configuration information.

19. A method in a second node for wireless communications, comprising:
transmitting first configuration information and second configuration information;
receiving a first message, the first message comprising at least a former one of a first signature sequence and first data; and transmitting a second message, the second message being used to indicate that the first signature sequence is correctly received; and receiving a third message on a second time-frequency resource block, a first bit block being used to generate the third message;

wherein the first message and the second message belong a random access procedure; the first configuration information indicates a first time-frequency resource block, the first time-frequency resource block being used to transmit the first signature sequence in the first message; the second configuration information indicates multiple shared resource units; the first configuration information and the second configuration information are used together to determine whether the first signature sequence is mapped to one shared resource unit of the multiple shared resource units; whether the first signature sequence is mapped to one shared resource unit of the multiple shared resource units is used to determine whether the first message comprises the first data; the second message comprises a first field, and information indicated by the first field is related to whether the first message comprises the first data; the second message indicates the second time-frequency resource block.

20. The method according to claim 19, wherein when the first signature sequence is mapped to the first shared resource unit, the first shared resource unit being one of the multiple shared resource units indicated by the second configuration information, the first message comprises the first signature sequence and the first data, the first bit block being used to generate the first data, the first data being transmitted on the first shared resource unit, and the second message indicating that the first data is not correctly received; when the first signature sequence is not mapped to any of the multiple shared resource units indicated by the second configuration information, the first message only comprises the first signature sequence between the first signature sequence and the first data.

* * * * *